US011792738B2

(12) United States Patent
Babaei

(10) Patent No.: US 11,792,738 B2
(45) Date of Patent: Oct. 17, 2023

(54) GROUP POWER CONTROL WITH PUCCH CELL SWITCHING

(71) Applicant: Alireza Babaei, Fairfax, VA (US)

(72) Inventor: Alireza Babaei, Fairfax, VA (US)

(73) Assignee: PanPsy Technologies, LLC, Fairfax, VA (US)

( * ) Notice: Subject to any disclaimer, the term of this patent is extended or adjusted under 35 U.S.C. 154(b) by 0 days.

(21) Appl. No.: 17/682,817

(22) Filed: Feb. 28, 2022

(65) Prior Publication Data

US 2022/0279456 A1 Sep. 1, 2022

Related U.S. Application Data

(60) Provisional application No. 63/154,713, filed on Feb. 27, 2021.

(51) Int. Cl.
*H04W 52/04* (2009.01)
*H04W 52/14* (2009.01)
*H04W 52/48* (2009.01)

(52) U.S. Cl.
CPC ......... *H04W 52/146* (2013.01); *H04W 52/48* (2013.01)

(58) Field of Classification Search
CPC ..... H04W 52/04; H04W 52/54; H04W 52/58; H04W 52/18; H04W 72/00; H04W 72/044; H04W 72/20
See application file for complete search history.

(56) References Cited

U.S. PATENT DOCUMENTS

2020/0351129 A1* 11/2020 Kwak ............... H04W 72/0493

OTHER PUBLICATIONS

3GPP TS 38.211 V16.4.0 (Dec. 2020); Technical Specification; 3rd Generation Partnership Project; Technical Specification Group Radio Access Network; NR; Physical channels and modulation; (Release 16).
3GPP TS 38.212 V16.4.0 (Dec. 2020); Technical Specification; 3rd Generation Partnership Project; Technical Specification Group Radio Access Network; NR; Multiplexing and channel coding; (Release 16).
3GPP TS 38.213 V16.4.0 (Dec. 2020); Technical Specification; 3rd Generation Partnership Project; Technical Specification Group Radio Access Network; NR; Physical layer procedures for control; (Release 16).
3GPP TS 38.214 V16.4.0 (Dec. 2020); Technical Specification; 3rd Generation Partnership Project; Technical Specification Group Radio Access Network; NR; Physical layer procedures for data; (Release 16).

(Continued)

*Primary Examiner* — Tu X Nguyen
(74) *Attorney, Agent, or Firm* — Alireza Babaei

(57) ABSTRACT

A wireless device receives configuration parameters indicating positions, in a DCI, of a first bit of a first TPC command and a first bit of a second TPC command that are applicable, respectively, to a first cell and a second cell of a PUCCH group. The wireless device may transmit uplink control information in a transmission timing. The transmitting may be based on the first TPC command if the first cell is a cell for PUCCH transmission in the transmission timing. The transmitting may be based on the second TPC command if the second cell is the cell for PUCCH transmission in the transmission timing.

20 Claims, 48 Drawing Sheets

(56) References Cited

OTHER PUBLICATIONS

3GPP TS 38.300 V16.4.0 (Dec. 2020); Technical Specification; 3rd Generation Partnership Project; Technical Specification Group Radio Access Network; NR; NR and NG-RAN Overall Description; Stage 2; (Release 16).
3GPP TS 38.321 V16.3.0 (Dec. 2020); Technical Specification; 3rd Generation Partnership Project; Technical Specification Group Radio Access Network; NR; Medium Access Control (MAC) protocol specification; (Release 16).
3GPP TS 38.331 V16.3.1 (Jan. 2021); Technical Specification; 3rd Generation Partnership Project; Technical Specification Group Radio Access Network; NR; Radio Resource Control (RRC); Protocol specification; (Release 16).
3GPP TSG RAN WG1 Meeting #102-e; R1-2005243; E-meeting, Aug. 17-28, 2020; Agenda Item: 8.3.1.1; Source: Huawei, HiSilicon; Title: UE feedback enhancements for HARQ-ACK; Document for: Discussion and Decision.
3GPP TSG RAN WG1#102-e; R1-2005374; e-Meeting, Aug. 17-28, 2020; Source: vivo; Title: HARQ-ACK enhancements for Rel-17 URLLC; Agenda Item: 8.3.1.1; Document for: Discussion and Decision.
3GPP TSG RAN WG1 Meeting #102-e; R1-2005633; e-Meeting, Aug. 17-Aug. 28, 2020; Agenda Item: 8.3.1.1; Source: MediaTek Inc.; Title: On UE feedback enhancements for HARQ-ACK; Document for: Discussion and Decision.
3GPP TSG RAN WG1 #102-e; R1-2006887; e-Meeting, Aug. 17-28, 2020; Source: WILUS Inc.; Title: Discussion on HARQ-ACK enhancement for IIoT/URLLC; Agenda item: 8.3 1.1; Document for: Discussion/Decision.
3GPP TSG RAN WG1 Meeting #103-e; R1-2007565; E-meeting, Oct. 26-Nov. 13, 2020; Agenda Item: 8.3.1.1; Source: Huawei, HiSilicon; Title: UE feedback enhancements for HARQ-ACK; Document for: Discussion and Decision.
3GPP TSG-RAN WG1 Meeting #103-e; R1-2007707; Online, Oct. 26-Nov. 13, 2020; Agenda Item: 8.3.1.1; Source: Ericsson; Title: HARQ-ACK Enhancements for IIoT/URLLC; Document for: Discussion, Decision.
3GPP TSG RAN WG1 #103-e; R1-2007849; e-Meeting, Oct. 26-Nov. 13, 2020; Source: CATT; Title: UE feedback enhancements for HARQ-ACK; Agenda Item: 8.3.1.1; Document for: Discussion and Decision.
3GPP TSG RAN WG1 #103-e; R1-2008159; e-Meeting, Oct. 26-Nov. 11, 2020; Agenda Item: 8.3.1.1; Source: Samsung; Title: HARQ-ACK feedback enhancements for Rel-17 URLLC/IIoT; Document for: Discussion and decision.
3GPP TSG RAN WG1 Meeting #103-e; R1-2008821; e-Meeting, Oct. 26-Nov. 13, 2020; Source: ZTE; Title: Discussion on HARQ-ACK enhancements for eURLLC; Agenda item: 8.3.1.1; Document for: Discussion and Decision.
3GPP TSG-RAN WG1 Meeting #103-e; R1-2009053; e-Meeting, Oct. 26-Nov. 13, 2020; Source: Asia Pacific Telecom; Title: Discussion on UE feedback enhancements for HARQ-ACK; Agenda item: 8.3.1.1; Document or Discussion and Decision.
3GPP TSG RAN WG1 Meeting #103-e; R1-2009063; e-Meeting, Oct. 26-Nov. 13, 2020; Agenda Item: 8.3.1.1; Source: MediaTek Inc.; Title: On UE feedback enhancements for HARQ-ACK; Document for: Discussion and Decision.
3GPP TSG RAN WG1 #103-e; R1-2009101; e-Meeting, Oct. 26-Nov. 13, 2020; Agenda item: 8.3.1.1; Source: Lenovo, Motorola Mobility; Title: HARQ-ACK feedback enhancement for IIoT/URLLC; Document for Discussion and Decision.
3GPP TSG RAN WG1 #103-e; R1-2009182; e-Meeting, Oct. 26-Nov. 13, 2020; Source: NTT Docomo, Inc.; Title: Discussion on HARQ-ACK feedback enhancements for Rel.17 URLLC; Agenda Item: 8.3.1.1; Document for: Discussion and Decision.
3GPP TSG RAN WG1 #103-e; R1-2009257; e-Meeting, Oct. 26-Nov. 13, 2020; Agenda item: 8.3.1.1; Source: Qualcomm Incorporated; Title: HARQ-ACK enhancement for IOT and URLLC; Document for: Discussion/Decision.
3GPP TSG RAN WG1 Meeting #104-e; R1-2100101; e-Meeting, Jan. 25-Feb. 5, 2021; Source: ZTE; Title: Discussion on HARQ-ACK enhancements for eURLLC; Agenda item: 8.3.1.1; Document for: Discussion and Decision.
3GPP TSG RAN WG1 Meeting #104-e; R1-2100226; E-meeting, Jan. 25-Feb. 5, 2021; Agenda Item: 8.3.1.1; Source: Huawei, BUPT, China Southern Power Grid, HiSilicon; Title: UE feedback enhancements for HARQ-ACK; Document for: Discussion and Decision.
3GPP TSG-RAN WG1 Meeting #104-e; R1-2100268; E-meeting, Jan. 25-Feb. 5, 2021; Agenda Item: 8.3.1.1; Source: Ericsson; Title: HARQ-ACK Enhancements for IIoT/URLLC; Document for: Discussion, Decision.
3GPP TSG RAN WG1#104-e; R1-2100436; e-Meeting, Jan. 25-Feb. 5, 2020; Source: vivo; Title: HARQ-ACK enhancements for Rel-17 URLLC; Agenda Item: 8.3.1.1; Document for: Discussion and Decision.
3GPP TSG RAN WG1 #104-e; R1-2100728; e-Meeting, Jan. 25-Feb. 5, 2020; Agenda item: 8.3.1.1; Source: Nokia, Nokia Shanghai Bell; Title: HARQ-ACK Feedback Enhancements for URLLC/IIoT; Document for Discussion and Decision.
3GPP TSG RAN WG1 #104; R1-2100911; e-Meeting, Jan. 25-Feb. 5, 2021; Agenda item: 8.3.1.1; Source: China Telecom; Title: Discussion on UE feedback enhancements for HARQ-ACK; Document for: Discussion.
3GPP TSG-RAN WG1 Meeting #104-e; R1-2100968; e-Meeting, Jan. 25-Feb. 5, 2021; Source: Asia Pacific Telecom, FGI; Title: Discussion on UE feedback enhancements for HARQ-ACK; Agenda item: 8.3.1.1; Document for: Discussion and Decision.
3GPP TSG RAN WG1 #104-e; R1-2100993; e-Meeting, Jan. 25-Feb. 5, 2021; Agenda item: 8.3.1.1; Source: Lenovo, Motorola Mobility; Title: HARQ-ACK feedback enhancement for IIoT/URLLC; Document for Discussion and Decision.
3GPP TSG RAN WG1 #104-e; R1-2101039; e-Meeting, Jan. 25-Feb. 5, 2021; Agenda item: 8.3.1.1; Title: Discussion on UE feedback enhancements for HARQ-ACK; Source: CMCC; Document for: Discussion and Decision.
3GPP TSG RAN WG1 #104-e; R1-2101201; e-Meeting, Jan. 25-Feb. 5, 2021; Agenda Item: 8.3.1.1; Source: Samsung; Title: On HARQ-ACK reporting enhancements; Document for: Discussion and decision.
3GPP TSG RAN WG1 #104-e; R1-2101459; e-Meeting, Jan. 25-Feb. 5, 2021; Agenda item: 8.3.1.1; Source: Qualcomm Incorporated; Title: HARQ-ACK enhancement for IOT and URLLC; Document for: Discussion/Decision.
3GPP TSG RAN WG1 #104-e; R1-2101612; e-Meeting, Jan. 25-Feb. 5, 2021; Source: NTT Docomo, Inc.; Title: Discussion on HARQ-ACK feedback enhancements for Rel.17 URLLC; Agenda Item: 8.3.1.1; Document for: Discussion and Decision.

* cited by examiner

```
PUCCH-TPC-CommandConfig ::=    SEQUENCE {
    tpc-IndexPCell             INTEGER (1..15)
    tpc-IndexPUCCH-SCell       INTEGER (1..15)
    ...
}
```

Receive configuration parameters indicating positions, in a DCI, of a 1st bit of a 1st TPC command and a 1st bit of a 2nd TPC command that are applicable, respectively, to a 1st cell and a 2nd cell of a PUCCH group

4110

Transmit, in a transmission timing, uplink control information based on:

the 1st TPC command if the 1st cell is a cell for PUCCH transmission in the transmission timing; and the 2nd TPC command if the 2nd cell is the cell for PUCCH transmission in the transmission timing

Receive configuration parameters of cells of an uplink control channel group comprising a 1st cell and a 2nd cell The 1st cell and the 2nd cell are configured for uplink control channel transmission

4210

Receive a DCI comprising:

scheduling information for receiving a transport block; and a TPC command for an uplink control channel carrying a HARQ feedback associated with the transport block.

A cell of the uplink control channel group for uplink control channel transmission in a timing of the HARQ feedback is one of the 1st cell and the 2nd cell the TPC command applies to the cell

4220

Transmit the HARQ feedback:

via the 1st cell and based on the TPC command, in response to the cell being the 1st cell; and
via the 2nd cell and based on the TPC command, in response to the cell being the 2nd cell.

Transmit capability message(s) comprising capability IE(s) indicating whether a wireless device is capable of uplink control channel switching in an uplink control channel group

4410

Receive configuration parameters of a plurality of cells of an uplink control channel group in response to the wireless device being capable of (e.g., supporting) uplink control channel cell switching:

the cells comprise a 1st cell and a 2nd cell configured with uplink control channel transmission; and
the 2nd cell is configured for uplink control channel cell switching

4420

Determine, based on an uplink control channel cell switching pattern, one of the first cell and the second cell as a cell for uplink control channel transmission in a transmission timing

4430

Transmit, in the transmission timing, uplink control information based on the determined cell for uplink control channel transmission

Transmit capability message(s) comprising capability IE(s) indicating whether the wireless device is capable of (e.g., supports) uplink control channel switching in an uplink control channel group

4510

Receive configuration parameters of cells of an uplink control channel group

In response to the wireless device being capable of (e.g., supporting) uplink control channel cell switching:

the cells comprise a 1st cell and a 2nd cell configured with uplink control channel transmission; and the 2nd cell is configured for uplink control channel cell switching

4520

Determine, based on a value of a field of a DCI, one of the 1st cell and the 2nd cell as a cell for uplink control channel transmission in a transmission timing

4530

Transmit, in the transmission timing, uplink control information based on the determined cell for uplink control channel transmission

GROUP POWER CONTROL WITH PUCCH CELL SWITCHING

CROSS-REFERENCE TO RELATED APPLICATIONS

This application claims the benefit of U.S. Provisional Application No. 63/154,713, filed Feb. 27, 2021, which is hereby incorporated by reference in its entirety.

BRIEF DESCRIPTION OF THE DRAWINGS

FIG. 41 shows an example flow diagram in accordance with several of various embodiments of the present disclosure.

FIG. 42 shows an example flow diagram in accordance with several of various embodiments of the present disclosure.

FIG. 44 shows an example flow diagram in accordance with several of various embodiments of the present disclosure.

FIG. 45 shows an example flow diagram in accordance with several of various embodiments of the present disclosure.

DETAILED DESCRIPTION

The exemplary embodiments of the disclosed technology enable processes for a wireless device and/or one or more base stations for uplink control channel transmission. The exemplary disclosed embodiments may be implemented in the technical field of wireless communication systems. More particularly, the embodiments of the disclosed technology may enhance uplink control channel cell switching in an uplink control channel group.

The devices and/or nodes of the mobile communications system disclosed herein may be implemented based on various technologies and/or various releases/versions/amendments of a technology. The various technologies include various releases of long-term evolution (LTE) technologies, various releases of 5G new radio (NR) technologies, various wireless local area networks technologies and/or a combination thereof and/or alike. For example, a base station may support a given technology and may communicate with wireless devices with different characteristics. The wireless devices may have different categories that define their capabilities in terms of supporting various features. The wireless device with the same category may have different capabilities. The wireless devices may support various technologies such as various releases of LTE technologies, various releases of 5G NR technologies and/or a combination thereof and/or alike. At least some of the wireless devices in the mobile communications system of the present disclosure may be stationary or almost stationary. In this disclosure, the terms "mobile communications system" and "wireless communications system" may be used interchangeably.

Figure 1A:
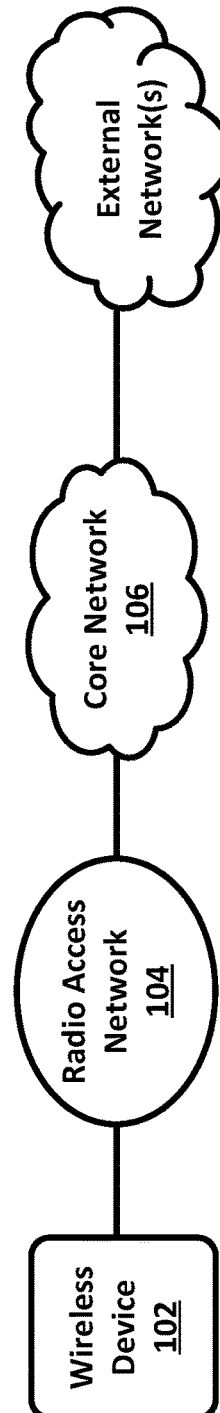
FIG. 1A and FIG. 1B show examples of mobile communications systems in accordance with several of various embodiments of the present disclosure.

FIG. 1A shows an example of a mobile communications system 100 in accordance with several of various embodiments of the present disclosure. The mobile communications system 100 may be, for example, run by a mobile network operator (MNO) or a mobile virtual network operator (MVNO). The mobile communications system 100 may be a public land mobile network (PLMN) run by a network operator providing a variety of service including voice, data, short messaging service (SMS), multimedia messaging service (MMS), emergency calls, etc. The mobile communications system 100 includes a core network (CN) 106, a radio access network (RAN) 104 and at least one wireless device 102.

The CN 106 connects the RAN 104 to one or more external networks (e.g., one or more data networks such as the Internet) and is responsible for functions such as authentication, charging and end-to-end connection establishment. Several radio access technologies (RATs) may be served by the same CN 106.

The RAN 104 may implement a RAT and may operate between the at least one wireless device 102 and the CN 106. The RAN 104 may handle radio related functionalities such as scheduling, radio resource control, modulation and coding, multi-antenna transmissions and retransmission protocols. The wireless device and the RAN may share a portion of the radio spectrum by separating transmissions from the wireless device to the RAN and the transmissions from the RAN to the wireless device. The direction of the transmissions from the wireless device to the RAN is known as the uplink and the direction of the transmissions from the RAN to the wireless device is known as the downlink. The separation of uplink and downlink transmissions may be achieved by employing a duplexing technique. Example duplexing techniques include frequency division duplexing (FDD), time division duplexing (TDD) or a combination of FDD and TDD.

In this disclosure, the term wireless device may refer to a device that communicates with a network entity or another device using wireless communication techniques. The wireless device may be a mobile device or a non-mobile (e.g., fixed) device. Examples of the wireless device include cellular phone, smart phone, tablet, laptop computer, wearable device (e.g., smart watch, smart shoe, fitness trackers, smart clothing, etc.), wireless sensor, wireless meter, extended reality (XR) devices including augmented reality (AR) and virtual reality (VR) devices, Internet of Things (IoT) device, vehicle to vehicle communications device, road-side units (RSU), automobile, relay node or any combination thereof. In some examples, the wireless device (e.g., a smart phone, tablet, etc.) may have an interface (e.g., a graphical user interface (GUI)) for configuration by an end user. In some examples, the wireless device (e.g., a wireless sensor device, etc.) may not have an interface for configuration by an end user. The wireless device may be referred to as a user equipment (UE), a mobile station (MS), a subscriber unit, a handset, an access terminal, a user terminal, a wireless transmit and receive unit (WTRU) and/or other terminology.

The at least one wireless device may communicate with at least one base station in the RAN 104. In this disclosure, the term base station may encompass terminologies associated with various RATs. For example, a base station may be referred to as a Node B in a 3G cellular system such as Universal Mobile Telecommunication Systems (UMTS), an evolved Node B (eNB) in a 4G cellular system such as evolved universal terrestrial radio access (E-UTRA), a next generation eNB (ng-eNB), a Next Generation Node B (gNB) in NR and/or a 5G system, an access point (AP) in Wi-Fi and/or other wireless local area networks. A base station may be referred to as a remote radio head (RRH), a baseband unit (BBU) in connection with one or more RRHs, a repeater or relay for coverage extension and/or any combination thereof. In some examples, all protocol layers of a base station may be implemented in one unit. In some examples, some of the protocol layers (e.g., upper layers) of the base station may be implemented in a first unit (e.g., a central unit (CU)) and some other protocol layer (e.g., lower layers) may be implemented in one or more second units (e.g., distributed units (DUs)).

A base station in the RAN 104 includes one or more antennas to communicate with the at least one wireless device. The base station may communicate with the at least one wireless device using radio frequency (RF) transmissions and receptions via RF transceivers. The base station antennas may control one or more cells (or sectors). The size and/or radio coverage area of a cell may depend on the range that transmissions by a wireless device can be successfully received by the base station when the wireless device transmits using the RF frequency of the cell. The base station may be associated with cells of various sizes. At a given location, the wireless device may be in coverage area of a first cell of the base station and may not be in coverage area of a second cell of the base station depending on the sizes of the first cell and the second cell.

A base station in the RAN 104 may have various implementations. For example, a base station may be implemented by connecting a BBU (or a BBU pool) coupled to one or more RRHs and/or one or more relay nodes to extend the cell coverage. The BBU pool may be located at a centralized site like a cloud or data center. The BBU pool may be connected to a plurality of RRHs that control a plurality of cells. The combination of BBU with the one or more RRHs may be referred to as a centralized or cloud RAN (C-RAN) architecture. In some implementations, the BBU functions may be implemented on virtual machines (VMs) on servers at a centralized location. This architecture may be referred to as virtual RAN (vRAN). All, most or a portion of the protocol layer functions (e.g., all or portions of physical layer, medium access control (MAC) layer and/or higher layers) may be implemented at the BBU pool and the processed data may be transmitted to the RRHs for further processing and/or RF transmission. The links between the BBU pool and the RRHs may be referred to as fronthaul.

In some deployment scenarios, the RAN 104 may include macrocell base stations with high transmission power levels and large coverage areas. In other deployment scenarios, the RAN 104 may include base stations that employ different transmission power levels and/or have cells with different coverage areas. For example, some base station may be macrocell base stations with high transmission powers and/or large coverage areas and other base station may be small cell base stations with comparatively smaller transmission powers and/or coverage areas. In some deployment scenarios, a small cell base station may have coverage that is within or has overlap with coverage area of a macrocell base station. A wireless device may communicate with the macrocell base station while within the coverage area of the macrocell base station. For additional capacity, the wireless device may communicate with both the macrocell base station and the small cell base station while in the overlapped coverage area of the macrocell base station and the small cell base station. Depending on their coverage areas, a small cell base station may be referred to as a microcell base station, a picocell base station, a femtocell base station or a home base station.

Different standard development organizations (SDOs) have specified, or may specify in future, mobile communications systems that have similar characteristics as the mobile communications system 100 of FIG. 1A. For example, the Third-Generation Partnership Project (3GPP) is a group of SDOs that provides specifications that define 3GPP technologies for mobile communications systems that are akin to the mobile communications system 100. The 3GPP has developed specifications for third generation (3G) mobile networks, fourth generation (4G) mobile networks and fifth generation (5G) mobile networks. The 3G, 4G and 5G networks are also known as Universal Mobile Telecommunications System (UMTS), Long Term Evolution (LTE) and 5G system (5GS), respectively. In this disclosure, embodiments are described with respect to the RAN implemented in a 3GPP 5G mobile network that is also referred to as next generation RAN (NG-RAN). The embodiments may also be implemented in other mobile communications systems such as 3G or 4G mobile networks or mobile networks that may be standardized in future such as sixth generation (6G) mobile networks or mobile networks that are implemented by standards bodies other than 3GPP. The NG-RAN may be based on a new RAT known as new radio (NR) and/or other radio access technologies such as LTE and/or non-3GPP RATs.

Figure 1B:
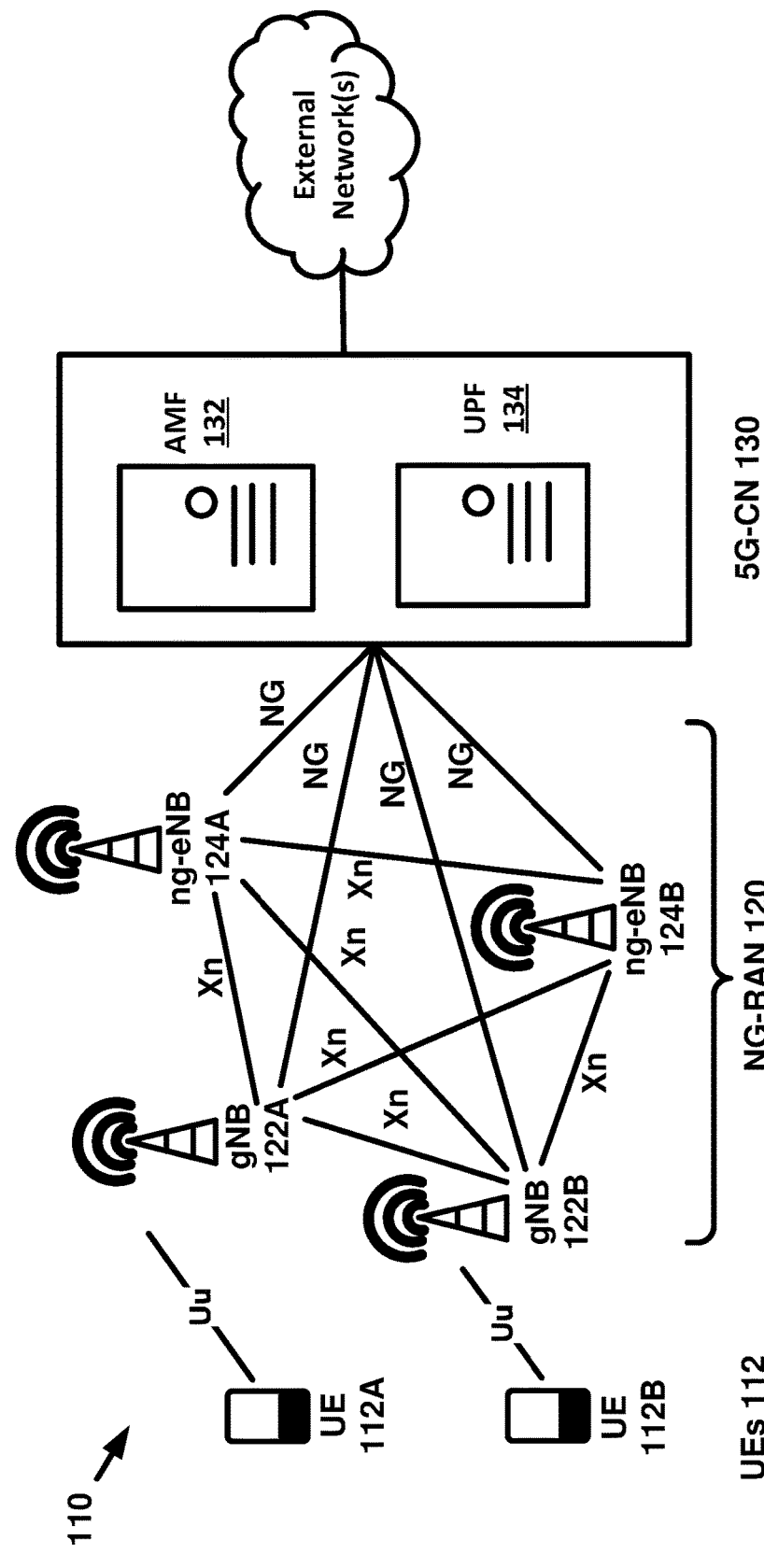

FIG. 1B shows an example of a mobile communications system 110 in accordance with several of various embodiments of the present disclosure. The mobile communications system 110 of FIG. 1B is an example of a 5G mobile network and includes a 5G CN (5G-CN) 130, an NG-RAN 120 and UEs (collectively 112 and individually UE 112A and UE 112B). The 5G-CN 130, the NG-RAN 120 and the UEs 112 of FIG. 1B operate substantially alike the CN 106, the RAN 104 and the at least one wireless device 102, respectively, as described for FIG. 1A.

The 5G-CN 130 of FIG. 1B connects the NG-RAN 120 to one or more external networks (e.g., one or more data networks such as the Internet) and is responsible for functions such as authentication, charging and end-to-end connection establishment. The 5G-CN has new enhancements compared to previous generations of CNs (e.g., evolved packet core (EPC) in the 4G networks) including service-based architecture, support for network slicing and control plane/user plane split. The service-based architecture of the 5G-CN provides a modular framework based on service and functionalities provided by the core network wherein a set of network functions are connected via service-based interfaces. The network slicing enables multiplexing of independent logical networks (e.g., network slices) on the same physical network infrastructure. For example, a network slice may be for mobile broadband applications with full mobility support and a different network slice may be for non-mobile latency-critical applications such as industry automation. The control plane/user plane split enables independent scaling of the control plane and the user plane. For example, the control plane capacity may be increased without affecting the user plane of the network.

The 5G-CN 130 of FIG. 1B includes an access and mobility management function (AMF) 132 and a user plane function (UPF) 134. The AMF 132 may support termination of non-access stratum (NAS) signaling, NAS signaling security such as ciphering and integrity protection, inter-3GPP access network mobility, registration management, connection management, mobility management, access authentication and authorization and security context management. The NAS is a functional layer between a UE and the CN and the access stratum (AS) is a functional layer between the UE and the RAN. The UPF 134 may serve as an interconnect point between the NG-RAN and an external data network. The UPF may support packet routing and forwarding, packet inspection and Quality of Service (QoS) handling and packet filtering. The UPF may further act as a Protocol Data Unit (PDU) session anchor point for mobility within and between RATs.

The 5G-CN 130 may include additional network functions (not shown in FIG. 1B) such as one or more Session Management Functions (SMFs), a Policy Control Function (PCF), a Network Exposure Function (NEF), a Unified Data Management (UDM), an Application Function (AF), and/or an Authentication Server Function (AUSF). These network functions along with the AMF 132 and UPF 134 enable a service-based architecture for the 5G-CN.

The NG-RAN 120 may operate between the UEs 112 and the 5G-CN 130 and may implement one or more RATs. The NG-RAN 120 may include one or more gNBs (e.g., gNB 122A or gNB 122B or collectively gNBs 122) and/or one or more ng-eNBs (e.g., ng-eNB 124A or ng-eNB 124B or collectively ng-eNB s 124). The general terminology for gNB s 122 and/or an ng-eNBs 124 is a base station and may be used interchangeably in this disclosure. The gNBs 122 and the ng-eNBs 124 may include one or more antennas to communicate with the UEs 112. The one or more antennas of the gNBs 122 or ng-eNBs 124 may control one or more cells (or sectors) that provide radio coverage for the UEs 112.

A gNB and/or an ng-eNB of FIG. 1B may be connected to the 5G-CN 130 using an NG interface. A gNB and/or an ng-eNB may be connected with other gNBs and/or ng-eNBs using an Xn interface. The NG or the Xn interfaces are logical connections that may be established using an underlying transport network. The interface between a UE and a gNB or between a UE and an ng-eNBs may be referred to as the Uu interface. An interface (e.g., Uu, NG or Xn) may be established by using a protocol stack that enables data and control signaling exchange between entities in the mobile communications system of FIG. 1B. When a protocol stack is used for transmission of user data, the protocol stack may be referred to as user plane protocol stack. When a protocol stack is used for transmission of control signaling, the protocol stack may be referred to as control plane protocol stack. Some protocol layer may be used in both of the user plane protocol stack and the control plane protocol stack while other protocol layers may be specific to the user plane or control plane.

The NG interface of FIG. 1B may include an NG-User plane (NG-U) interface between a gNB and the UPF 134 (or an ng-eNB and the UPF 134) and an NG-Control plane (NG-C) interface between a gNB and the AMF 132 (or an ng-eNB and the AMF 132). The NG-U interface may provide non-guaranteed delivery of user plane PDUs between a gNB and the UPF or an ng-eNB and the UPF. The NG-C interface may provide services such as NG interface management, UE context management, UE mobility management, transport of NAS messages, paging, PDU session management, configuration transfer and/or warning message transmission.

The UEs 112 and a gNB may be connected using the Uu interface and using the NR user plane and control plane protocol stack. The UEs 112 and an ng-eNB may be connected using the Uu interface using the LTE user plane and control plane protocol stack.

In the example mobile communications system of FIG. 1B, a 5G-CN is connected to a RAN comprised of 4G LTE and/or 5G NR RATs. In other example mobile communications systems, a RAN based on the 5G NR RAT may be connected to a 4G CN (e.g., EPC). For example, earlier releases of 5G standards may support a non-standalone mode of operation where a NR based RAN is connected to the 4G EPC. In an example non-standalone mode, a UE may be connected to both a 5G NR gNB and a 4G LTE eNB (e.g., a ng-eNB) and the control plane functionalities (such as initial access, paging and mobility) may be provided through the 4G LTE eNB. In a standalone of operation, the 5G NR gNB is connected to a 5G-CN and the user plane and the control plane functionalities are provided by the 5G NR gNB.

Figure 2A:
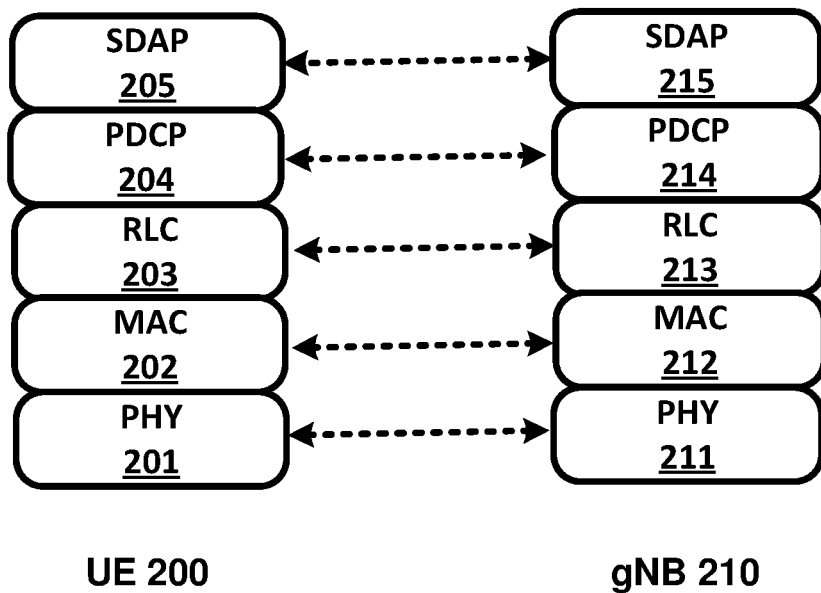
FIG. 2A and FIG. 2B show examples of user plane and control plane protocol layers in accordance with several of various embodiments of the present disclosure.

FIG. 2A shows an example of the protocol stack for the user plan of an NR Uu interface in accordance with several of various embodiments of the present disclosure. The user plane protocol stack comprises five protocol layers that terminate at the UE 200 and the gNB 210. The five protocol layers, as shown in FIG. 2A, include physical (PHY) layer referred to as PHY 201 at the UE 200 and PHY 211 at the gNB 210, medium access control (MAC) layer referred to as MAC 202 at the UE 200 and MAC 212 at the gNB 210, radio link control (RLC) layer referred to as RLC 203 at the UE 200 and RLC 213 at the gNB 210, packet data convergence protocol (PDCP) layer referred to as PDCP 204 at the UE 200 and PDCP 214 at the gNB 210, and service data application protocol (SDAP) layer referred to as SDAP 205 at the UE 200 and SDAP 215 at the gNB 210. The PHY layer, also known as layer 1 (L1), offers transport services to higher layers. The other four layers of the protocol stack (MAC, RLC, PDCP and SDAP) are collectively known as layer 2 (L2).

Figure 2B:
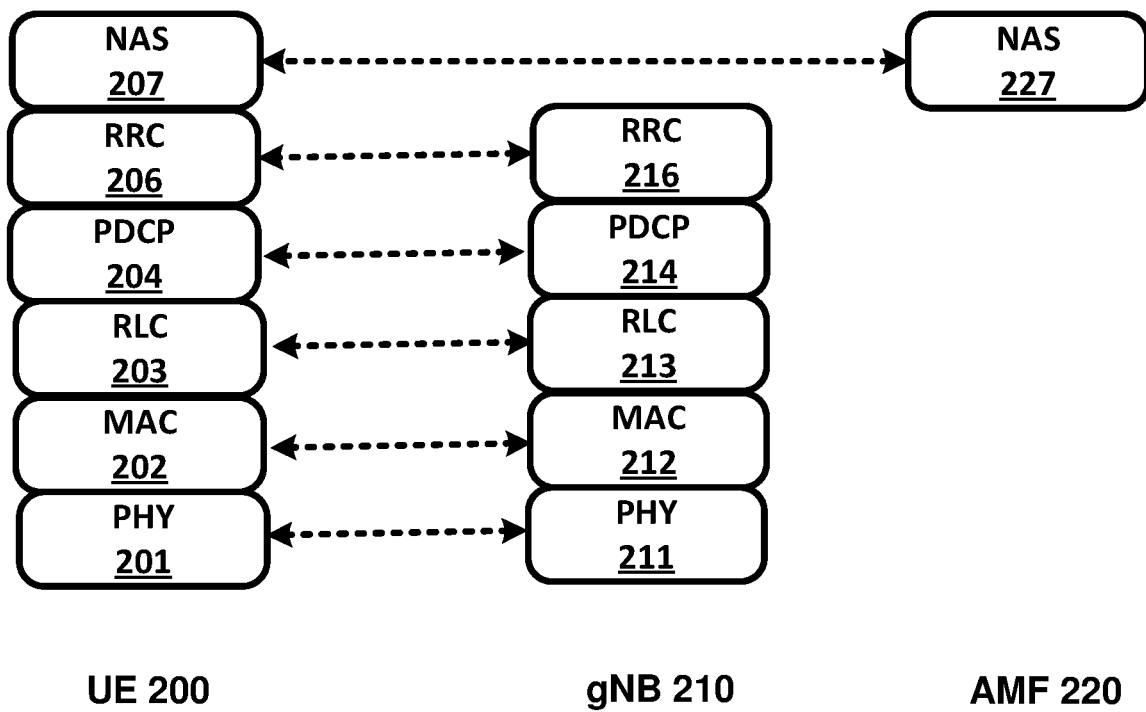

FIG. 2B shows an example of the protocol stack for the control plan of an NR Uu interface in accordance with several of various embodiments of the present disclosure. Some of the protocol layers (PHY, MAC, RLC and PDCP) are common between the user plane protocol stack shown in FIG. 2A and the control plan protocol stack. The control plane protocol stack also includes the RRC layer, referred to RRC 206 at the UE 200 and RRC 216 at the gNB 210, that also terminates at the UE 200 and the gNB 210. In addition, the control plane protocol stack includes the NAS layer that terminates at the UE 200 and the AMF 220. In FIG. 2B, the NAS layer is referred to as NAS 207 at the UE 200 and NAS 227 at the AMF 220.

Figure 3:
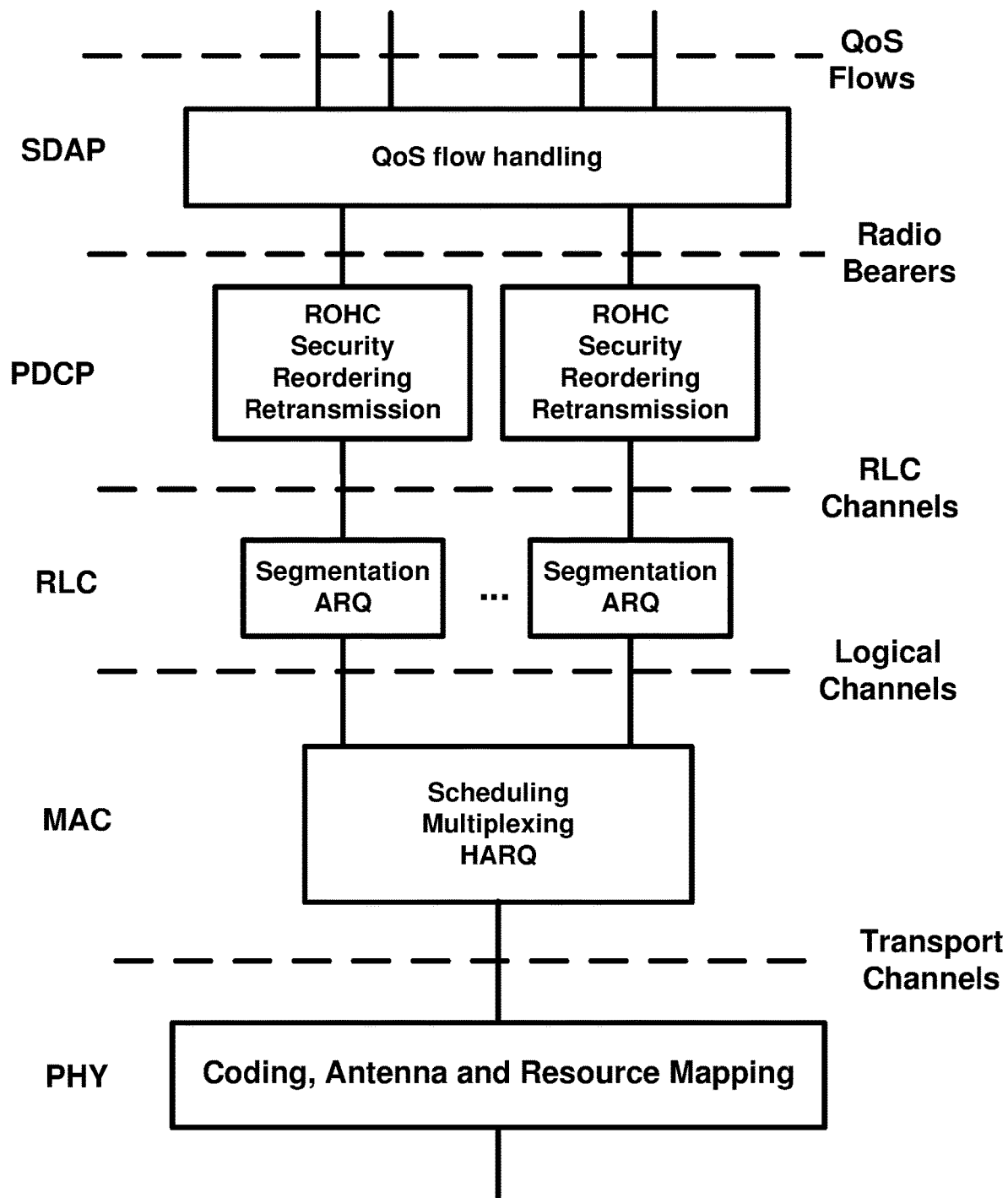
FIG. 3 shows example functions and services offered by protocol layers in a user plane protocol stack in accordance with several of various embodiments of the present disclosure.

FIG. 3 shows example functions and services offered to other layers by a layer in the NR user plane protocol stack of FIG. 2A in accordance with several of various embodiments of the present disclosure. For example, the SDAP layer of FIG. 3 (shown in FIG. 2A as SDAP 205 at the UE side and SDAP 215 at the gNB side) may perform mapping and de-mapping of QoS flows to data radio bearers. The mapping and de-mapping may be based on QoS (e.g., delay, throughput, jitter, error rate, etc.) associated with a QoS flow. A QoS flow may be a QoS differentiation granularity for a PDU session which is a logical connection between a UE 200 and a data network. A PDU session may contain one or more QoS flows. The functions and services of the SDAP layer include mapping and de-mapping between one or more QoS flows and one or more data radio bearers. The SDAP layer may also mark the uplink and/or downlink packets with a QoS flow ID (QFI).

The PDCP layer of FIG. 3 (shown in FIG. 2A as PDCP 204 at the UE side and PDCP 214 at the gNB side) may perform header compression and decompression (e.g., using Robust Header Compression (ROHC) protocol) to reduce the protocol header overhead, ciphering and deciphering and integrity protection and verification to enhance the security over the air interface, reordering and in-order delivery of packets and discarding of duplicate packets. A UE may be configured with one PDCP entity per bearer.

In an example scenario not shown in FIG. 3, a UE may be configured with dual connectivity and may connect to two different cell groups provided by two different base stations. For example, a base station of the two base stations may be referred to as a master base station and a cell group provided by the master base station may be referred to as a master cell group (MCG). The other base station of the two base stations may be referred to as a secondary base station and the cell group provided by the secondary base station may be referred to as a secondary cell group (SCG). A bearer may be configured for the UE as a split bearer that may be handled by the two different cell groups. The PDCP layer may perform routing of packets corresponding to a split bearer to and/or from RLC channels associated with the cell groups.

In an example scenario not shown in FIG. 3, a bearer of the UE may be configured (e.g., with control signaling) with PDCP packet duplication. A bearer configured with PDCP duplication may be mapped to a plurality of RLC channels each corresponding to different one or more cells. The PDCP layer may duplicate packets of the bearer configured with PDCP duplication and the duplicated packets may be mapped to the different RLC channels. With PDCP packet duplication, the likelihood of correct reception of packets increases thereby enabling higher reliability.

The RLC layer of FIG. 3 (shown in FIG. 2A as RLC 203 at the UE side and RLC 213 at the gNB side) provides service to upper layers in the form of RLC channels. The RLC layer may include three transmission modes: transparent mode (TM), Unacknowledged mode (UM) and Acknowledged mode (AM). The RLC layer may perform error correction through automatic repeat request (ARQ) for the AM transmission mode, segmentation of RLC service data units (SDUs) for the AM and UM transmission modes and re-segmentation of RLC SDUs for AM transmission mode, duplicate detection for the AM transmission mode, RLC SDU discard for the AM and UM transmission modes, etc. The UE may be configured with one RLC entity per RLC channel.

The MAC layer of FIG. 3 (shown in FIG. 2A as MAC 202 at the UE side and MAC 212 at the gNB side) provides services to the RLC layer in form of logical channels. The MAC layer may perform mapping between logical channels and transport channels, multiplexing/demultiplexing of MAC SDUs belonging to one or more logical channels into/from transport blocks (TBs) delivered to/from the physical layer on transport channels, reporting of scheduling information, error correction through hybrid automatic repeat request (HARQ), priority handling between UEs by means of dynamic scheduling, priority handling between logical channels of one UE by means of logical channel prioritization and/or padding. In case of carrier aggregation, a MAC entity may comprise one HARQ entity per cell. A MAC entity may support multiple numerologies, transmission timings and cells. The control signaling may configure logical channels with mapping restrictions. The mapping restrictions in logical channel prioritization may control the numerology(ies), cell(s), and/or transmission timing(s)/duration(s) that a logical channel may use.

The PHY layer of FIG. 3 (shown in FIG. 2A as PHY 201 at the UE side and PHY 211 at the gNB side) provides transport services to the MAC layer in form of transport channels. The physical layer may handle coding/decoding, HARQ soft combining, rate matching of a coded transport channel to physical channels, mapping of coded transport channels to physical channels, modulation and demodulation of physical channels, frequency and time synchronization, radio characteristics measurements and indication to higher layers, RF processing, and mapping to antennas and radio resources.

Figure 4:
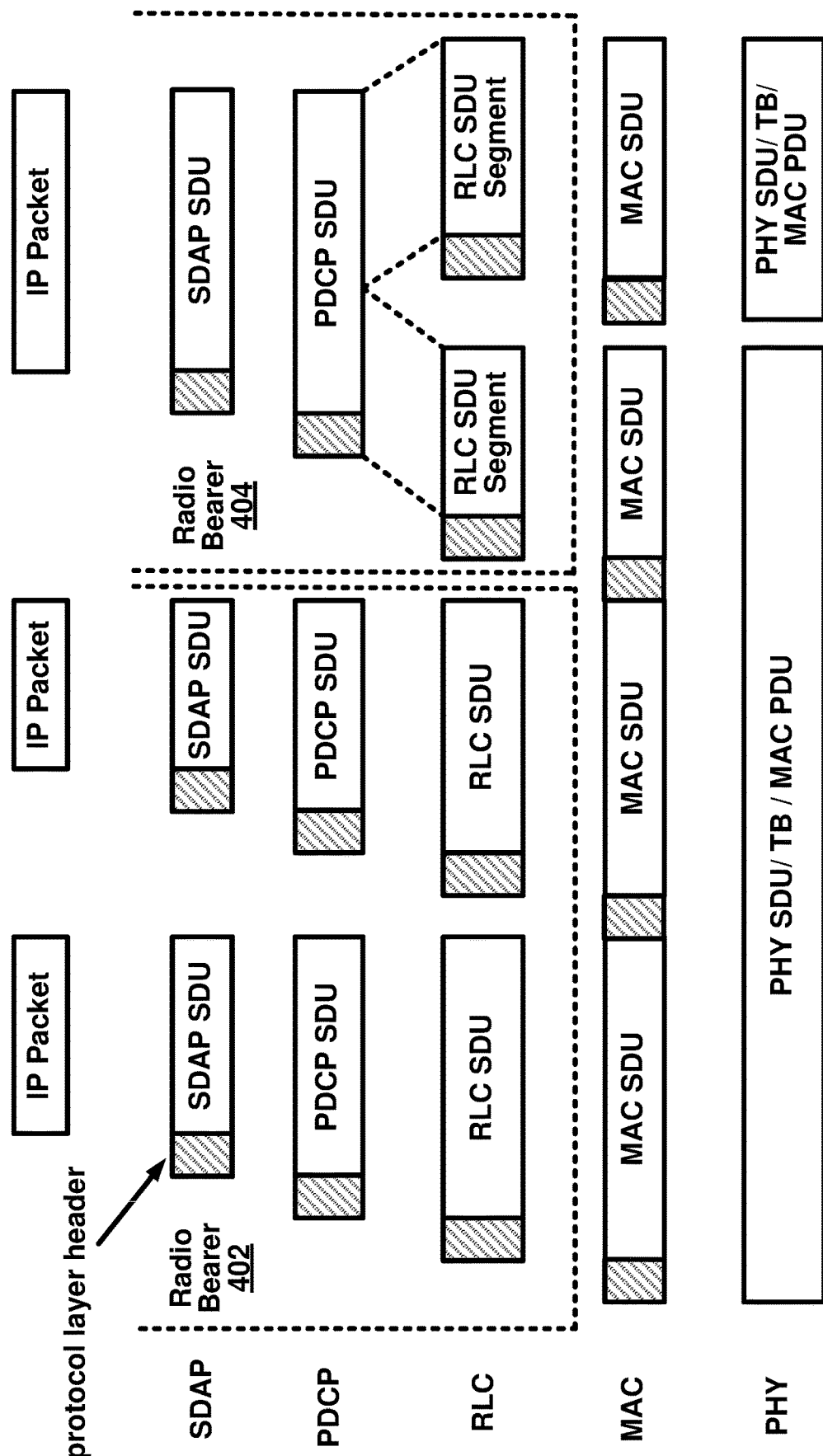
FIG. 4 shows example flow of packets through the protocol layers in accordance with several of various embodiments of the present disclosure.

FIG. 4 shows example processing of packets at different protocol layers in accordance with several of various embodiments of the present disclosure. In this example, three Internet Protocol (IP) packets that are processed by the different layers of the NR protocol stack. The term SDU shown in FIG. 4 is the data unit that is entered from/to a higher layer. In contrast, a protocol data unit (PDU) is the data unit that is entered to/from a lower layer. The flow of packets in FIG. 4 is for downlink. An uplink data flow through layers of the NR protocol stack is similar to FIG. 4. In this example, the two leftmost IP packets are mapped by the SDAP layer (shown as SDAP 205 and SDAP 215 in FIG. 2A) to radio bearer 402 and the rightmost packet is mapped by the SDAP layer to the radio bearer 404. The SDAP layer adds SDAP headers to the IP packets which are entered into the PDCP layer as PDCP SDUs. The PDCP layer is shown as PDCP 204 and PDCP 214 in FIG. 2A. The PDCP layer adds the PDCP headers to the PDCP SDUs which are entered into the RLC layer as RLC SDUs. The RLC layer is shown as RLC 203 and RLC 213 in FIG. 2A. An RLC SDU may be segmented at the RLC layer. The RLC layer adds RLC headers to the RLC SDUs after segmentation (if segmented) which are entered into the MAC layer as MAC SDUs. The MAC layer adds the MAC headers to the MAC SDUs and multiplexes one or more MAC SDUs to form a PHY SDU (also referred to as a transport block (TB) or a MAC PDU).

In FIG. 4, the MAC SDUs are multiplexed to form a transport block. The MAC layer may multiplex one or more MAC control elements (MAC CEs) with zero or more MAC SDUs to form a transport block. The MAC CEs may also be referred to as MAC commands or MAC layer control signaling and may be used for in-band control signaling. The MAC CEs may be transmitted by a base station to a UE (e.g., downlink MAC CEs) or by a UE to a base station (e.g., uplink MAC CEs). The MAC CEs may be used for transmission of information useful by a gNB for scheduling (e.g., buffer status report (BSR) or power headroom report (PHR)), activation/deactivation of one or more cells, activation/deactivation of configured radio resources for or one or more processes, activation/deactivation of one or more processes, indication of parameters used in one or more processes, etc.

Figure 5A:
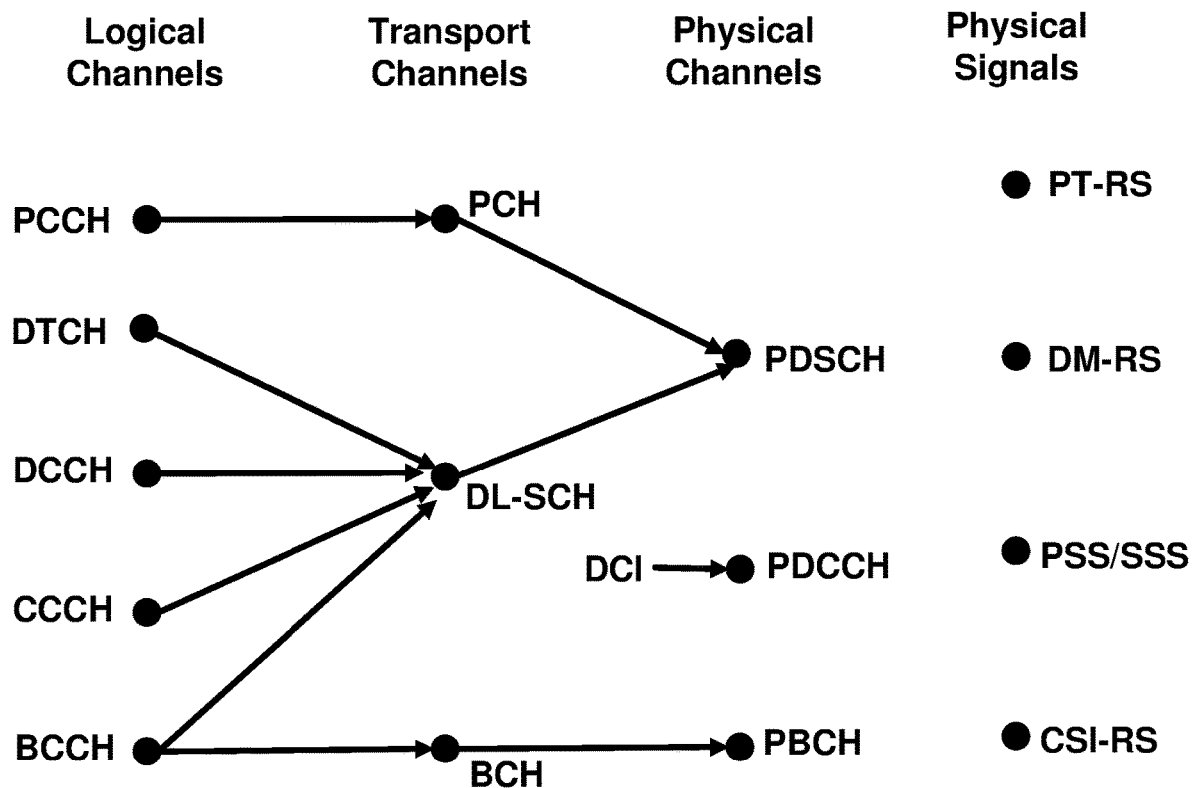
FIG. 5A shows example mapping of channels between layers of the protocol stack and different physical signals in downlink in accordance with several of various embodiments of the present disclosure.
Figure 5B:
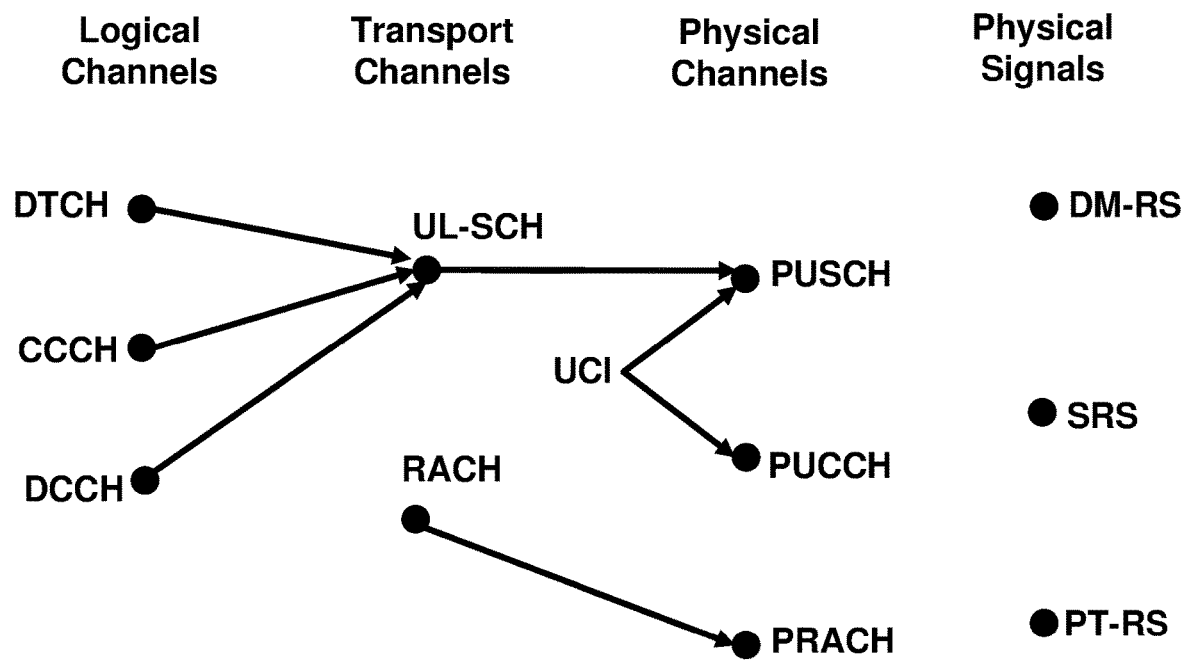
FIG. 5B shows example mapping of channels between layers of the protocol stack and different physical signals in uplink in accordance with several of various embodiments of the present disclosure.

FIG. 5A and FIG. 5B show example mapping between logical channels, transport channels and physical channels for downlink and uplink, respectively in accordance with several of various embodiments of the present disclosure. As discussed before, the MAC layer provides services to higher layer in the form of logical channels. A logical channel may be classified as a control channel, if used for transmission of control and/or configuration information, or a traffic channel if used for transmission of user data. Example logical channels in NR include Broadcast Control Channel (BCCH) used for transmission of broadcast system control information, Paging Control Channel (PCCH) used for carrying paging messages for wireless devices with unknown locations, Common Control Channel (CCCH) used for transmission of control information between UEs and network and for UEs that have no RRC connection with the network, Dedicated Control Channel (DCCH) which is a point-to-point bi-directional channel for transmission of dedicated control information between a UE that has an RRC connection and the network and Dedicated Traffic Channel (DTCH) which is point-to-point channel, dedicated to one UE, for the transfer of user information and may exist in both uplink and downlink.

As discussed before, the PHY layer provides services to the MAC layer and higher layers in the form of transport channels. Example transport channels in NR include Broadcast Channel (BCH) used for transmission of part of the BCCH referred to as master information block (MIB), Downlink Shared Channel (DL-SCH) used for transmission of data (e.g., from DTCH in downlink) and various control information (e.g., from DCCH and CCCH in downlink and part of the BCCH that is not mapped to the BCH), Uplink Shared Channel (UL-SCH) used for transmission of uplink data (e.g., from DTCH in uplink) and control information (e.g., from CCCH and DCCH in uplink) and Paging Channel (PCH) used for transmission of paging information from the PCCH. In addition, Random Access Channel (RACH) is a transport channel used for transmission of random access preambles. The RACH does not carry a transport block. Data on a transport channel (except RACH) may be organized in transport blocks, wherein One or more transport blocks may be transmitted in a transmission time interval (TTI).

The PHY layer may map the transport channels to physical channels. A physical channel may correspond to time-frequency resources that are used for transmission of information from one or more transport channels. In addition to mapping transport channels to physical channels, the physical layer may generate control information (e.g., downlink control information (DCI) or uplink control information (UCI)) that may be carried by the physical channels. Example DCI include scheduling information (e.g., downlink assignments and uplink grants), request for channel state information report, power control command, etc. Example UCI include HARQ feedback indicating correct or incorrect reception of downlink transport blocks, channel state information report, scheduling request, etc. Example physical channels in NR include a Physical Broadcast Channel (PBCH) for carrying information from the BCH, a Physical Downlink Shared Channel (PDSCH) for carrying information form the PCH and the DL-SCH, a Physical Downlink Control Channel (PDCCH) for carrying DCI, a Physical Uplink Shared Channel (PUSCH) for carrying information from the UL-SCH and/or UCI, a Physical Uplink Control Channel (PUCCH) for carrying UCI and Physical Random Access Channel (PRACH) for transmission of RACH (e.g., random access preamble).

The PHY layer may also generate physical signals that are not originated from higher layers. As shown in FIG. 5A, example downlink physical signals include Demodulation Reference Signal (DM-RS), Phase Tracking Reference Signal (PT-RS), Channel State Information Reference Signal (CSI-RS), Primary Synchronization Signal (PSS) and Secondary Synchronization Signal (SSS). As shown in FIG. 5B, example uplink physical signals include DM-RS, PT-RS and sounding reference signal (SRS).

As indicated earlier, some of the protocol layers (PHY, MAC, RLC and PDCP) of the control plane of an NR Uu interface, are common between the user plane protocol stack (as shown in FIG. 2A) and the control plane protocol stack (as shown in FIG. 2B). In addition to PHY, MAC, RLC and PDCP, the control plane protocol stack includes the RRC protocol layer and the NAS protocol layer.

The NAS layer, as shown in FIG. 2B, terminates at the UE 200 and the AMF 220 entity of the 5G-C 130. The NAS layer is used for core network related functions and signaling including registration, authentication, location update and session management. The NAS layer uses services from the AS of the Uu interface to transmit the NAS messages.

The RRC layer, as shown in FIG. 2B, operates between the UE 200 and the gNB 210 (more generally NG-RAN 120) and may provide services and functions such as broadcast of system information (SI) related to AS and NAS as well as paging initiated by the 5G-C 130 or NG-RAN 120. In addition, the RRC layer is responsible for establishment, maintenance and release of an RRC connection between the UE 200 and the NG-RAN 120, carrier aggregation configuration (e.g., addition, modification and release), dual connectivity configuration (e.g., addition, modification and release), security related functions, radio bearer configuration/maintenance and release, mobility management (e.g., maintenance and context transfer), UE cell selection and reselection, inter-RAT mobility, QoS management functions, UE measurement reporting and control, radio link failure (RLF) detection and NAS message transfer. The RRC layer uses services from PHY, MAC, RLC and PDCP layers to transmit RRC messages using signaling radio bearers (SRBs). The SRBs are mapped to CCCH logical channel during connection establishment and to DCCH logical channel after connection establishment.

Figure 6:
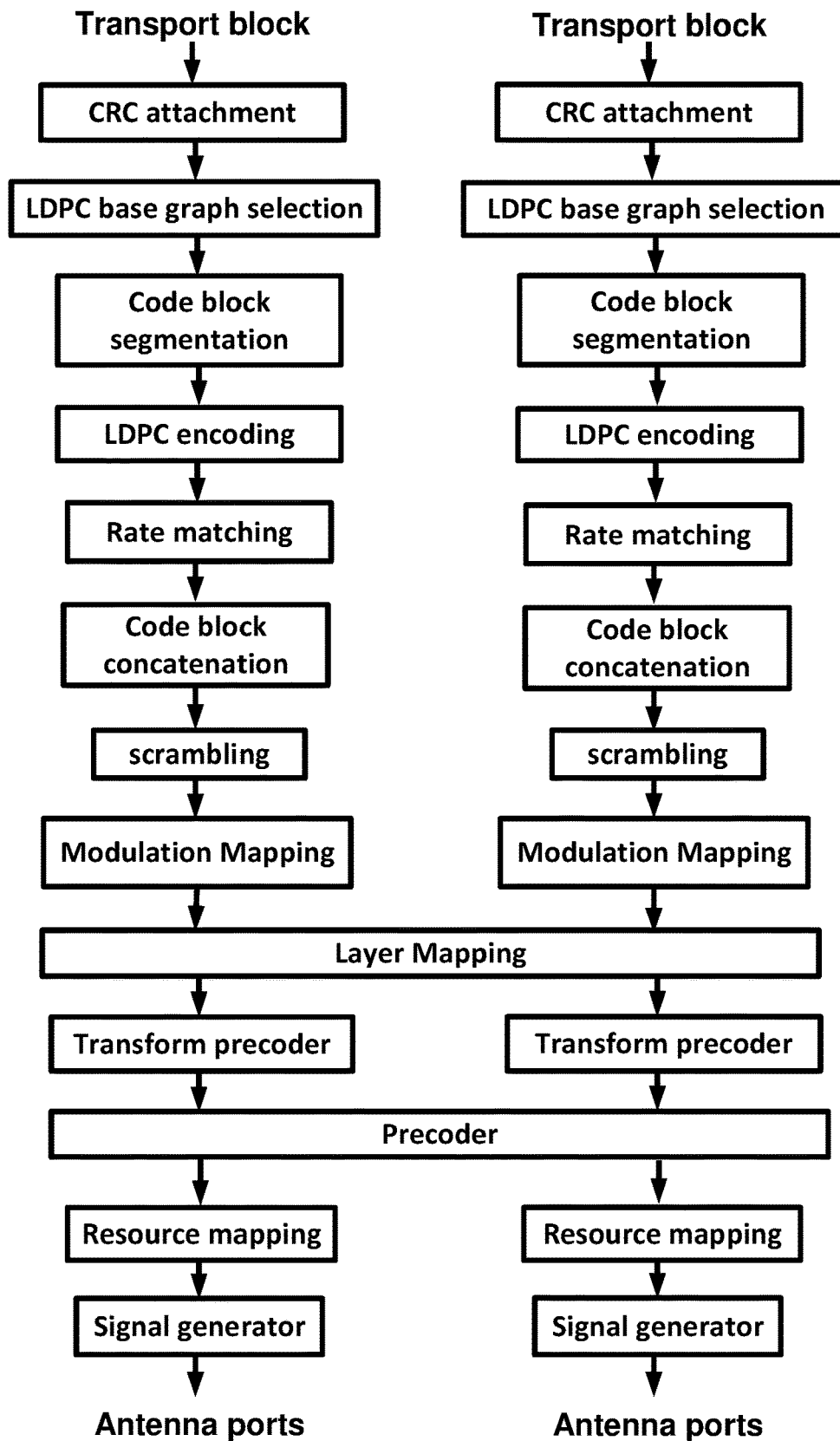
FIG. 6 shows example physical layer processes for signal transmission in accordance with several of various embodiments of the present disclosure.

FIG. 6 shows example physical layer processes for signal transmission in accordance with several of various embodiments of the present disclosure. Data and/or control streams from MAC layer may be encoded/decoded to offer transport and control services over the radio transmission link. For example, one or more (e.g., two as shown in FIG. 6) transport blocks may be received from the MAC layer for transmission via a physical channel (e.g., a physical downlink shared channel or a physical uplink shared channel). A cyclic redundancy check (CRC) may be calculated and attached to a transport block in the physical layer. The CRC calculation may be based on one or more cyclic generator polynomials. The CRC may be used by the receiver for error detection. Following the transport block CRC attachment, a low-density parity check (LDPC) base graph selection may be performed. In example embodiments, two LDPC base graphs may be used wherein a first LDPC base graph may be optimized for small transport blocks and a second LDPC base graph may be optimized for comparatively larger transport blocks.

The transport block may be segmented into code blocks and code block CRC may be calculated and attached to a code block. A code block may be LDPC coded and the LDPC coded blocks may be individually rate matched. The code blocks may be concatenated to create one or more codewords. The contents of a codeword may be scrambled and modulated to generate a block of complex-valued modulation symbols. The modulation symbols may be mapped to a plurality of transmission layers (e.g., multiple-input multiple-output (MIMO) layers) and the transmission layers may be subject to transform precoding and/or precoding. The precoded complex-valued symbols may be mapped to radio resources (e.g., resource elements). The signal generator block may create a baseband signal and up-convert the baseband signal to a carrier frequency for transmission via antenna ports. The signal generator block may employ mixers, filters and/or other radio frequency (RF) components prior to transmission via the antennas. The functions and blocks in FIG. 6 are illustrated as examples and other mechanisms may be implemented in various embodiments.

Figure 7:
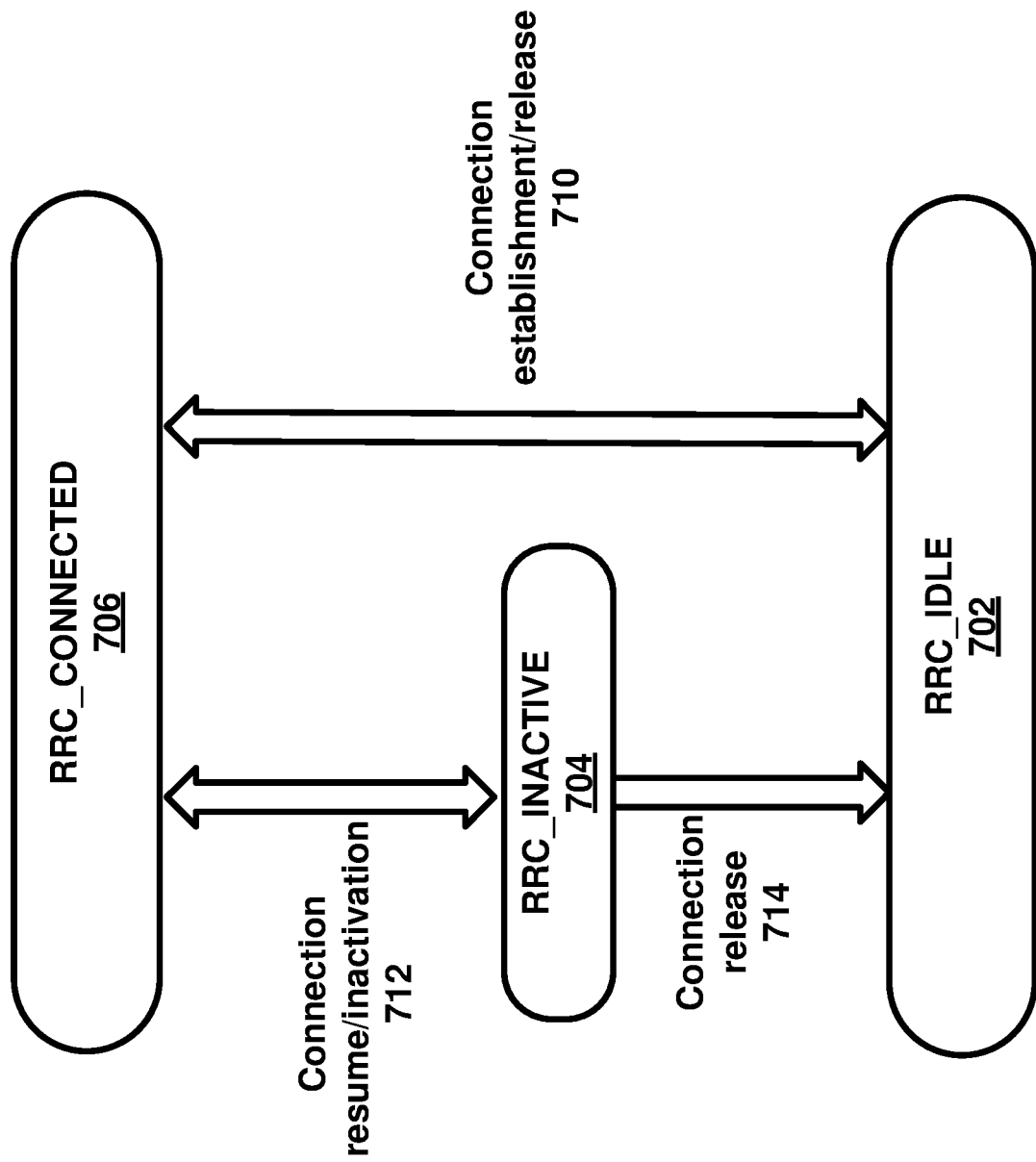
FIG. 7 shows examples of RRC states and RRC state transitions in accordance with several of various embodiments of the present disclosure.

FIG. 7 shows examples of RRC states and RRC state transitions at a UE in accordance with several of various embodiments of the present disclosure. A UE may be in one of three RRC states: RRC_IDLE 702, RRC INACTIVE 704 and RRC_CONNECTED 706. In RRC_IDLE 702 state, no RRC context (e.g., parameters needed for communications between the UE and the network) may be established for the UE in the RAN. In RRC_IDLE 702 state, no data transfer between the UE and the network may take place and uplink synchronization is not maintained. The wireless device may sleep most of the time and may wake up periodically to receive paging messages. The uplink transmission of the UE may be based on a random access process and to enable transition to the RRC_CONNECTED 706 state. The mobility in RRC_IDLE 702 state is through a cell reselection procedure where the UE camps on a cell based on one or more criteria including signal strength that is determined based on the UE measurements.

In RRC_CONNECTED 706 state, the RRC context is established and both the UE and the RAN have necessary parameters to enable communications between the UE and the network. In the RRC_CONNECTED 706 state, the UE is configured with an identity known as a Cell Radio Network Temporary Identifier (C-RNTI) that is used for signaling purposes (e.g., uplink and downlink scheduling, etc.) between the UE and the RAN. The wireless device mobility in the RRC_CONNECTED 706 state is managed by the RAN. The wireless device provides neighboring cells and/or current serving cell measurements to the network and the network may make hand over decisions. Based on the wireless device measurements, the current serving base station may send a handover request message to a neighboring base station and may send a handover command to the wireless device to handover to a cell of the neighboring base station. The transition of the wireless device from the RRC_IDLE 702 state to the RRC_CONNECTED 706 state or from the RRC_CONNECTED 706 state to the RRC_IDLE 702 state may be based on connection establishment and connection release procedures (shown collectively as connection establishment/release 710 in FIG. 7).

To enable a faster transition to the RRC_CONNECTED 706 state (e.g., compared to transition from RRC_IDLE 702 state to RRC_CONNECTED 706 state), an RRC_INACTIVE 704 state is used for an NR UE wherein, the RRC context is kept at the UE and the RAN. The transition from the RRC_INACTIVE 704 state to the RRC_CONNECTED 706 state is handled by RAN without CN signaling. Similar to the RRC_IDLE 702 state, the mobility in RRC_INACTIVE 704 state is based on a cell reselection procedure without involvement from the network. The transition of the wireless device from the RRC_INACTIVE 704 state to the RRC_CONNECTED 706 state or from the RRC_CONNECTED 706 state to the RRC_INACTIVE 704 state may be based on connection resume and connection inactivation procedures (shown collectively as connection resume/inactivation 712 in FIG. 7). The transition of the wireless device from the RRC_INACTIVE 704 state to the RRC_IDLE 702 state may be based on a connection release 714 procedure as shown in FIG. 7.

In NR, Orthogonal Frequency Division Multiplexing (OFDM), also called cyclic prefix OFDM (CP-OFDM), is the baseline transmission scheme in both downlink and uplink of NR and the Discrete Fourier Transform (DFT) spread OFDM (DFT-s-OFDM) is a complementary uplink transmission in addition to the baseline OFDM scheme. OFDM is multi-carrier transmission scheme wherein the transmission bandwidth may be composed of several narrowband sub-carriers. The subcarriers are modulated by the complex valued OFDM modulation symbols resulting in an OFDM signal. The complex valued OFDM modulation symbols are obtained by mapping, by a modulation mapper, the input data (e.g., binary digits) to different points of a modulation constellation diagram. The modulation constellation diagram depends on the modulation scheme. NR may use different types of modulation schemes including Binary Phase Shift Keying (BPSK), π/2-BPSK, Quadrature Phase Shift Keying (QPSK), 16 Quadrature Amplitude Modulation (16 QAM), 64 QAM and 256 QAM. Different and/or higher order modulation schemes (e.g., M-QAM in general) may be used. An OFDM signal with N subcarriers may be generated by processing N subcarriers in parallel for example by using Inverse Fast Fourier Transform (IFFT) processing. The OFDM receiver may use FFT processing to recover the transmitted OFDM modulation symbols. The subcarrier spacing of subcarriers in an OFDM signal is inversely proportional to an OFDM modulation symbol duration. For example, for a 15 KHz subcarrier spacing, duration of an OFDM signal is nearly 66.7 μs. To enhance the robustness of OFDM transmission in time dispersive channels, a cyclic prefix (CP) may be inserted at the beginning of an OFDM symbol. For example, the last part of an OFDM symbol may be copied and inserted at the beginning of an OFDM symbol. The CP insertion enhanced the OFDM transmission scheme by preserving subcarrier orthogonality in time dispersive channels.

In NR, different numerologies may be used for OFDM transmission. A numerology of OFDM transmission may indicate a subcarrier spacing and a CP duration for the OFDM transmission. For example, a subcarrier spacing in NR may generally be a multiple of 15 KHz and expressed as $\Delta f = 2^\mu \cdot 15$ KHz ($\mu = 0, 1, 2, \ldots$). Example subcarrier spacings used in NR include 15 KHz ($\mu=0$), 30 KHz ($\mu=1$), 60 KHz ($\mu=2$), 120 KHz ($\mu=3$) and 240 KHz ($\mu=4$). As discussed before, a duration of OFDM symbol is inversely proportional to the subcarrier spacing and therefor OFDM symbol duration may depend on the numerology (e.g., the μ value).

Figure 8:
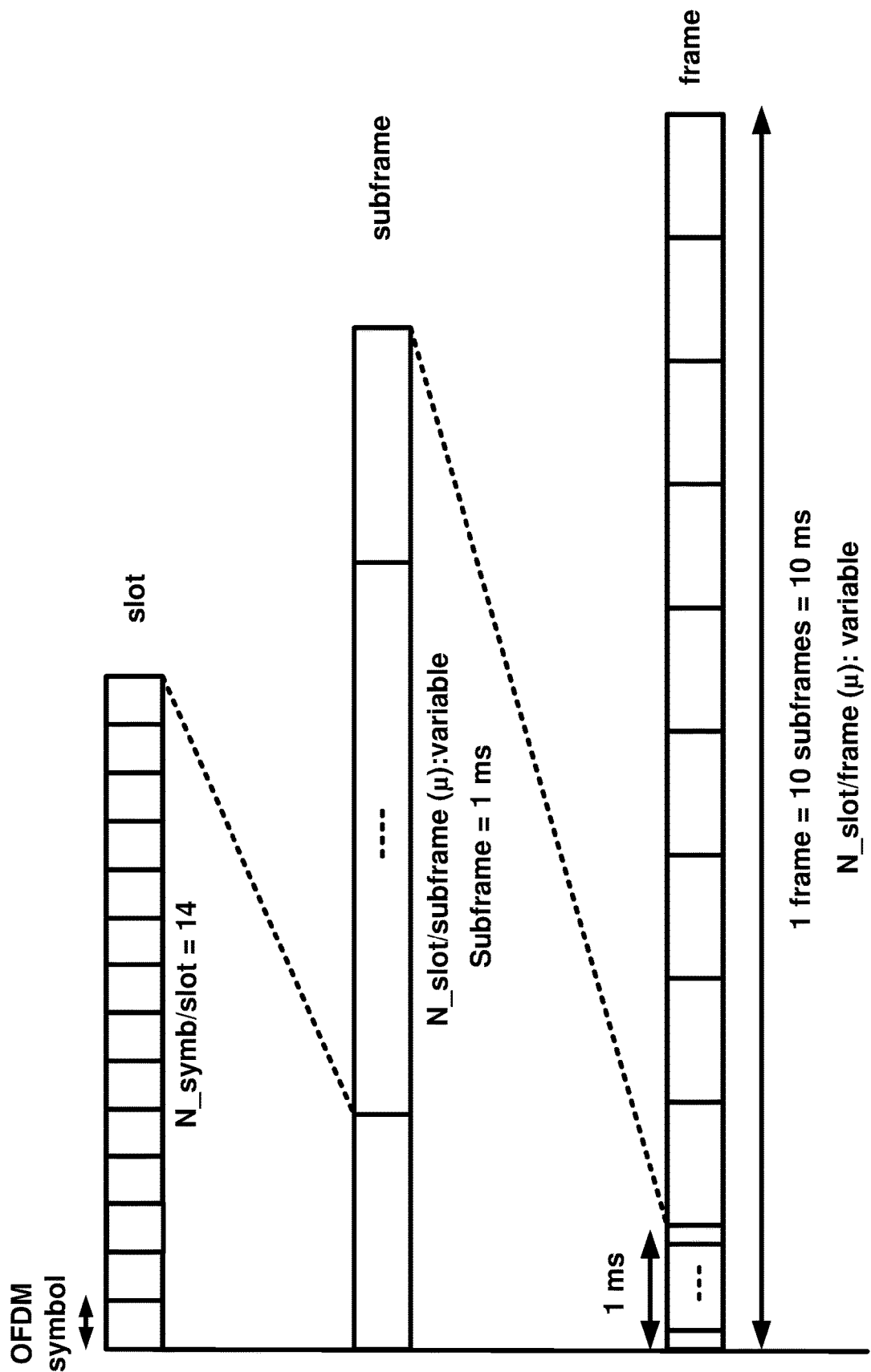
FIG. 8 shows an example time domain transmission structure in NR by grouping OFDM symbols into slots, subframes and frames in accordance with several of various embodiments of the present disclosure.

FIG. 8 shows an example time domain transmission structure in NR wherein OFDM symbols are grouped into slots, subframes and frames in accordance with several of various embodiments of the present disclosure. A slot is a group of $N_{symb}^{slot}$ OFDM symbols, wherein the $N_{symb}^{slot}$ may have a constant value (e.g., 14). Since different numerologies results in different OFDM symbol durations, duration of a slot may also depend on the numerology and may be variable. A subframe may have a duration of 1 ms and may be composed of one or more slots, the number of which may depend on the slot duration. The number of slots per subframe is therefore a function of μ and may generally be expressed as $N_{slot}^{subframe,\mu}$ and the number of symbols per subframe may be expressed as $N_{symb}^{subframe,\mu} = N_{slot}^{subframe,\mu}$. A frame may have a duration of 10 ms and may consist of 10 subframes. The number of slots per frame may depend on the numerology and therefore may be variable. The number of slots per frame may generally be expressed as $N_{slot}^{frame,\mu}$.

An antenna port may be defined as a logical entity such that channel characteristics over which a symbol on the antenna port is conveyed may be inferred from the channel characteristics over which another symbol on the same antenna port is conveyed. For example, for DM-RS associated with a PDSCH, the channel over which a PDSCH symbol on an antenna port is conveyed may be inferred from the channel over which a DM-RS symbol on the same antenna port is conveyed, for example, if the two symbols are within the same resource as the scheduled PDSCH and/or in the same slot and/or in the same precoding resource block group (PRG). For example, for DM-RS associated with a PDCCH, the channel over which a PDCCH symbol on an antenna port is conveyed may be inferred from the channel over which a DM-RS symbol on the same antenna port is conveyed if, for example, the two symbols are within resources for which the UE may assume the same precoding being used. For example, for DM-RS associated with a PBCH, the channel over which a PBCH symbol on one antenna port is conveyed may be inferred from the channel over which a DM-RS symbol on the same antenna port is conveyed if, for example, the two symbols are within a SS/PBCH block transmitted within the same slot, and with the same block index. The antenna port may be different from a physical antenna. An antenna port may be associated with an antenna port number and different physical channels may correspond to different ranges of antenna port numbers.

Figure 9:
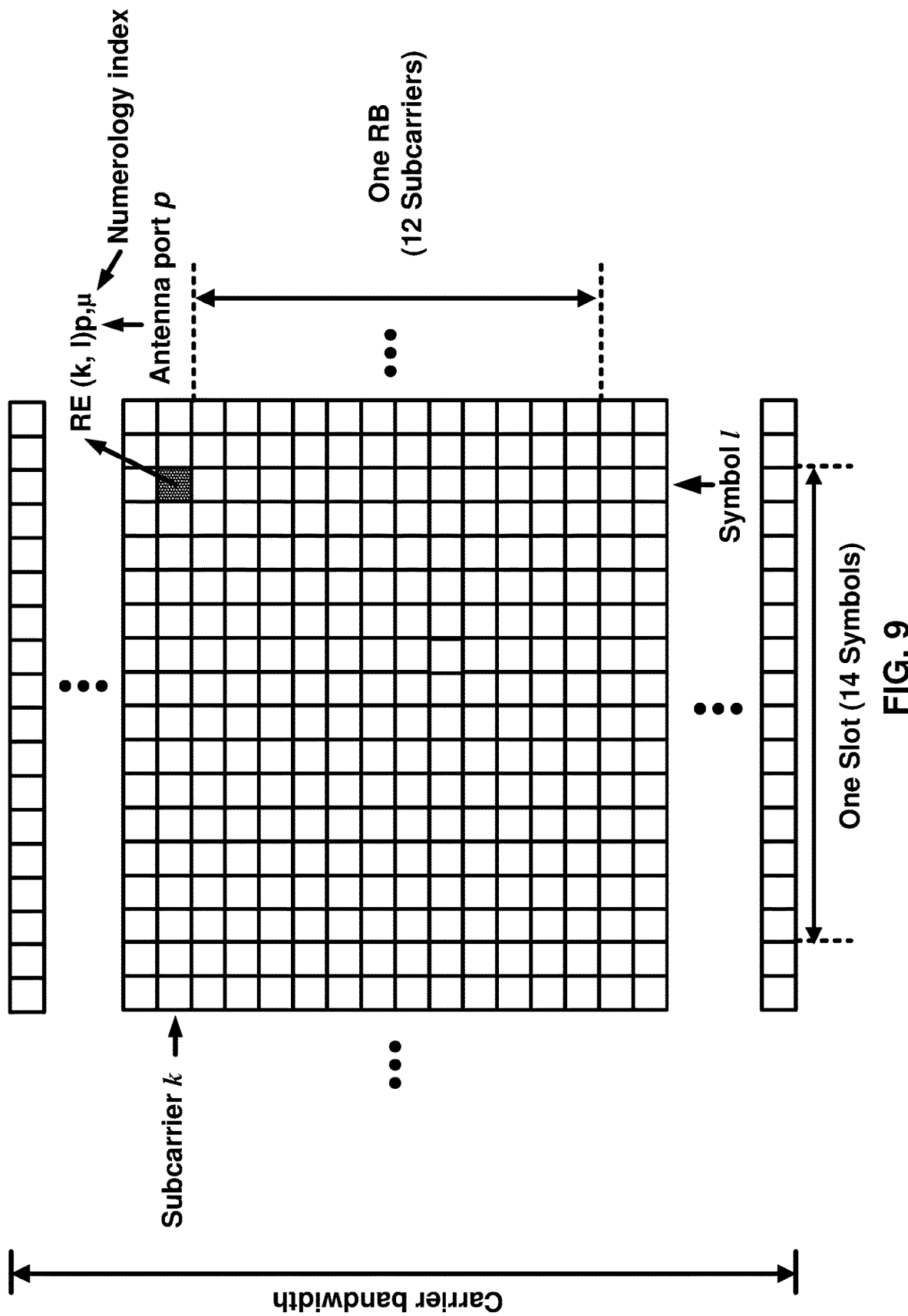
FIG. 9 shows an example of time-frequency resource grid in accordance with several of various embodiments of the present disclosure.

FIG. 9 shows an example of time-frequency resource grid in accordance with several of various embodiments of the present disclosure. The number of subcarriers in a carrier bandwidth may be based on the numerology of OFDM transmissions in the carrier. A resource element, corresponding to one symbol duration and one subcarrier, may be the smallest physical resource in the time-frequency grid. A resource element (RE) for antenna port p and subcarrier spacing configuration μ may be uniquely identified by $(k,l)_{p,\mu}$ where k is the index of a subcarrier in the frequency domain and l may refer to the symbol position in the time domain relative to some reference point. A resource block may be defined as $N_{SC}^{RB}=12$ subcarriers. Since subcarrier spacing depends on the numerology of OFDM transmission, the frequency domain span of a resource block may be variable and may depend on the numerology. For example, for a subcarrier spacing of 15 KHz (e.g., μ=0), a resource block may be 180 KHz and for a subcarrier spacing of 30 KHz (e.g., μ=1), a resource block may be 360 KHz.

With large carrier bandwidths defined in NR and due to limited capabilities for some UEs (e.g., due to hardware limitations), a UE may not support an entire carrier bandwidth. Receiving on the full carrier bandwidth may imply high energy consumption. For example, transmitting downlink control channels on the full downlink carrier bandwidth may result in high power consumption for wide carrier bandwidths. NR may use a bandwidth adaptation procedure to dynamically adapt the transmit and receive bandwidths. The transmit and receive bandwidth of a UE on a cell may be smaller than the bandwidth of the cell and may be adjusted. For example, the width of the transmit and/or receive bandwidth may change (e.g., shrink during period of low activity to save power); the location of the transmit and/or receive bandwidth may move in the frequency domain (e.g., to increase scheduling flexibility); and the subcarrier spacing of the transmit or receive bandwidth may change (e.g., to allow different services). A subset of the cell bandwidth may be referred to as a Bandwidth Part (BWP) and bandwidth adaptation may be achieved by configuring the UE with one or more BWPs. The base station may configure a UE with a set of downlink BWPs and a set of uplink BWPs. A BWP may be characterized by a numerology (e.g., subcarrier spacing and cyclic prefix) and a set of consecutive resource blocks in the numerology of the BWP. One or more first BWPs of the one or more BWPs of the cell may be active at a time. An active BWP may be an active downlink BWP or an active uplink BWP.

Figure 10:
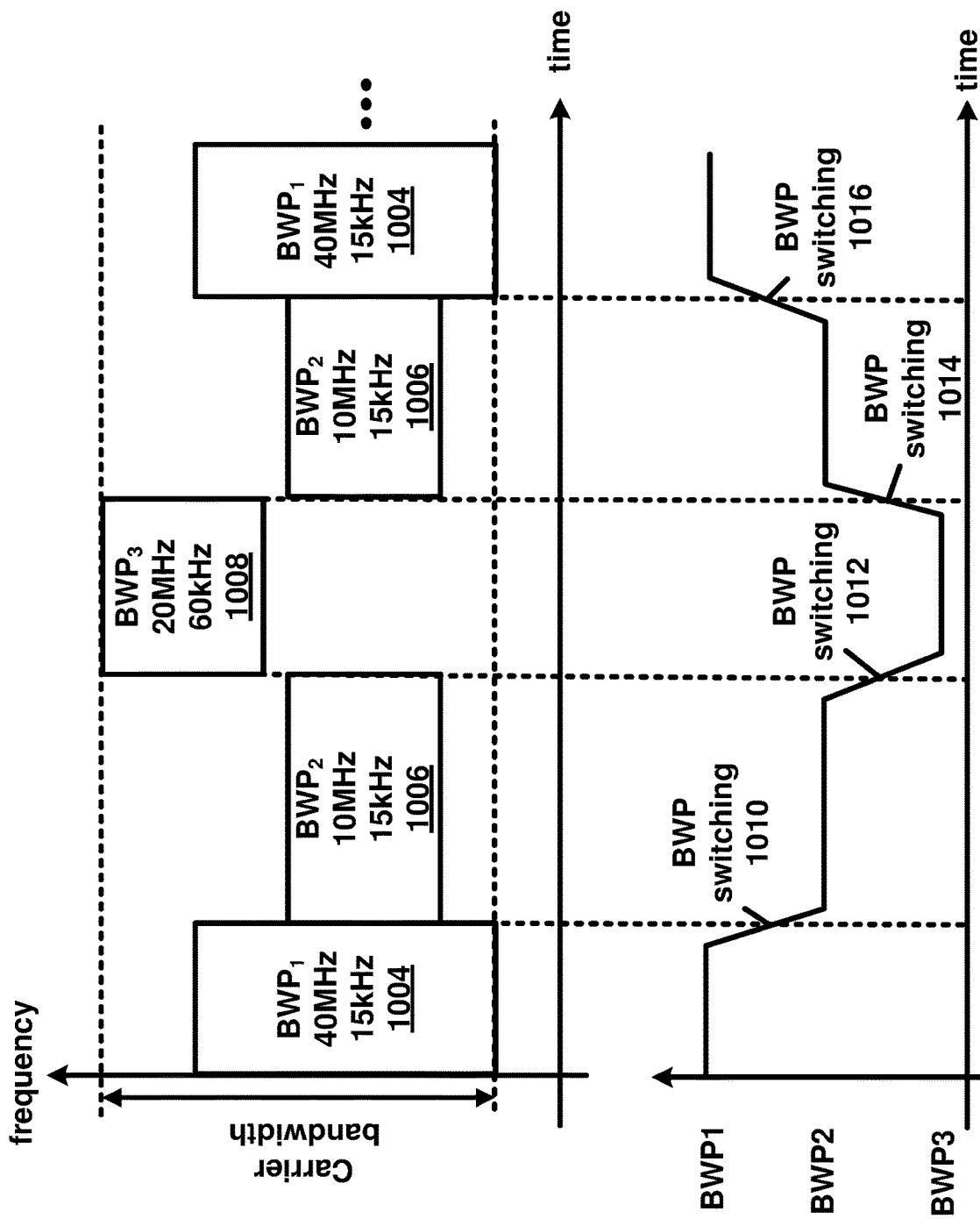
FIG. 10 shows example adaptation and switching of bandwidth parts in accordance with several of various embodiments of the present disclosure.

FIG. 10 shows an example of bandwidth part adaptation and switching. In this example, three BWPs ($BWP_1$ 1004, $BWP_2$ 1006 and $BWP_3$ 1008) are configured for a UE on a carrier bandwidth. The $BWP_1$ is configured with a bandwidth of 40 MHz and a numerology with subcarrier spacing of 15 KHz, the $BWP_2$ is configured with a bandwidth of 10 MHz and a numerology with subcarrier spacing of 15 KHz and the $BWP_3$ is configured with a bandwidth of 20 MHz and a subcarrier spacing of 60 KHz. The wireless device may switch from a first BWP (e.g., $BWP_1$) to a second BWP (e.g., $BWP_2$). An active BWP of the cell may change from the first BWP to the second BWP in response to the BWP switching.

The BWP switching (e.g., BWP switching 1010, BWP switching 1012, BWP switching 1014, or BWP switching 1016 in FIG. 10) may be based on a command from the base station. The command may be a DCI comprising scheduling information for the UE in the second BWP. In case of uplink BWP switching, the first BWP and the second BWP may be uplink BWPs and the scheduling information may be an uplink grant for uplink transmission via the second BWP. In case of downlink BWP switching, the first BWP and the second BWP may be downlink BWPs and the scheduling information may be a downlink assignment for downlink reception via the second BWP.

The BWP switching (e.g., BWP switching 1010, BWP switching 1012, BWP switching 1014, or BWP switching 1016 in FIG. 10) may be based on an expiry of a timer. The base station may configure a wireless device with a BWP inactivity timer and the wireless device may switch to a default BWP (e.g., default downlink BWP) based on the expiry of the BWP inactivity timer. The expiry of the BWP inactivity timer may be an indication of low activity on the current active downlink BWP. The base station may configure the wireless device with the default downlink BWP. If the base station does not configure the wireless device with the default BWP, the default BWP may be an initial downlink BWP. The initial active BWP may be the BWP that the wireless device receives scheduling information for remaining system information upon transition to an RRC_CONNECTED state.

A wireless device may monitor a downlink control channel of a downlink BWP. For example, the UE may monitor a set of PDCCH candidates in configured monitoring occasions in one or more configured COntrol REsource SETs (CORESETs) according to the corresponding search space configurations. A search space configuration may define how/where to search for PDCCH candidates. For example, the search space configuration parameters may comprise a monitoring periodicity and offset parameter indicating the slots for monitoring the PDCCH candidates. The search space configuration parameters may further comprise a parameter indicating a first symbol with a slot within the slots determined for monitoring PDCCH candidates. A search space may be associated with one or more CORESETs and the search space configuration may indicate one or more identifiers of the one or more CORESETs. The search space configuration parameters may further indicate that whether the search space is a common search space or a UE-specific search space. A common search space may be monitored by a plurality of wireless devices and a UE-specific search space may be dedicated to a specific UE.

Figure 11A:
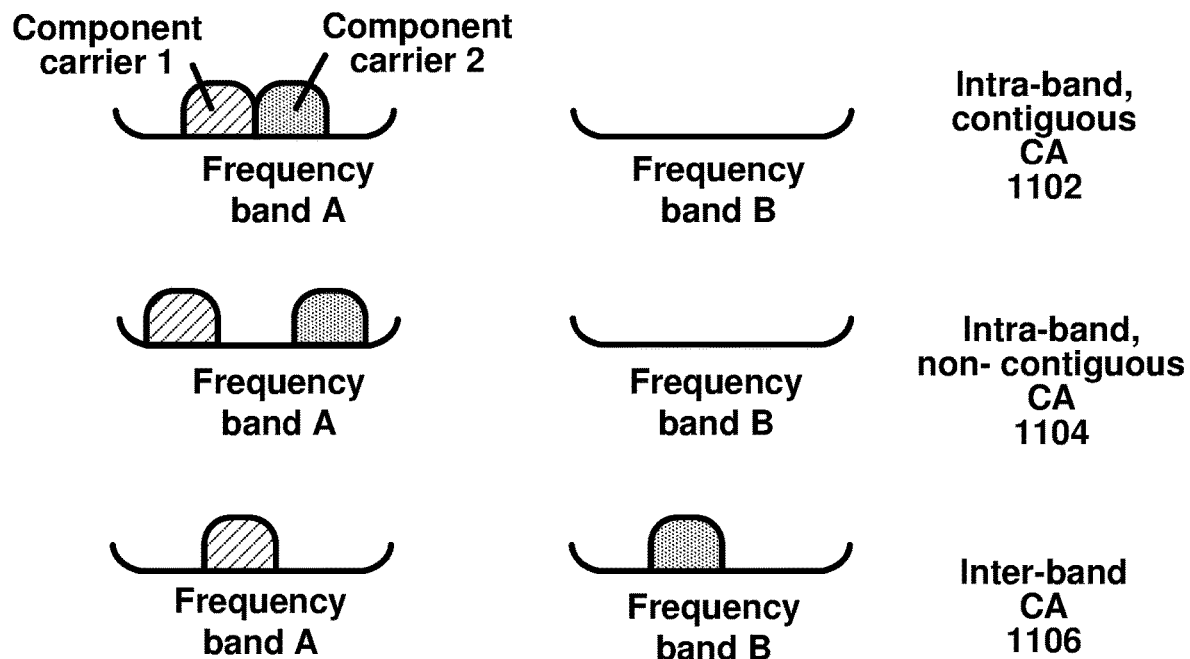
FIG. 11A shows example arrangements of carriers in carrier aggregation in accordance with several of various embodiments of the present disclosure.

FIG. 11A shows example arrangements of carriers in carrier aggregation in accordance with several of various embodiments of the present disclosure. With carrier aggregation, multiple NR component carriers (CCs) may be aggregated. Downlink transmissions to a wireless device may take place simultaneously on the aggregated downlink CCs resulting in higher downlink data rates. Uplink transmissions from a wireless device may take place simultaneously on the aggregated uplink CCs resulting in higher uplink data rates. The component carriers in carrier aggregation may be on the same frequency band (e.g., intra-band carrier aggregation) or on different frequency bands (e.g., inter-band carrier aggregation). The component carriers may also be contiguous or non-contiguous. This results in three possible carrier aggregation scenarios, intra-band contiguous CA 1102, intra-band non-contiguous CA 1104 and inter-band CA 1106 as shown in FIG. 11A. Depending on the UE capability for carrier aggregation, a UE may transmit and/or receive on multiple carriers or for a UE that is not capable of carrier aggregation, the UE may transmit and/or receive on one component carrier at a time. In this disclosure, the carrier aggregation is described using the term cell and a carrier aggregation capable UE may transmit and/or receive via multiple cells.

In carrier aggregation, a UE may be configured with multiple cells. A cell of the multiple cells configured for the UE may be referred to as a Primary Cell (PCell). The PCell may be the first cell that the UE is initially connected to. One or more other cells configured for the UE may be referred to as Secondary Cells (SCells). The base station may configure a UE with multiple SCells. The configured SCells may be deactivated upon configuration and the base station may dynamically activate or deactivate one or more of the configured SCells based on traffic and/or channel conditions. The base station may activate or deactivate configured SCells using a SCell Activation/Deactivation MAC CE. The SCell Activation/Deactivation MAC CE may comprise a bitmap, wherein each bit in the bitmap may correspond to a SCell and the value of the bit indicates an activation status or deactivation status of the SCell.

An SCell may also be deactivated in response to expiry of a SCell deactivation timer of the SCell. The expiry of an SCell deactivation timer of an SCell may be an indication of low activity (e.g., low transmission or reception activity) on the SCell. The base station may configure the SCell with an SCell deactivation timer. The base station may not configure an SCell deactivation timer for an SCell that is configured with PUCCH (also referred to as a PUCCH SCell). The configuration of the SCell deactivation timer may be per configured SCell and different SCells may be configured with different SCell deactivation timer values. The SCell deactivation timer may be restarted based on one or more criteria including reception of downlink control information on the SCell indicating uplink grant or downlink assignment for the SCell or reception of downlink control information on a scheduling cell indicating uplink grant or downlink assignment for the SCell or transmission of a MAC PDU based on a configured uplink grant or reception of a configured downlink assignment.

A PCell for a UE may be an SCell for another UE and a SCell for a UE may be PCell for another UE. The configuration of PCell may be UE-specific. One or more SCells of the multiple SCells configured for a UE may be configured as downlink-only SCells, e.g., may only be used for downlink reception and may not be used for uplink transmission. In case of self-scheduling, the base station may transmit signaling for uplink grants and/or downlink assignments on the same cell that the corresponding uplink or downlink transmission takes place. In case of cross-carrier scheduling, the base station may transmit signaling for uplink grants and/or downlink assignments on a cell different from the cell that the corresponding uplink or downlink transmission takes place.

Figure 11B:
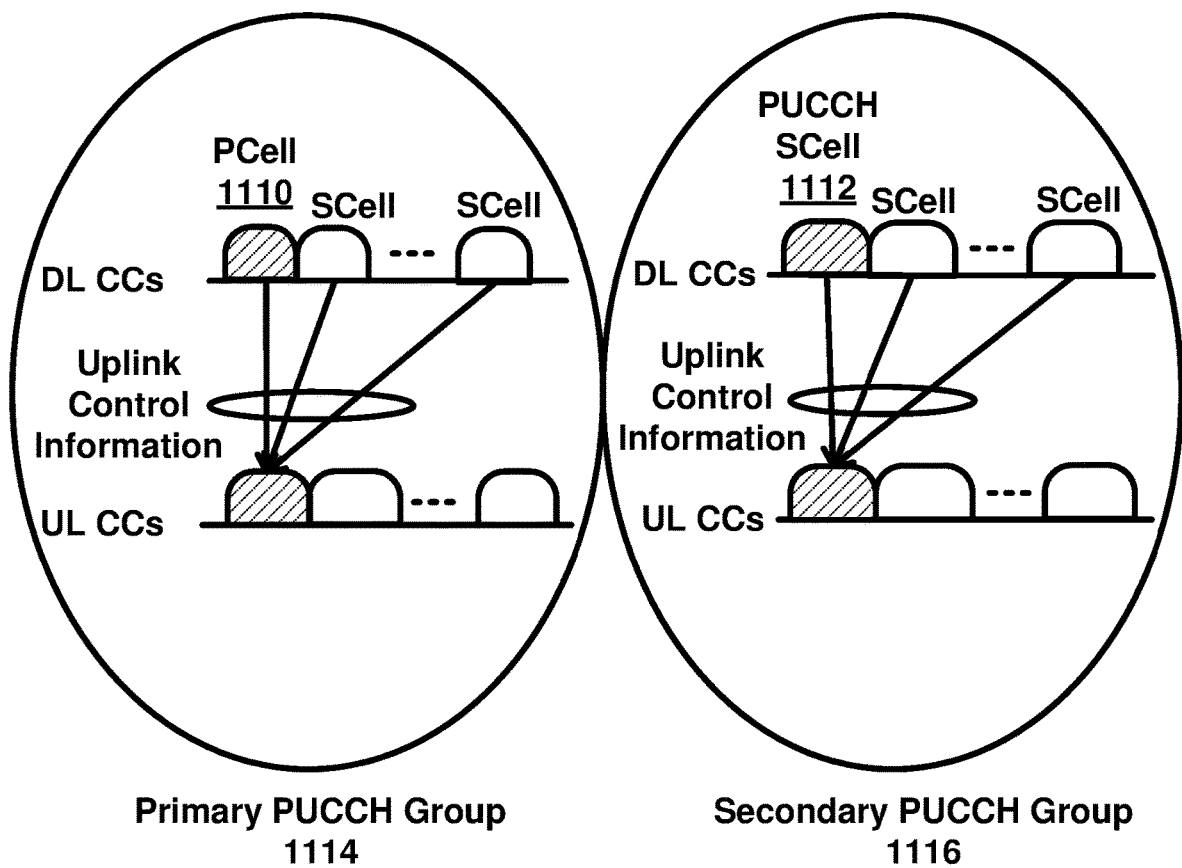
FIG. 11B shows examples of uplink control channel groups in accordance with several of various embodiments of the present disclosure.

FIG. 11B shows examples of uplink control channel groups in accordance with several of various embodiments of the present disclosure. A base station may configure a UE with multiple PUCCH groups wherein a PUCCH group comprises one or more cells. For example, as shown in FIG. 11B, the base station may configure a UE with a primary PUCCH group 1114 and a secondary PUCCH group 1116. The primary PUCCH group may comprise the PCell 1110 and one or more first SCells. First UCI corresponding to the PCell and the one or more first SCells of the primary PUCCH group may be transmitted by the PUCCH of the PCell. The first UCI may be, for example, HARQ feedback for downlink transmissions via downlink CCs of the PCell and the one or more first SCells. The secondary PUCCH group may comprise a PUCCH SCell and one or more second SCells. Second UCI corresponding to the PUCCH SCell and the one or more second SCells of the secondary PUCCH group may be transmitted by the PUCCH of the PUCCH SCell. The second UCI may be, for example, HARQ feedback for downlink transmissions via downlink CCs of the PUCCH SCell and the one or more second SCells.

Figures 12A, 12B, 12C:
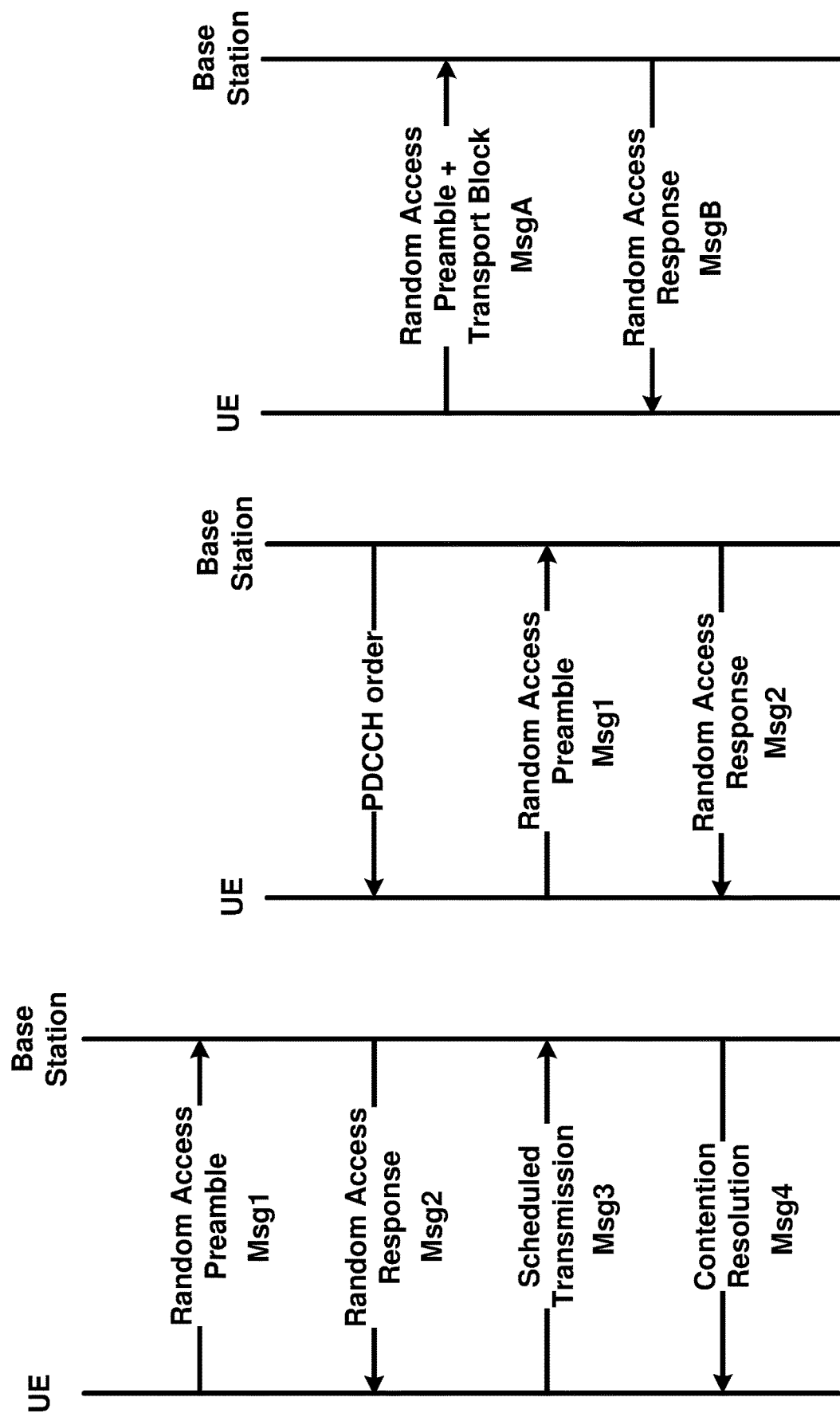
FIG. 12A, FIG. 12B and FIG. 12C show example random access processes in accordance with several of various embodiments of the present disclosure.

FIG. 12A, FIG. 12B and FIG. 12C show example random access processes in accordance with several of various embodiments of the present disclosure. FIG. 12A shows an example of four step contention-based random access (CBRA) procedure. The four-step CBRA procedure includes exchanging four messages between a UE and a base station. Msg1 may be for transmission (or retransmission) of a random access preamble by the wireless device to the base station. Msg2 may be the random access response (RAR) by the base station to the wireless device. Msg3 is the scheduled transmission based on an uplink grant indicated in Msg2 and Msg4 may be for contention resolution.

The base station may transmit one or more RRC messages comprising configuration parameters of the random access parameters. The random access parameters may indicate radio resources (e.g., time-frequency resources) for transmission of the random access preamble (e.g., Msg1), configuration index, one or more parameters for determining the power of the random access preamble (e.g., a power ramping parameter, a preamble received target power, etc.), a parameter indicating maximum number of preamble transmission, RAR window for monitoring RAR, cell-specific random access parameters and UE specific random access parameters. The UE-specific random access parameters may indicate one or more PRACH occasions for random access preamble (e.g., Msg1) transmissions. The random access parameters may indicate association between the PRACH occasions and one or more reference signals (e.g., SSB or CSI-RS). The random access parameters may further indicate association between the random access preambles and one or more reference signals (e.g., SBB or CSI-RS). The UE may use one or more reference signals (e.g., SSB(s) or CSI-RS(s)) and may determine a random access preamble to use for Msg1 transmission based on the association between the random access preambles and the one or more reference signals. The UE may use one or more reference signals (e.g., SSB(s) or CSI-RS(s)) and may determine the PRACH occasion to use for Msg1 transmission based on the association between the PRACH occasions and the reference signals. The UE may perform a retransmission of the random access preamble if no response is received with the RAR window following the transmission of the preamble. UE may use a higher transmission power for retransmission of the preamble. UE may determine the higher transmission power of the preamble based on the power ramping parameter.

Msg2 is for transmission of RAR by the base station. Msg2 may comprise a plurality of RARs corresponding to a plurality of random access preambles transmitted by a plurality of UEs. Msg2 may be associated with a random access temporary radio identifier (RA-RNTI) and may be received in a common search space of the UE. The RA-RNTI may be based on the PRACH occasion (e.g., time and frequency resources of a PRACH) in which a random access preamble is transmitted. RAR may comprise a timing advance command for uplink timing adjustment at the UE, an uplink grant for transmission of Msg3 and a temporary C-RNTI. In response to the successful reception of Msg2, the UE may transmit the Msg3. Msg3 and Msg4 may enable contention resolution in case of CBRA. In a CBRA, a plurality of UEs may transmit the same random access preamble and may consider the same RAR as being corresponding to them. UE may include a device identifier in Msg3 (e.g., a C-RNTI, temporary C-RNTI or other UE identity). Base station may transmit the Msg4 with a PDSCH and UE may assume that the contention resolution is successful in response to the PDSCH used for transmission of Msg4 being associated with the UE identifier included in Msg3.

FIG. 12B shows an example of a contention-free random access (CFRA) process. Msg 1 (random access preamble) and Msg 2 (random access response) in FIG. 12B for CFRA may be analogous to Msg 1 and Msg 2 in FIG. 12A for CBRA. In an example, the CFRA procedure may be initiated in response to a PDCCH order from a base station. The PDCCH order for initiating the CFRA procedure by the wireless device may be based on a DCI having a first format (e.g., format 1_0). The DCI for the PDCCH order may comprise a random access preamble index, an UL/SUL indicator indicating an uplink carrier of a cell (e.g., normal uplink carrier or supplementary uplink carrier) for transmission of the random access preamble, a SS/PBCH index indicating the SS/PBCH that may be used to determine a RACH occasion for PRACH transmission, a PRACH mask index indicating the RACH occasion associated with the SS/PBCH indicated by the SS/PBCH index for PRACH transmission, etc. In an example, the CFRA process may be started in response to a beam failure recovery process. The wireless device may start the CFRA for the beam failure recovery without a command (e.g., PDCCH order) from the base station and by using the wireless device dedicated resources.

FIG. 12C shows an example of a two-step random access process comprising two messages exchanged between a wireless device and a base station. Msg A may be transmitted by the wireless device to the base station and may comprise one or more transmissions of a preamble and/or one or more transmissions of a transport block. The transport block in Msg A and Msg 3 in FIG. 12A may have similar and/or equivalent contents. The transport block of Msg A may comprise data and control information (e.g., SR, HARQ feedback, etc.). In response to the transmission of Msg A, the wireless device may receive Msg B from the base station. Msg B in FIG. 12C and Msg 2 (e.g., RAR) illustrated in FIGS. 12A and 12B may have similar and/or equivalent content.

The base station may periodically transmit synchronization signals (SSs), e.g., primary SS (PSS) and secondary SS (SSS) along with PBCH on each NR cell. The PSS/SSS together with PBCH is jointly referred to as a SS/PBCH block. The SS/PBCH block enables a wireless device to find a cell when entering to the mobile communications network or find new cells when moving within the network. The SS/PBCH block spans four OFDM symbols in time domain. The PSS is transmitted in the first symbol and occupies 127 subcarriers in frequency domain. The SSS is transmitted in the third OFDM symbol and occupies the same 127 subcarriers as the PSS. There are eight and nine empty subcarriers on each side of the SSS. The PBCH is transmitted on the second OFDM symbol occupying 240 subcarriers, the third OFDM symbol occupying 48 subcarriers on each side of the SSS, and on the fourth OFDM symbol occupying 240 subcarriers. Some of the PBCH resources indicated above may be used for transmission of the demodulation reference signal (DMRS) for coherent demodulation of the PBCH. The SS/PBCH block is transmitted periodically with a period ranging from 5 ms to 160 ms. For initial cell search or for cell search during inactive/idle state, a wireless device may assume that that the SS/PBCH block is repeated at least every 20 ms.

In NR, transmissions using of antenna arrays, with many antenna elements, and beamforming plays an important role specially in higher frequency bands. Beamforming enables higher capacity by increasing the signal strength (e.g., by focusing the signal energy in a specific direction) and by lowering the amount interference received at the wireless devices. The beamforming techniques may generally be divided to analog beamforming and digital beamforming techniques. With digital beamforming, signal processing for beamforming is carried out in the digital domain before digital-to-analog conversion and detailed control of both amplitude and phase of different antenna elements may be possible. With analog beamforming, the signal processing for beamforming is carried out in the analog domain and after the digital to analog conversion. The beamformed transmissions may be in one direction at a time. For example, the wireless devices that are in different directions relative to the base station may receive their downlink transmissions at different times. For analog receiver-side beamforming, the receiver may focus its receiver beam in one direction at a time.

In NR, the base station may use beam sweeping for transmission of SS/PBCH blocks. The SS/PBCH blocks may be transmitted in different beams using time multiplexing. The set of SS/PBCH blocks that are transmitted in one beam sweep may be referred to as a SS/PBCH block set. The period of PBCH/SSB block transmission may be a time duration between a SS/PBCH block transmission in a beam and the next SS/PBCH block transmission in the same beam. The period of SS/PBCH block is, therefore, also the period of the SS/PBCH block set.

Figure 13A:
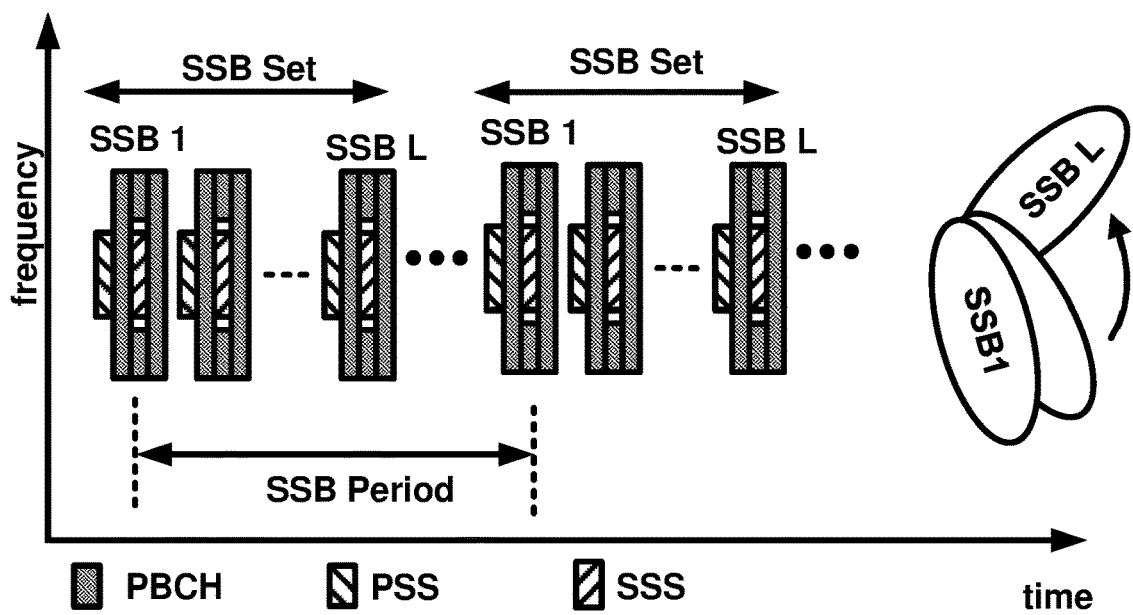
FIG. 13A shows example time and frequency structure of SSBs and their associations with beams in accordance with several of various embodiments of the present disclosure.

FIG. 13A shows example time and frequency structure of SS/PBCH blocks and their associations with beams in accordance with several of various embodiments of the present disclosure. In this example, a SS/PBCH block (also referred to as SSB) set comprise L SSBs wherein an SSB in the SSB set is associated with (e.g., transmitted in) one of L beams of a cell. The transmission of SBBs of an SSB set may be confined within a 5 ms interval, either in a first half-frame or a second half-frame of a 10 ms frame. The number of SSBs in an SSB set may depend on the frequency band of operation. For example, the number of SSBs in a SSB set may be up to four SSBs in frequency bands below 3 GHz enabling beam sweeping of up to four beams, up to eight SSBs in frequency bands between 3 GHz and 6 GHz enabling beam sweeping of up to eight beams, and up to sixty four SSBs in higher frequency bands enabling beam sweeping of up to sixty four beams. The SSs of an SSB may depend on a physical cell identity (PCI) of the cell and may be independent of which beam of the cell is used for transmission of the SSB. The PBCH of an SSB may indicate a time index parameter and the wireless device may determine the relative position of the SSB within the SSB set using the time index parameter. The wireless device may use the relative position of the SSB within an SSB set for determining the frame timing and/or determining RACH occasions for a random access process.

A wireless device entering the mobile communications network may first search for the PSS. After detecting the PSS, the wireless device may determine the synchronization up to the periodicity of the PSS. By detecting the PSS, the wireless device may determine the transmission timing of the SSS. The wireless device may determine the PCI of the cell after detecting the SSS. The PBCH of a SS/PBCH block is a downlink physical channel that carries the MIB. The MIB may be used by the wireless device to obtain remaining system information (RMSI) that is broadcast by the network. The RMSI may include System Information Block 1 (SIB1) that contains information required for the wireless device to access the cell.

As discussed earlier, the wireless device may determine a time index parameter from the SSB. The PBCH comprises a half-frame parameter indicating whether the SSB is in the first 5 ms half or the second 5 ms half of a 10 ms frame. The wireless device may determine the frame boundary using the time index parameter and the half-frame parameter. In addition, the PBCH may comprise a parameter indicating the system frame number (SFN) of the cell.

The base station may transmit CSI-RS and a UE may measure the CSI-RS to obtain channel state information (CSI). The base station may configure the CSI-RS in a UE-specific manner. In some scenarios, same set of CSI-RS resources may be configured for multiple UEs and one or more resource elements of a CSI-RS resource may be shared among multiple UEs. A CSI-RS resource may be configured such that it does not collide with a CORESET configured for the wireless device and/or with a DMRS of a PDSCH scheduled for the wireless device and/or transmitted SSBs. The UE may measure one or more CSI-RSs configured for the UE and may generate a CSI report based on the CSI-RS measurements and may transmit the CSI report to the base station for scheduling, link adaptation and/or other purposes.

NR supports flexible CSI-RS configurations. A CSI-RS resource may be configured with single or multiple antenna ports and with configurable density. Based on the number of configured antenna ports, a CSI-RS resource may span different number of OFDM symbols (e.g., 1, 2, and 4 symbols). The CSI-RS may be configured for a downlink BWP and may use the numerology of the downlink BWP. The CSI-RS may be configured to cover the full bandwidth of the downlink BWP or a portion of the downlink BWP. In some case, the CSI-RS may be repeated in every resource block of the CSI-RS bandwidth, referred to as CSI-RS with density equal to one. In some cases, the CSI-RS may be configured to be repeated in every other resource block of the CSI-RS bandwidth. CSI-RS may be non-zero power (NZP) CSI-RS or zero-power (ZP) CSI-RS.

The base station may configure a wireless device with one or more sets of NZP CSI-RS resources. The base station may configure the wireless device with a NZP CSI-RS resource set using an RRC information element (IE) NZP-CSI-RS-ResourceSet indicating a NZP CSI-RS resource set identifier (ID) and parameters specific to the NZP CSI-RS resource set. An NZP CSI-RS resource set may comprise one or more CSI-RS resources. An NZP CSI-RS resource set may be configured as part of the CSI measurement configuration.

The CSI-RS may be configured for periodic, semi-persistent or aperiodic transmission. In case of the periodic and semi-persistent CSI-RS configurations, the wireless device may be configured with a CSI resource periodicity and offset parameter that indicate a periodicity and corresponding offset in terms of number of slots. The wireless device may determine the slots that the CSI-RSs are transmitted. For semi-persistent CSI-RS, the CSI-RS resources for CSI-RS transmissions may be activated and deactivated by using a semi-persistent (SP) CSI-CSI Resource Set Activation/Deactivation MAC CE. In response to receiving a MAC CE indicating activation of semi-persistent CSI-RS resources, the wireless device may assume that the CSI-RS transmissions will continue until the CSI-RS resources for CSI-RS transmissions are activated.

As discussed before, CSI-RS may be configured for a wireless device as NZP CSI-RS or ZP CSI-RS. The configuration of the ZP CSI-RS may be similar to the NZP CSI-RS with the difference that the wireless device may not carry out measurements for the ZP CSI-RS. By configuring ZP CSI-RS, the wireless device may assume that a scheduled PDSCH that includes resource elements from the ZP CSI-RS is rate matched around those ZP CSI-RS resources. For example, a ZP CSI-RS resource configured for a wireless device may be an NZP CSI-RS resource for another wireless device. For example, by configuring ZP CSI-RS resources for the wireless device, the base station may indicate to the wireless device that the PDSCH scheduled for the wireless device is rate matched around the ZP CSI-RS resources.

A base station may configure a wireless device with channel state information interference measurement (CSI-IM) resources. Similar to the CSI-RS configuration, configuration of locations and density of CSI-IM resources may be flexible. The CSI-IM resources may be periodic (configured with a periodicity), semi-persistent (configured with a periodicity and activated and deactivated by MAC CE) or aperiodic (triggered by a DCI).

Tracking reference signals (TRSs) may be configured for a wireless device as a set of sparse reference signals to assist the wireless in time and frequency tracking and compensating time and frequency variations in its local oscillator. The wireless device may further use the TRSs for estimating channel characteristics such as delay spread or doppler frequency. The base station may use a CSI-RS configuration for configuring TRS for the wireless device. The TRS may be configured as a resource set comprising multiple periodic NZP CSI-RS resources.

A base station may configure a UE and the UE may transmit sounding reference signals (SRSs) to enable uplink channel sounding/estimation at the base station. The SRS may support up to four antenna ports and may be designed with low cubic metric enabling efficient operation of the wireless device amplifier. The SRS may span one or more (e.g., one, two or four) consecutive OFDM symbols in time domain and may be located within the last n (e.g., six) symbols of a slot. In the frequency domain, the SRS may have a structure that is referred to as a comb structure and may be transmitted on every Nth subcarrier. Different SRS transmissions from different wireless devices may have different comb structures and may be multiplexed in frequency domain.

A base station may configure a wireless device with one or more SRS resource sets and an SRS resource set may comprise one or more SRS resources. The SRS resources in an SRS resources set may be configured for periodic, semi-persistent or aperiodic transmission. The periodic SRS and the semi-persistent SRS resources may be configured with periodicity and offset parameters. The Semi-persistent SRS resources of a configured semi-persistent SRS resource set may be activated or deactivated by a semi-persistent (SP) SRS Activation/Deactivation MAC CE. The set of SRS resources included in an aperiodic SRS resource set may be activated by a DCI. A value of a field (e.g., an SRS request field) in the DCI may indicate activation of resources in an aperiodic SRS resource set from a plurality of SRS resource sets configured for the wireless device.

An antenna port may be associated with one or more reference signals. The receiver may assume that the one or more reference signals, associated with the antenna port, may be used for estimating channel corresponding to the antenna port. The reference signals may be used to derive channel state information related to the antenna port. Two antenna ports may be referred to as quasi co-located if characteristics (e.g., large-scale properties) of the channel over which a symbol is conveyed on one antenna port may be inferred from the channel over which a symbol is conveyed from another antenna port. For example, a UE may assume that radio channels corresponding to two different antenna ports have the same large-scale properties if the antenna ports are specified as quasi co-located. In some cases, the UE may assume that two antenna ports are quasi co-located based on signaling received from the base station. Spatial quasi-colocation (QCL) between two signals may be, for example, due to the two signals being transmitted from the same location and in the same beam. If a receive beam is good for a signal in a group of signals that are spatially quasi co-located, it may be assumed also be good for the other signals in the group of signals.

The CSI-RS in the downlink and the SRS in uplink may serve as quasi-location (QCL) reference for other physical downlink channels and physical uplink channels, respectively. For example, a downlink physical channel (e.g., PDSCH or PDCCH) may be spatially quasi co-located with a downlink reference signal (e.g., CSI-RS or SSB). The wireless device may determine a receive beam based on measurement on the downlink reference signal and may assume that the determined received beam is also good for reception of the physical channels (e.g., PDSCH or PDCCH) that are spatially quasi co-located with the downlink reference signal. Similarly, an uplink physical channel (e.g., PUSCH or PUCCH) may be spatially quasi co-located with an uplink reference signal (e.g., SRS). The base station may determine a receive beam based on measurement on the uplink reference signal and may assume that the determined received beam is also good for reception of the physical channels (e.g., PUSCH or PUCCH) that are spatially quasi co-located with the uplink reference signal.

The Demodulation Reference Signals (DM-RSs) enables channel estimation for coherent demodulation of downlink physical channels (e.g., PDSCH, PDCCH and PBH) and uplink physical channels (e.g., PUSCH and PUCCH). The DM-RS may be located early in the transmission (e.g., front-loaded DM-RS) and may enable the receiver to obtain the channel estimate early and reduce the latency. The time-domain structure of the DM-RS (e.g., symbols wherein the DM-RS are located in a slot) may be based on different mapping types.

The Phase Tracking Reference Signals (PT-RSs) enables tracking and compensation of phase variations across the transmission duration. The phase variations may be, for example, due to oscillator phase noise. The oscillator phase noise may become more sever in higher frequencies (e.g., mmWave frequency bands). The base station may configure the PT-RS for uplink and/or downlink. The PT-RS configuration parameters may indicate frequency and time density of PT-RS, maximum number of ports (e.g., uplink ports), resource element offset, configuration of uplink PT-RS without transform precoder (e.g., CP-OFDM) or with transform precoder (e.g., DFT-s-OFDM), etc. The subcarrier number and/or resource blocks used for PT-RS transmission may be based on the C-RNTI of the wireless device to reduce risk of collisions between PT-RSs of wireless devices scheduled on overlapping frequency domain resources.

Figure 13B:
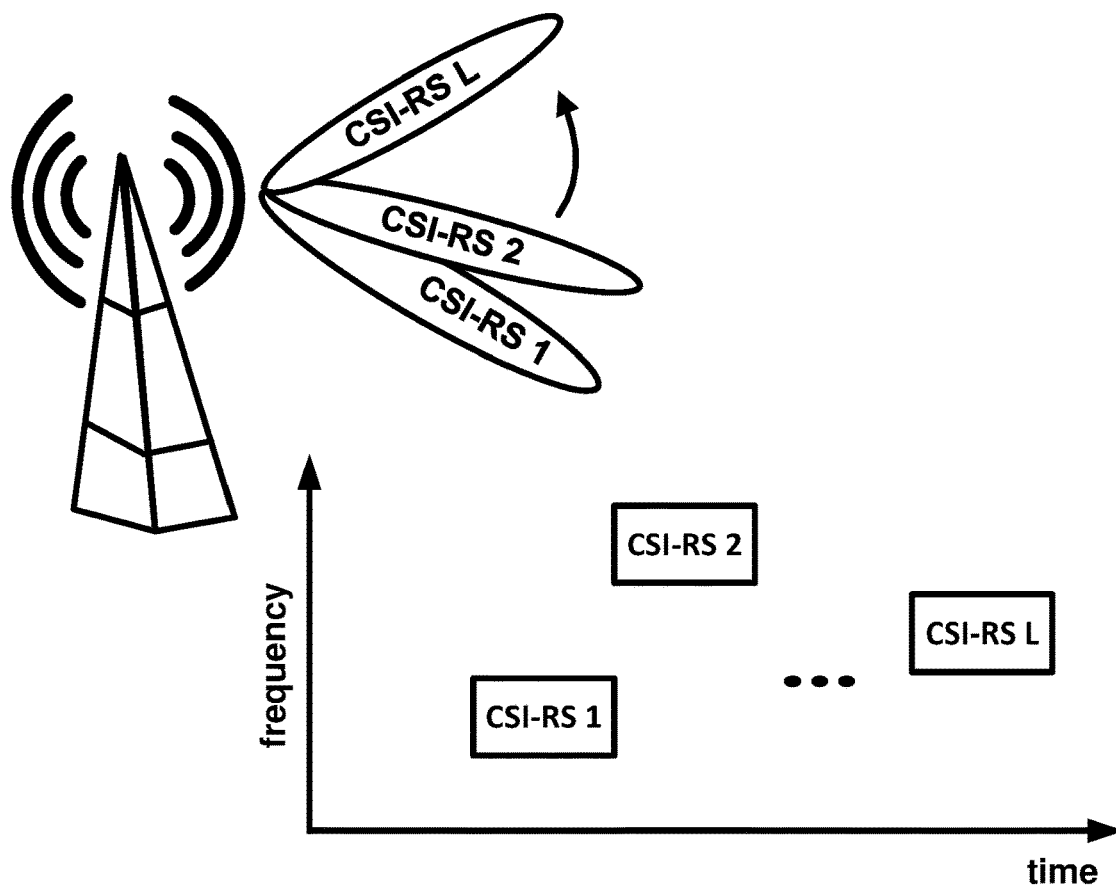
FIG. 13B shows example time and frequency structure of CSI-RSs and their association with beams in accordance with several of various embodiments of the present disclosure.

FIG. 13B shows example time and frequency structure of CSI-RSs and their association with beams in accordance with several of various embodiments of the present disclosure. A beam of the L beams shown in FIG. 13B may be associated with a corresponding CSI-RS resource. The base station may transmit the CSI-RSs using the configured CSI-RS resources and a UE may measure the CSI-RSs (e.g., received signal received power (RSRP) of the CSI-RSs) and report the CSI-RS measurements to the base station based on a reporting configuration. For example, the base station may determine one or more transmission configuration indication (TCI) states and may indicate the one or more TCI states to the UE (e.g., using RRC signaling, a MAC CE and/or a DCI). Based on the one or more TCI states indicated to the UE, the UE may determine a downlink receive beam and receive downlink transmissions using the receive beam. In case of a beam correspondence, the UE may determine a spatial domain filter of a transmit beam based on spatial domain filter of a corresponding receive beam. Otherwise, the UE may perform an uplink beam selection procedure to determine the spatial domain filter of the transmit beam. The UE may transmit one or more SRSs using the SRS resources configured for the UE and the base station may measure the SRSs and determine/select the transmit beam for the UE based the SRS measurements. The base station may indicate the selected beam to the UE. The CSI-RS resources shown in FIG. 13B may be for one UE. The base station may configure different CSI-RS resources associated with a given beam for different UEs by using frequency division multiplexing.

A base station and a wireless device may perform beam management procedures to establish beam pairs (e.g., transmit and receive beams) that jointly provide good connectivity. For example, in the downlink direction, the UE may perform measurements for a beam pair and estimate channel quality for a transmit beam by the base station (or a transmission reception point (TRP) more generally) and the receive beam by the UE. The UE may transmit a report indicating beam pair quality parameters. The report may comprise one or more parameters indicating one or more beams (e.g., a beam index, an identifier of reference signal associated with a beam, etc.), one or more measurement parameters (e.g., RSRP), a precoding matrix indicator (PMI), a channel quality indicator (CQI), and/or a rank indicator (RI).

Figure 14A:
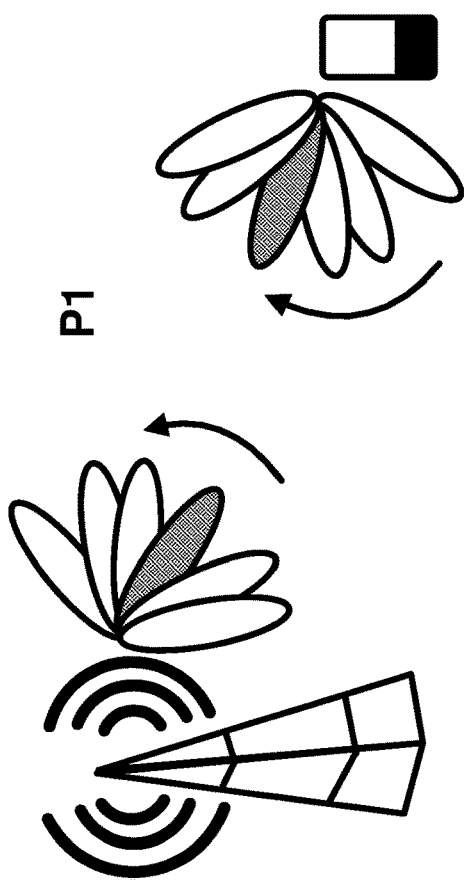
FIG. 14A, FIG. 14B and FIG. 14C show example beam management processes in accordance with several of various embodiments of the present disclosure.
Figure 14C:
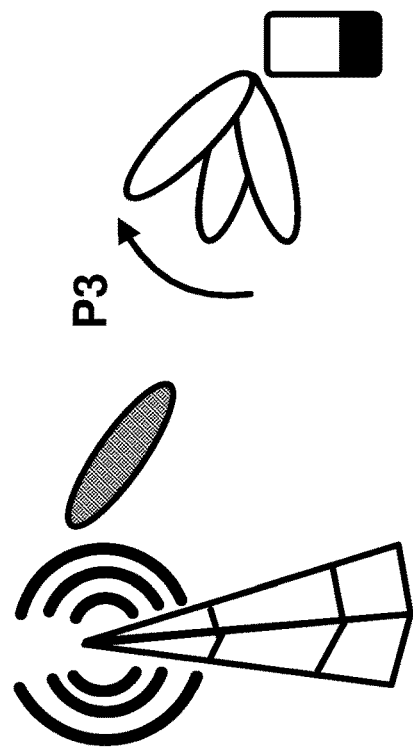
Figure 14B:
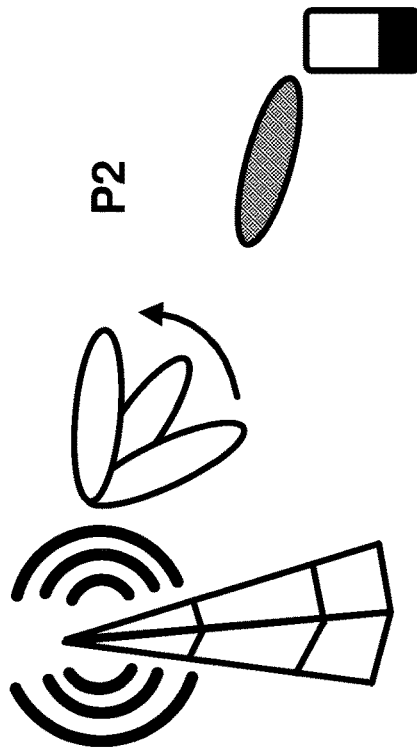

FIG. 14A, FIG. 14B and FIG. 14C show example beam management processes (referred to as P1, P2 and P3, respectively) in accordance with several of various embodiments of the present disclosure. The P1 process shown in FIG. 14A may enable, based on UE measurements, selection of a base station (or TRP more generally) transmit beam and/or a wireless device receive beam. The TRP may perform a beam sweeping procedure where the TRP may sequentially transmit reference signals (e.g., SSB and/or CSI-RS) on a set of beams and the UE may select a beam from the set of beams and may report the selected beam to the TRP. The P2 procedure as shown in FIG. 14B may be a beam refinement procedure. The selection of the TRP transmit beam and the UE receive beam may be regularly reevaluated due to movements and/or rotations of the UE or movement of other objects. In an example, the base station may perform the beam sweeping procedure over a smaller set of beams and the UE may select the best beam over the smaller set. In an example, the beam shape may be narrower compared to beam selected based on the P1 procedure. Using the P3 procedure as shown in FIG. 14C, the TRP may fix its transmit beam and the UE may refine its receive beam.

A wireless device may receive one or more messages from a base station. The one or more messages may comprise one or more RRC messages. The one or more messages may comprise configuration parameters of a plurality of cells for the wireless device. The plurality of cells may comprise a primary cell and one or more secondary cells. For example, the plurality of cells may be provided by a base station and the wireless device may communicate with the base station using the plurality of cells. For example, the plurality of cells may be provided by multiple base station (e.g., in case of dual and/or multi-connectivity). The wireless device may communicate with a first base station, of the multiple base stations, using one or more first cells of the plurality of cells. The wireless device may communicate with a second base station of the multiple base stations using one or more second cells of the plurality of cells.

The one or more messages may comprise configuration parameters used for processes in physical, MAC, RLC, PCDP, SDAP, and/or RRC layers of the wireless device. For example, the configuration parameters may include values of timers used in physical, MAC, RLC, PCDP, SDAP, and/or RRC layers. For example, the configuration parameters may include parameters for configurating different channels (e.g., physical layer channel, logical channels, RLC channels, etc.) and/or signals (e.g., CSI-RS, SRS, etc.).

Upon starting a timer, the timer may start running until the timer is stopped or until the timer expires. A timer may be restarted if it is running. A timer may be started if it is not running (e.g., after the timer is stopped or after the timer expires). A timer may be configured with or may be associated with a value (e.g., an initial value). The timer may be started or restarted with the value of the timer. The value of the timer may indicate a time duration that the timer may be running upon being started or restarted and until the timer expires. The duration of a timer may not be updated until the timer is stopped or expires (e.g., due to BWP switching). This specification may disclose a process that includes one or more timers. The one or more timers may be implemented in multiple ways. For example, a timer may be used by the wireless device and/or base station to determine a time window [t1, t2], wherein the timer is started at time t1 and expires at time t2 and the wireless device and/or the base station may be interested in and/or monitor the time window [t1, t2], for example to receive a specific signaling. Other examples of implementation of a timer may be provided.

Figure 15:
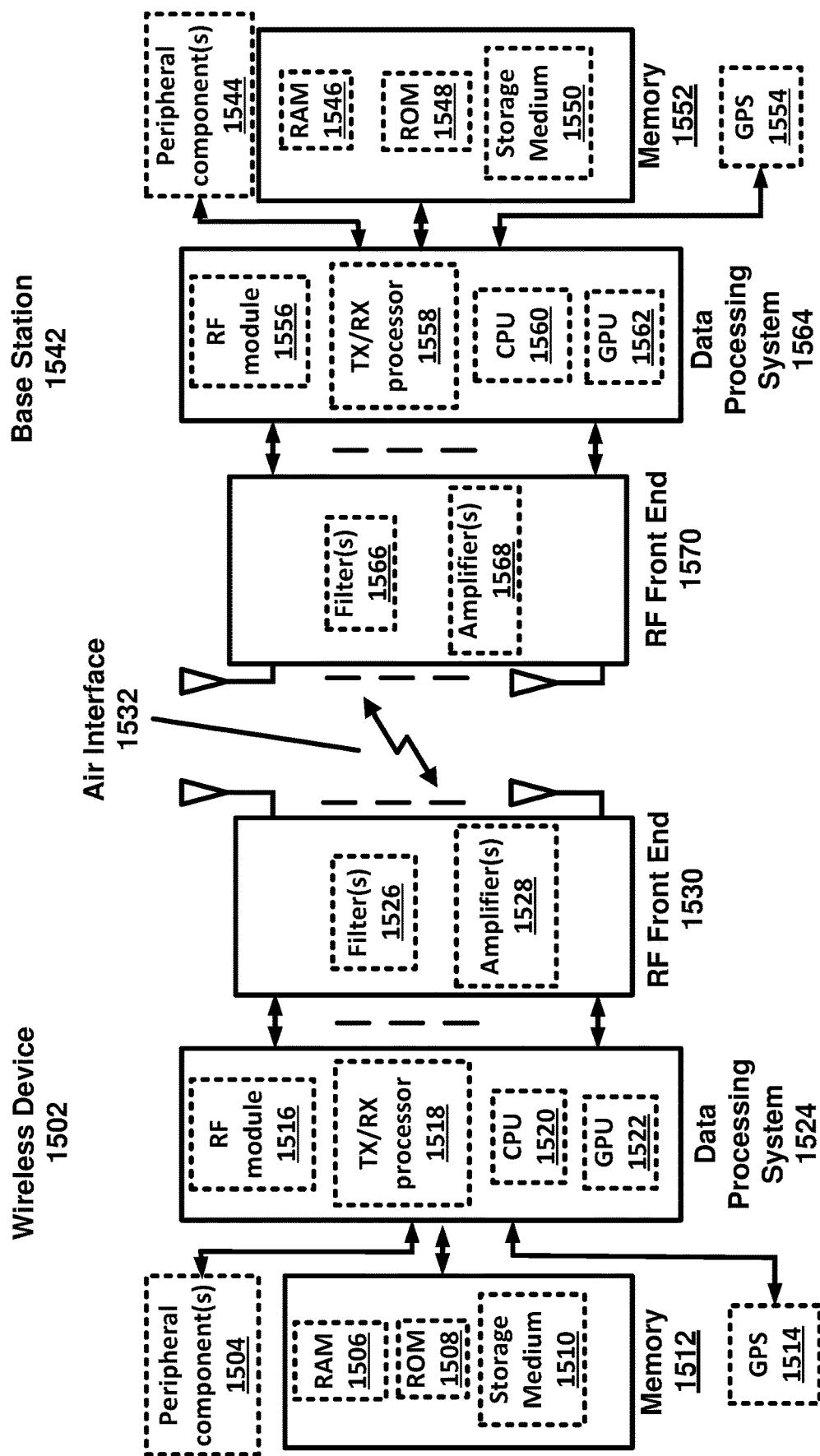
FIG. 15 shows example components of a wireless device and a base station that are in communication via an air interface in accordance with several of various embodiments of the present disclosure.

FIG. 15 shows example components of a wireless device and a base station that are in communication via an air interface in accordance with several of various embodiments of the present disclosure. The wireless device 1502 may communicate with the base station 1542 over the air interface 1532. The wireless device 1502 may include a plurality of antennas. The base station 1542 may include a plurality of antennas. The plurality of antennas at the wireless device 1502 and/or the base station 1542 enables different types of multiple antenna techniques such as beamforming, single-user and/or multi-user MIMO, etc.

The wireless device 1502 and the base station 1542 may have one or more of a plurality of modules/blocks, for example RF front end (e.g., RF front end 1530 at the wireless device 1502 and RF front end 1570 at the base station 1542), Data Processing System (e.g., Data Processing System 1524 at the wireless device 1502 and Data Processing System 1564 at the base station 1542), Memory (e.g., Memory 1512 at the wireless device 1502 and Memory 1542 at the base station 1542). Additionally, the wireless device 1502 and the base station 1542 may have other modules/blocks such as GPS (e.g., GPS 1514 at the wireless device 1502 and GPS 1554 at the base station 1542).

An RF front end module/block may include circuitry between antennas and a Data Processing System for proper conversion of signals between these two modules/blocks. An RF front end may include one or more filters (e.g., Filter(s) 1526 at RF front end 1530 or Filter(s) 1566 at the RF front end 1570), one or more amplifiers (e.g., Amplifier(s) 1528 at the RF front end 1530 and Amplifier(s) 1568 at the RF front end 1570). The Amplifier(s) may comprise power amplifier(s) for transmission and low-noise amplifier(s) (LNA(s)) for reception.

The Data Processing System 1524 and the Data Processing System 1564 may process the data to be transmitted or the received signals by implementing functions at different layers of the protocol stack such as PHY, MAC, RLC, etc. Example PHY layer functions that may be implemented by the Data Processing System 1524 and/or 1564 may include forward error correction, interleaving, rate matching, modulation, precoding, resource mapping, MIMO processing, etc. Similarly, one or more functions of the MAC layer, RLC layer and/or other layers may be implemented by the Data Processing System 1524 and/or the Data Processing System 1564. One or more processes described in the present disclosure may be implemented by the Data Processing System 1524 and/or the Data Processing System 1564. A Data Processing System may include an RF module (RF module 1516 at the Data Processing System 1524 and RF module 1556 at the Data Processing System 1564) and/or a TX/RX processor (e.g., TX/RX processor 1518 at the Data Processing System 1524 and TX/RX processor 1558 at the Data Processing System 1566) and/or a central processing unit (CPU) (e.g., CPU 1520 at the Data Processing System 1524 and CPU 1560 at the Data Processing System 1564) and/or a graphical processing unit (GPU) (e.g., GPU 1522 at the Data Processing System 1524 and GPU 1562 at the Data Processing System 1564).

The Memory 1512 may have interfaces with the Data Processing System 1524 and the Memory 1552 may have interfaces with Data Processing System 1564, respectively. The Memory 1512 or the Memory 1552 may include non-transitory computer readable mediums (e.g., Storage Medium 1510 at the Memory 1512 and Storage Medium 1550 at the Memory 1552) that may store software code or instructions that may be executed by the Data Processing System 1524 and Data Processing System 1564, respectively, to implement the processes described in the present disclosure. The Memory 1512 or the Memory 1552 may include random-access memory (RAM) (e.g., RAM 1506 at the Memory 1512 or RAM 1546 at the Memory 1552) or read-only memory (ROM) (e.g., ROM 1508 at the Memory 1512 or ROM 1548 at the Memory 1552) to store data and/or software codes.

The Data Processing System 1524 and/or the Data Processing System 1564 may be connected to other components such as a GPS module 1514 and a GPS module 1554, respectively, wherein the GPS module 1514 and a GPS module 1554 may enable delivery of location information of the wireless device 1502 to the Data Processing System 1524 and location information of the base station 1542 to the Data Processing System 1564. One or more other peripheral components (e.g., Peripheral Component(s) 1504 or Peripheral Component(s) 1544) may be configured and connected to the data Processing System 1524 and data Processing System 1564, respectively.

In example embodiments, a wireless device may be configured with parameters and/or configuration arrangements. For example, the configuration of the wireless device with parameters and/or configuration arrangements may be based on one or more control messages that may be used to configure the wireless device to implement processes and/or actions. The wireless device may be configured with the parameters and/or the configuration arrangements regardless of the wireless device being in operation or not in operation. For example, software, firmware, memory, hardware and/or a combination thereof and/or alike may be configured in a wireless device regardless of the wireless device being in operation or not operation. The configured parameters and/or settings may influence the actions and/or processes performed by the wireless device when in operation.

In example embodiments, a wireless device may receive one or more message comprising configuration parameters. For example, the one or more messages may comprise radio resource control (RRC) messages. A parameter of the configuration parameters may be in at least one of the one or more messages. The one or more messages may comprise information element (IEs). An information element may be a structural element that includes single or multiple fields. The fields in an IE may be individual contents of the IE. The terms configuration parameter, IE and field may be used equally in this disclosure. The IEs may be implemented using a nested structure, wherein an IE may include one or more other IEs and an IE of the one or more other IEs may include one or more additional IEs. With this structure, a parent IE contains all the offspring IEs as well. For example, a first IE containing a second IE, the second IE containing a third IE, and the third IE containing a fourth IE may imply that the first IE contains the third IE and the fourth IE.

In an example, an IE PDCCH-Config may be used to configure UE specific PDCCH parameters such as control resource sets (CORESET), search spaces and additional parameters for acquiring the PDCCH. In an example, if this IE is used for the scheduled cell in case of cross carrier scheduling, the fields other than searchSpacesToAddMod-List and searchSpacesToReleaseList may be absent. In an example, if the IE is used for a dormant BWP, the fields other than controlResourceSetToAddModList and controlResourceSetToReleaseList may be absent. In an example, the IE PDCCH-Config may comprise a tpc-PUCCH field that may enable and configure reception of group TPC commands for PUCCH.

In an example, an IE PUCCH-TPC-CommandConfig may be used to configure the UE for extracting TPC commands for PUCCH from a group-TPC messages on DCI. In an example, a field tpc-IndexPCell may indicate an index determining the position of the first bit of TPC command (applicable to the SpCell) inside the DCI format 2-2 payload. In an example, a field tpc-IndexPUCCH-SCell may indicate an index determining the position of the first bit of TPC command (applicable to the PUCCH SCell) inside the DCI format 2-2 payload.

In an example, the IE PDSCH-ServingCellConfig may be used to configure UE specific PDSCH parameters that are common across the UE's BWPs of one serving cell. The IE PDSCH-ServingCellConfig may comprise a pucch-Cell field indicating an ID of the serving cell (of the same cell group) to use for PUCCH. If the field is absent, the UE may send the HARQ feedback on the PUCCH of the SpCell of this cell group, or on this serving cell if it is a PUCCH SCell.

In an example, an IE SPS-Config may be used to configure downlink semi-persistent transmission. Multiple Downlink SPS configurations may be configured in one BWP of a serving cell. In an example, a field harq-CodebookID may Indicate the HARQ-ACK codebook index for the corresponding HARQ-ACK codebook for SPS PDSCH and ACK for SPS PDSCH release. In an example, a field harq-ProcID-Offset may Indicate the offset used in deriving the HARQ process IDs. In an example, a periodicity parameter may indicate periodicity of the SPS configuration. In an example, a parameter pdsch-AggregationFactor may indicate a number of repetitions for SPS PDSCH. When the field is absent, the UE may apply PDSCH aggregation factor of PDSCH-Config.

In an example, PUCCH carrier switching may be used for HARQ feedback to provide HARQ-ACK latency reduction for PDSCH for TDD under CA, where different serving cells may have different UL/DL patterns.

In an example, a configuration of pucch-Cell on PCell may indicate another serving cell within the same cell group to use for PUCCH.

In an example, a dynamic indication for PUCCH carrier switching may provide flexibility on scheduling a PUCCH transmission. In an example, a DCI field may indicate the corresponding PUCCH carrier index where the PUCCH is transmitted. In an example, a DCI field may indicate the corresponding PUCCH cell group (e.g., primary PUCCH cell group or secondary PUCCH cell group), and the selected PUCCH carrier may be determined implicitly or explicitly.

In an example, semi-static rules may be used for PUCCH carrier switching. In an example, if a slot indicated by HARQ timing indicator has no available PUCCH resource, carriers with available PUCCH resource in the same slot may be the candidates for switching. In an example, a carrier with the smallest index in the same PUCCH cell group may be the candidate for switching.

In an example, a configurable indication may be used for selecting between dynamic indication and semi-static rule as a compromised option.

In an example, PUCCH carrier switching may be based on RRC configured PUCCH cell timing pattern of applicable PUCCH cells.

In an example, for dynamic indication of PUCCH carrier switching, PUCCH configuration may be a combination of per PUCCH group and per PUCCH carrier. In an example, PUCCH carrier index may not be changed to enhance PUCCH carrier selection reliability. In an example, separate TPC configuration and TPC loop may be used for PUCCH per PUCCH carrier.

In an example, for PUCCH cell switching based on semi-static configuration, configuration of pucch-Cell on PCell may indicate another serving cell within the same cell group to use for PUCCH. In an example, PUCCH switching may be based on pre-defined rules. In an example, a PUCCH carrier that results in lowest latency may be used. In an example, a numerology of PCell may be used as a reference numerology (for example for determining a timing of HARQ feedback/PUCCH transmission).

A wireless device may switch PUCCH carrier/cell, for example to avoid delay for HARQ feedback transmission if a PUCCH carrier/cell of a PUCCH group is a TDD cell (e.g., operates based on the unpaired spectrum). Existing wireless device processes (e.g., power control and/or power control indication and/or HARQ feedback transmission) may result in inefficient wireless device and wireless network performance. There is a need to enhance wireless device processes with PUCCH carrier/cell switching. Example embodiments enhance the wireless device processes when PUCCH carrier/cell switching is configured/used.

Figure 16:
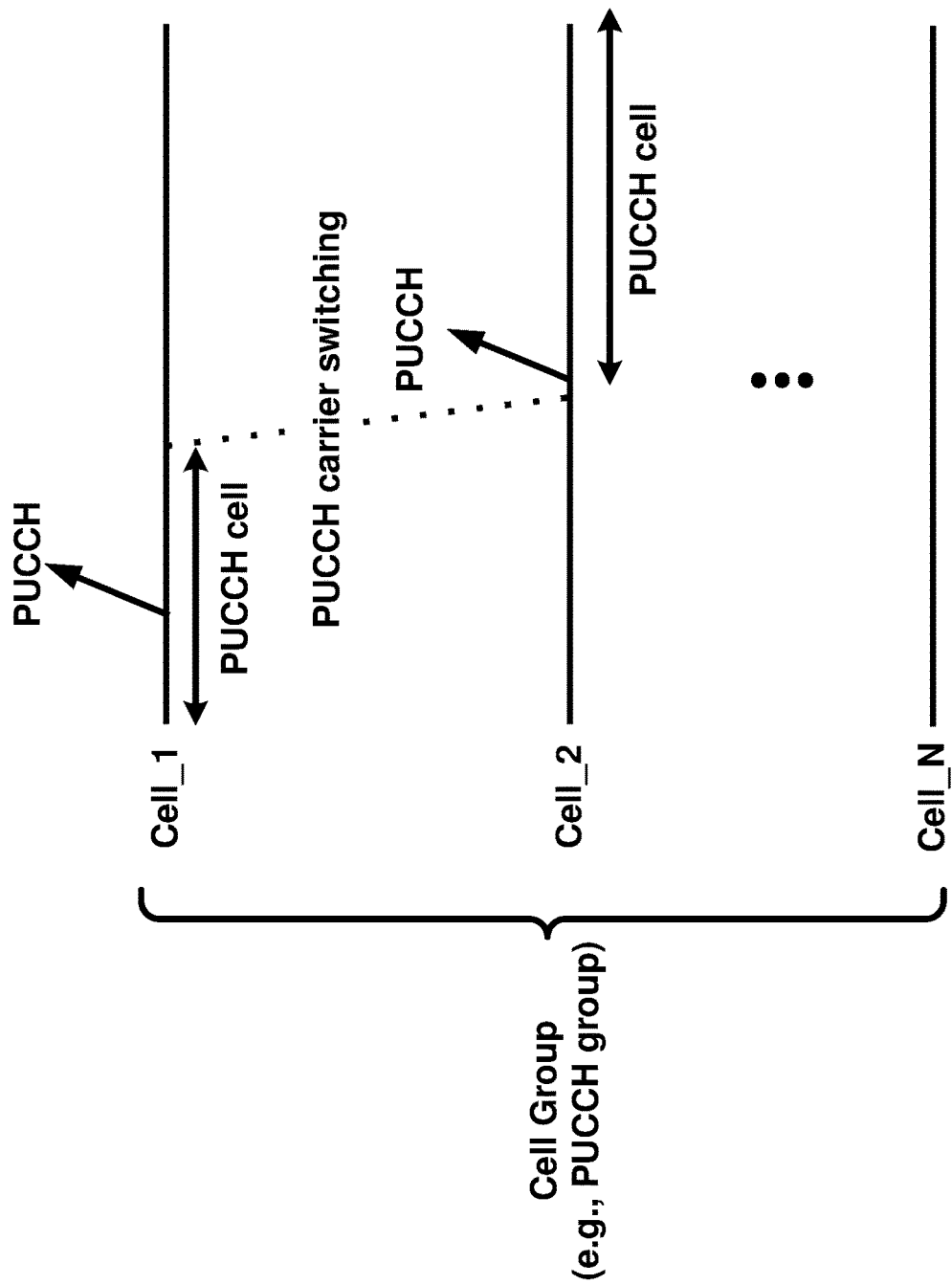
FIG. 16 shows an example PUCCH carrier switching process in a cell group in accordance with several of various embodiments of the present disclosure.

In an example embodiment as shown in FIG. 16, a cell group (e.g., a PUCCH group) may comprise a plurality of cells. PUCCH transmissions associated with the plurality of cells (for example HARQ feedbacks for downlink transport blocks that are received on the plurality of cells or HARQ feedbacks in response to SPS release for SPS configurations configured on the plurality of cells) may be transmitted via a cell in the cell group (e.g., the PUCCH group). A first plurality of cells, in the plurality of cells, may be configured for PUCCH transmission. For example, a first cell in the first plurality of cell (e.g., a PCell/PSCell when the PUCCH group is a primary PUCCH group and a PUCCH SCell when the PUCCH group is a secondary PUCCH group) and a second cell in the first plurality of cells may be configured for PUCCH transmission. The wireless device may determine an applicable cell, in the first plurality of cells, for PUCCH transmission (e.g., for transmission of PUCCH carrying HARQ feedback). For example, the wireless device may switch the PUCCH cell/carrier from the first cell/carrier to the second cell/carrier in response to PUCCH carrier/cell switching, e.g., in response to determining, based on the PUCCH carrier/cell switching process, that the second cell/carrier is the applicable cell/carrier for PUCCH transmission.

Figure 17:
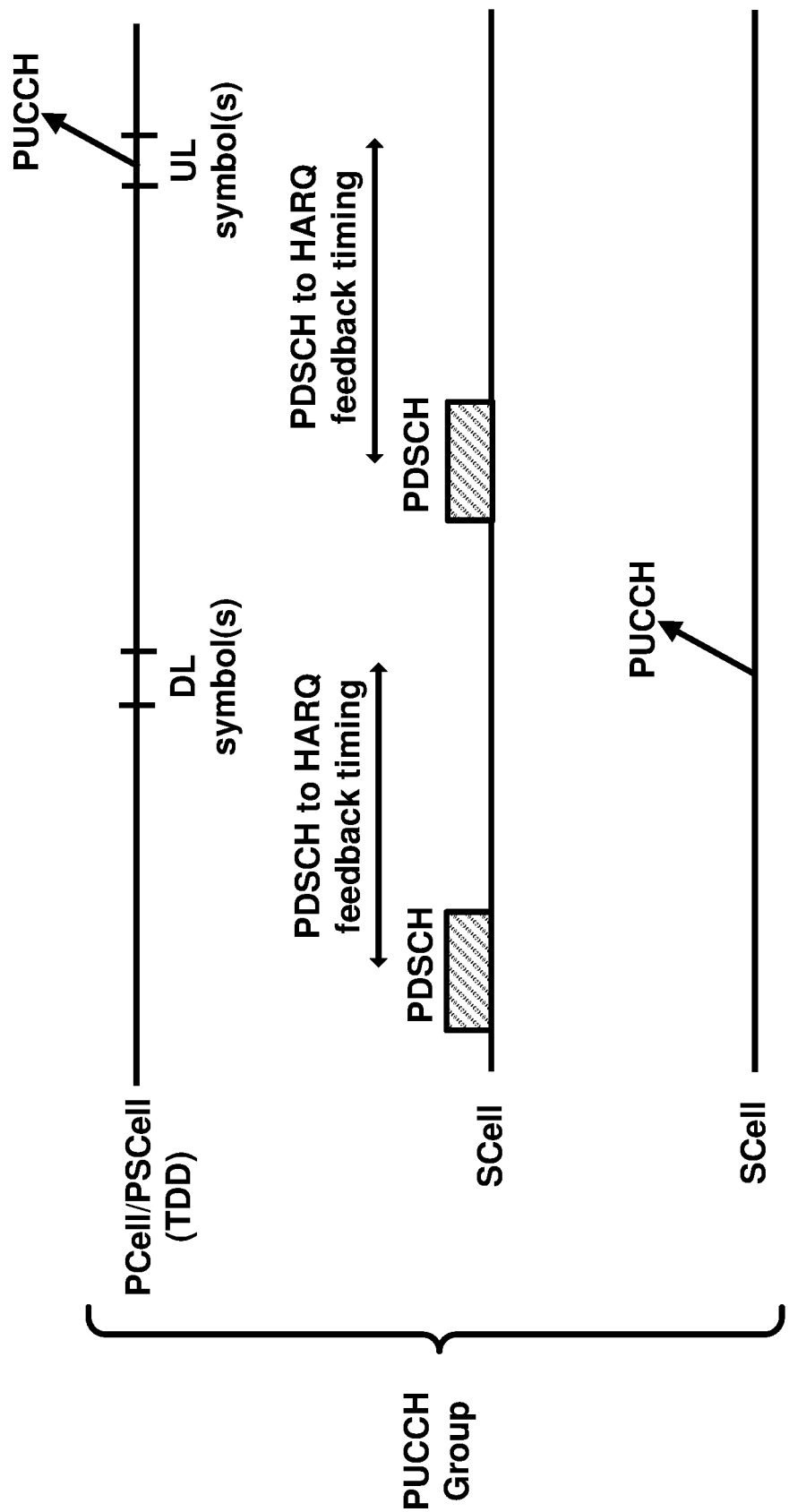
FIG. 17 shows an example PUCCH carrier switching process in a cell group in accordance with several of various embodiments of the present disclosure.

In an example embodiment as shown in FIG. 17, the cell group may be a primary PUCCH group comprising a primary cell and the primary cell (e.g., PCell/PSCell) may be a TDD cell (e.g., may operate based on unpaired spectrum). The wireless device may receive a first downlink TB via a PDSCH on a cell in the cell group. The cell that the first downlink TB may be received may be the PCell/PSCell or may be a secondary cell in the primary PUCCH group. A first DCI scheduling the first downlink TB may comprise a PDSCH-to-HARQ feedback timing field with a value indicating a timing of a first HARQ feedback associated with the first downlink TB. The timing of the first HARQ feedback may coincide/overlap with one or more downlink symbols of the PCell/PSCell. The wireless device may transmit the first HARQ feedback via a cell, different from the PCell/PSCell (e.g., via a SCell in the first plurality of cells of the PUCCH group that are configured with PUCCH transmission). The wireless device may determine to transmit the first HARQ feedback via the cell different from the PCell/PSCell in response to timing of the HARQ feedback coinciding/overlapping with the one or more downlink symbols and/or in response to a number of uplink symbols, at the timing indicated by the scheduling DCI, not being sufficient for transmission of the PUCCH carrying the HARQ feedback. The wireless device may receive a second downlink TB via a PDSCH on a cell in the cell group. The cell that the second downlink TB may be received may be the PCell/PSCell or may be secondary cell in the primary PUCCH group. A second DCI scheduling the second downlink TB may comprise a PDSCH-to-HARQ feedback timing field with a value indicating a timing of a second HARQ feedback associated with the second downlink TB. The timing of the second HARQ feedback may coincide/overlap with one or more uplink symbols of the PCell/PSCell. The wireless device may transmit the second HARQ feedback via a PUCCH on the PCell/PSCell. In an example, the wireless device may transmit the second HARQ feedback via the PUCCH on the PCell/PSCell in response to the number of the one or more uplink symbols being sufficient to transmit the second HARQ or being sufficient to transmit uplink control information comprising the second HARQ feedback.

Figure 18:
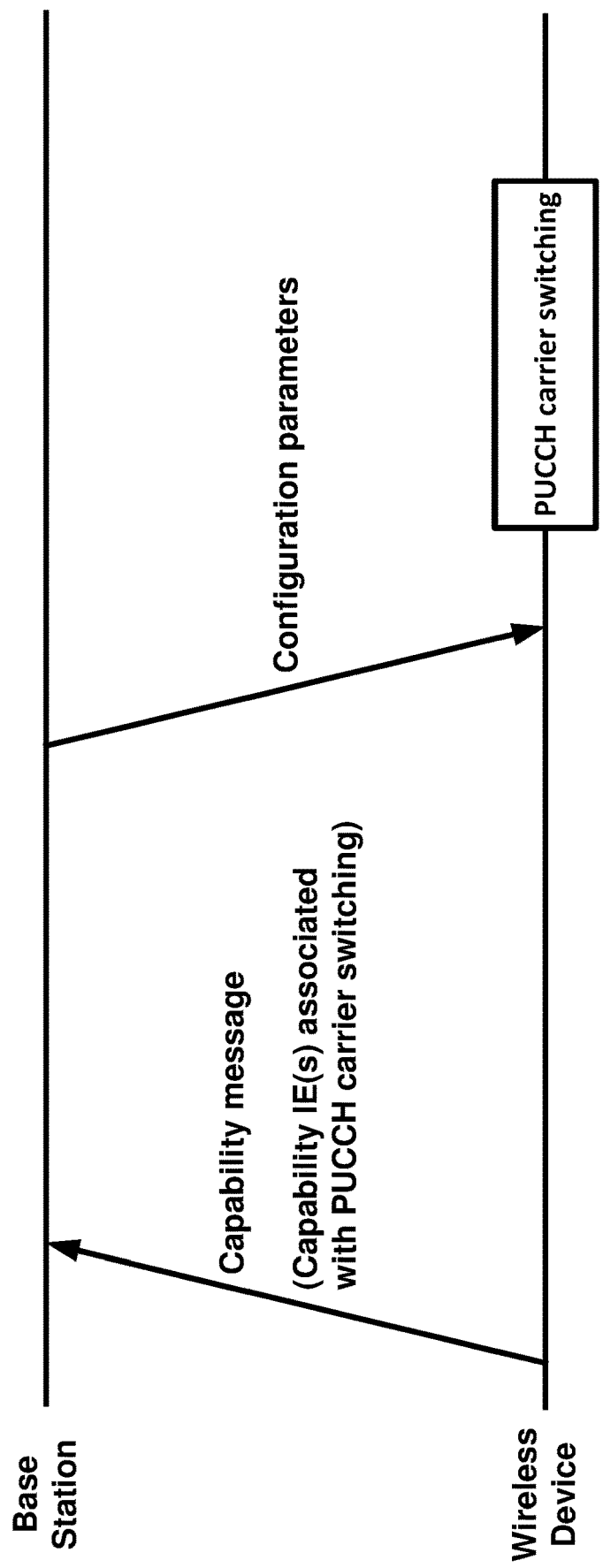
FIG. 18 shows an example process in accordance with several of various embodiments of the present disclosure.

In an example embodiment as shown in FIG. 18, a wireless device may transmit one or more capability messages to a base station. The one or more capability messages may comprise one or more information elements (IEs) associated with PUCCH carrier/cell switching. The one or more IEs may comprise one or more first IEs indicating that the wireless device is capable of supporting PUCCH carrier switching. For example, the one or more first IE may have one or more first values (e.g., a 'Supported' value) indicating that the wireless device is capable of supporting PUCCH carrier switching or that the wireless device is capable of supporting PUCCH carrier/cell switching with certain characteristics. For example, the one or more first values may indicate that the wireless device is capable of PUCCH carrier/cell switching with a switching/processing time less than a first duration. In an example, the first duration may be a predetermined value. For example, one or more second values of the one or more first IEs (e.g., a 'NotSupported value') may indicate that the wireless device is not capable of supporting PUCH carrier/cell switching or that the wireless device is not capable of supporting PUCCH carrier switching with the certain characteristics (e.g., with the switching/processing time less than the first duration).

The one or more IEs may comprise one or more second IEs indicating one or more of a processing/switching time and a time window associated with PUCCH carrier/cell switching that the wireless device supports. For example, the one or more second IEs may indicate a minimum processing time between a command and/or control information (e.g., received in a DCI) indicating PUCCH carrier/cell switching and a timing of the PUCCH carrier/cell switching. For example, the one or more second IEs may indicate a minimum processing time between a command and/or control information (e.g., received in a DCI) indicating PUCCH carrier/cell switching and a timing of PUCCH transmission on a cell after PUCCH carrier/cell switching. For example, the one or more second IEs may indicate a minimum time between a first PUCCH carrier/cell switching and a second PUCCH carrier/cell switching (e.g., in a PUCCH group). For example, the one or more second IEs may indicate a minimum time between two consecutive PUCCH carrier/cell switching (e.g., in a PUCCH group). For example, the one or more second IEs may indicate a minimum time that a cell/carrier may be a PUCCH carrier before PUCCH carrier/cell switching. For example, the one or more second IEs may indicate a minimum switching/transitioning required time for switching between a first PUCCH cell to a second PUCCH cell (e.g., in a PUCCH group). The processing time/time window may be in a first number of symbols or a first number of slots or in a fraction or multiple milliseconds.

In response to transmitting the one or more capability messages indicating that the wireless device is capable of supporting PUCCH carrier switching and/or the processing time/time window associated with PUCCH carrier switching, the wireless device may receive one or more messages (e.g., one or more RRC messages) comprising configuration parameters associated with PUCCH carrier switching. For example, the configuration parameters, associated with PUCCH carrier switching, may be for one or more PUCCH carriers/cells in a PUCCH group. The PUCCH group may be a primary PUCCH group comprising a primary cell (e.g., PCell/PSCell) or may be a secondary PUCCH group comprising a PUCCH secondary cell (PUCCH SCell). For example, the one or more PUCCH carriers/cells in the PUCCH group may be used for transmission of PUCCH (e.g., for carrying HARQ feedback, e.g., associated with downlink TBs or in response to SPS release DCIs). For example, the PUCCH group may comprise a PCell/PSCell and a first SCell and the PUCCH carrier/cell, used for transmission of PUCCH (e.g., HARQ feedback), may be switched between the PCell/PSCell and the first cell. For example, the PUCCH group may comprise a plurality of cells and the configuration parameters may indicate that a first plurality of cells, of the plurality of cells of the PUCCH group, are configured for PUCCH transmission and PUCCH carrier/cell may be switched between the cells in the first plurality of cells. For example, the PUCCH group may be a primary PUCCH group and the first plurality of cells of the PUCCH group may comprise the PCell/PSCell and a first secondary cell. In an example, the PCell/PSCell may be a TDD cell (e.g., may operate based on unpaired spectrum). In an example, the first secondary cell may be a FDD cell (e.g., may operate based on paired spectrum).

Figure 19:
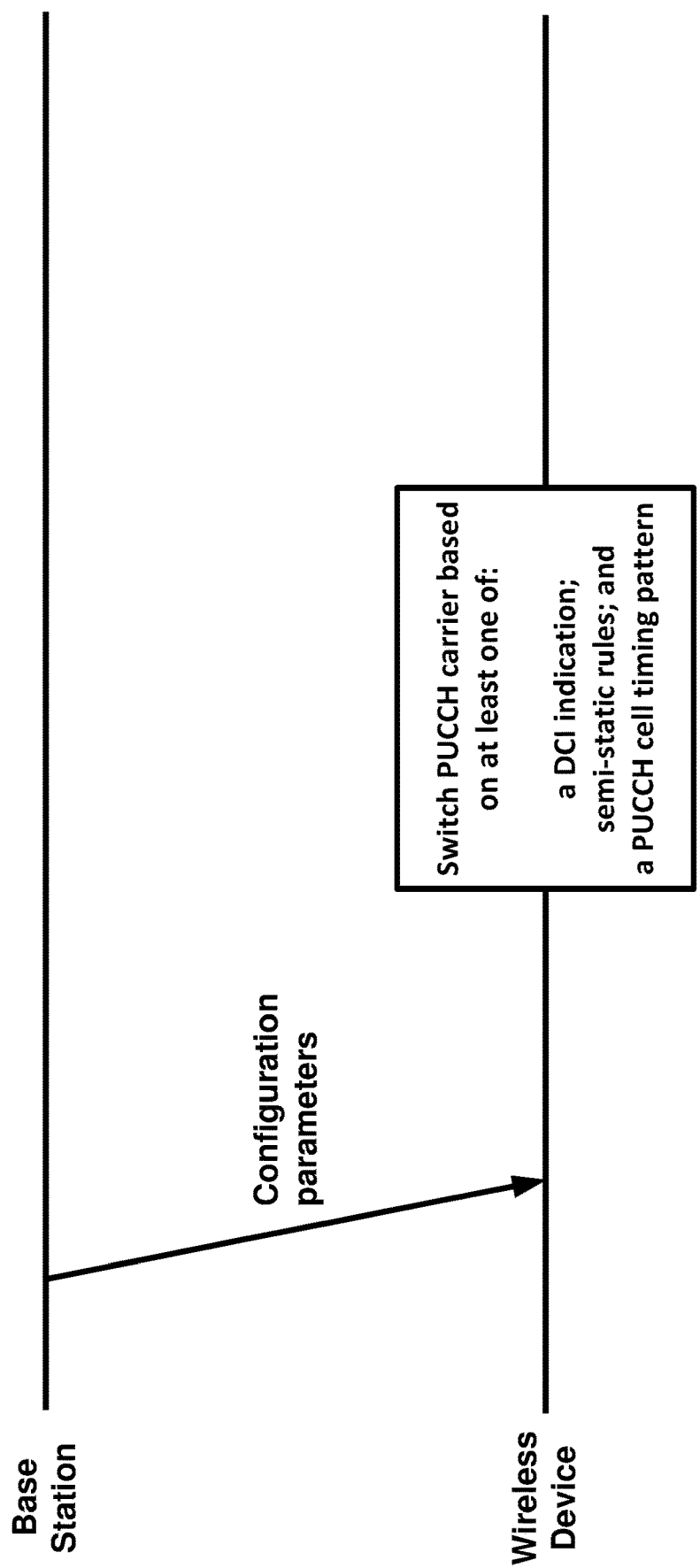
FIG. 19 shows an example process in accordance with several of various embodiments of the present disclosure.

In an example embodiment as shown in FIG. 19, the wireless device may receive configuration parameters comprising configuration parameters associated with PUCCH carrier/cell switching. For example, the configuration parameters may indicate that a PUCCH group comprises a plurality of cells and that a first plurality of cells, of the plurality of cells in the PUCCH group, may be configured with PUCCH transmission (e.g., PUCCH transmission for HARQ feedback). The wireless device may determine a cell from the first plurality of cells as an applicable cell for PUCCH transmission and/or may switch PUCCH carrier/cell based at least one of: a DCI indication (e.g., a DCI that is used for scheduling PDSCH or a DCI different from the PDSCH scheduling DCI), one or more cell selection/determination rules for selection/determination of an applicable cell from the first plurality of cells for PUCCH transmission (e.g., PUCCH carrying HARQ feedback), and a timing pattern for applicable cell used for transmission of PUCCH (e.g., PUCCH carrying HARQ feedback) in a PUCCH group.

In an example, the switching between a first cell, in the first plurality of cells of the plurality of cells in the PUCCH group, to a second cell in the first plurality of cells may be based on a dynamic indication in a DCI. For example, a wireless device may receive a DCI comprising a field with a value indicating switching from a first PUCCH cell in the PUCCH group to a second PUCCH cell in the PUCCH group. For example, the value of the field may indicate one of the first cell and the second cell in the PUCCH group. For example, the DCI may be a downlink scheduling DCI (e.g., DCI format 1_0, 1_1 or 1_2) and the value of the field may indicate one of a plurality of cells in the PUCCH group for transmission of HARQ feedback associated with the downlink TB scheduled by the DCI. For example, the field may comprise a bit, a first value of the bit indicating a first cell (e.g., a PCell/PSCell) for transmission of PUCCH carrying HARQ feedback associated with the downlink TB and a second value of the bit indicating a second cell (e.g., a first SCell) for transmission of PUCCH carrying HARQ feedback associated with the downlink TB.

In an example, the switching between a first cell, in the first plurality of cells of the plurality of cells in the PUCCH group, to a second cell in the first plurality of cells may be based on one or more rules. In an example, the wireless device may determine an applicable cell for PUCCH transmission from the first plurality of cells based on the one or more rules. For example, the cells in the first plurality of cells may be associated with different priorities. In an example, the priority associated with a cell, in the first plurality of cells, may be pre-configured/pre-determined or may be configurable (e.g., may be based on one or more RRC configuration parameters). For example, the priorities of the cells in the first plurality of cells may be based on cell indexes associated with the first plurality of cells. In an example, cells with lower cell indexes may have higher priority or vice versa. The one or more rules for determining the applicable cell may be based on the priorities of the cells. In an example, the one or more rules may be based on number of available uplink symbols at a timing of HARQ feedback transmission for the first plurality of cells. The timing of the HARQ feedback may be determined based on the PDSCH-to-HARQ feedback timing field of the DCI scheduling PDSCH. In an example, the one or more rules may indicate a cell, in the first plurality of cells, that is associated with the highest priority and the number of available uplink symbols, at the timing of the HARQ feedback transmission, is sufficient for transmission of HARQ feedback or uplink control information comprising HARQ feedback. In an example, the one or more rules may indicate a cell, in the first plurality of cells, that is associated with the highest priority and the number of available uplink symbols, at the timing of the HARQ feedback transmission, is sufficient for transmission of HARQ feedback or uplink control information comprising HARQ feedback and/or the last/ending uplink symbol of PUCCH carrying the HARQ feedback finishes at the earliest time.

In an example, the switching between a first cell, in the first plurality of cells of the plurality of cells in the PUCCH group, to a second cell in the first plurality of cells may be based on a timing pattern of applicable PUCCH cells. In an example, the wireless device may determine an applicable cell for PUCCH transmission from the first plurality of cells based on the timing pattern. For example, first configuration parameters (e.g., indicated by one or more first RRC parameters) may indicate the timing pattern. The wireless device may determine the timing pattern based on the first configuration parameters. In an example, the first configuration parameters may indicate a slot format of the first cell (e.g., PCell/PSCell) indicating uplink, downlink and flexible symbols. The wireless device may determine the timing pattern based on the pattern of uplink, downlink and flexible symbols indicated by the first configuration parameters.

In example embodiments, a wireless device may receive one or more messages comprising configuration parameters. The one or more messages may comprise one or more radio resource control (RRC) messages. The one or more messages may comprise configuration parameters of a plurality of cells. The plurality of cells may be provided by one base station (e.g., in a single-connectivity scenario) or by multiple base stations (e.g., in a dual connectivity or multi-connectivity scenario). The plurality of cells may comprise a primary cell and one or more secondary cells. In case of dual/multi connectivity, the plurality of cells may comprise a first cell group (e.g., a master cell group (MCG)) provided by a first base station (e.g., a master base station) and a secondary cell group (e.g., a secondary cell group (SCG)) provided by a secondary base station. A SCG may comprise a secondary cell that is a primary secondary cell (PSCell) and acts as a primary cell for the SCG.

The plurality of cells may be grouped to a plurality of PUCCH groups. For example, the wireless device may receive an IE (e.g., a PDSCH-ServingCellConfig IE) to configure cell-specific PDSCH parameters that are common across the UE's BWPs of one serving cell. The IE may comprise a PUCCH-Cell parameter/field indicating an identifier (e.g., serving cell index) of the serving cell (e.g., the serving cell of the same cell group) to use for PUCCH transmission. If the field is absent, the wireless device may send the HARQ feedback on the PUCCH of the SpCell (e.g., PCell/PSCell) of this cell group, or on this serving cell if it is a PUCCH SCell. The wireless device may determine a PUCCH group, that a cell belongs to, based on the PUCCH-Cell parameter configured for the cell, e.g., in the PDSCH-ServingCellConfig IE.

Figures 20A, 20B:
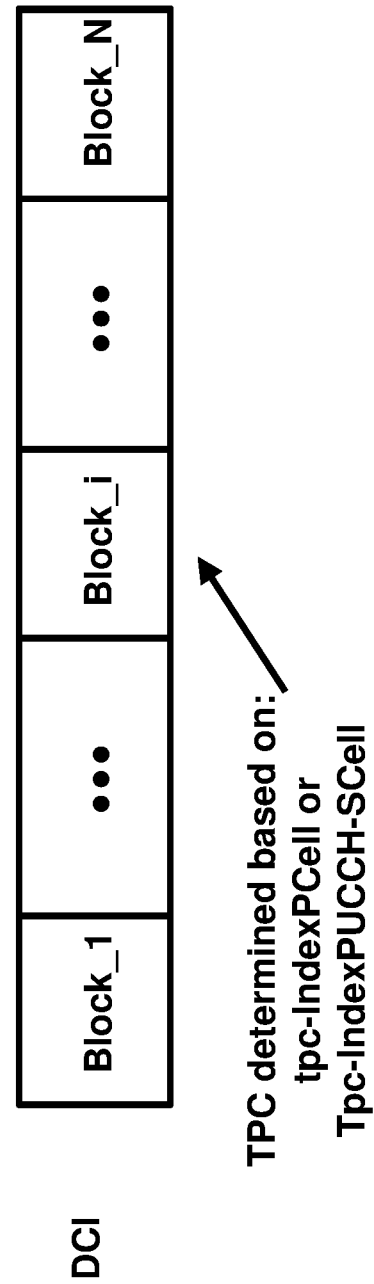
FIG. 20A shows an example information element in accordance with several of various embodiments of the present disclosure.
FIG. 20B shows an example downlink control information in accordance with several of various embodiments of the present disclosure.

In an example embodiment, the wireless device may receive an IE (e.g., a PUCCH-TPC-CommandConfig IE) which may be used to configure the wireless device for extracting TPC commands for PUCCH from a group-TPC messages on DCI (e.g., DCI format 2_2). An example PUCCH-TPC-CommandConfig IE is shown in FIG. 20A. In an example, the parameter/field tpc-IndexPCell may indicate an index determining the position of the first/starting bit of TPC command (applicable to the SpCell) inside the DCI (e.g., DCI format 2-2 payload). The parameter tpc-Index-PUCCH-SCell may indicate an index determining the position of the first bit of TPC command (applicable to the PUCCH SCell) inside the DCI format 2-2 payload. The wireless device may receive a DCI (e.g., DCI format 2_2) in a common search space. The DCI format 2_2 may be used for the transmission of TPC commands for PUCCH and PUSCH. As shown in FIG. 20B, the following information may be transmitted by means of the DCI format 2_2 with CRC scrambled by TPC-PUSCH-RNTI or TPC-PUCCH-RNTI: block number 1, block number 2, . . . , block number N. The wireless device may receive a configuration parameter indicating the TPC-PUSCH-RNTI and a configuration parameter indicating the TPC-PUCCH-RNTI. In an example, the parameter tpc-PUSCH or tpc-PUCCH provided by higher layers may determine the index to the block number for an UL of a cell. In an example, the following fields may be defined for a block: a Closed Loop Indicator (0 or 1 bit) and a TPC command (2 bits). For DCI format 2_2 with TPC-PUSCH-RNTI, the Closed Loop Indicator may be 0 bit if the wireless device is not configured with high layer parameter twoPUSCH-PC-AdjustmentStates, in which case wireless device may assume each block in the DCI format 2_2 is of 2 bits. The closed Loop Indicator may be 1 bit otherwise, in which case wireless device may assume each block in the DCI format 2_2 is of 3 bits. In an example, the number of information bits in format 2_2 may be equal to or less than the payload size of format 1_0 monitored in common search space in the same serving cell. If the number of information bits in format 2_2 is less than the payload size of format 1_0 monitored in common search space in the same serving cell, zeros may be appended to format 2_2 until the payload size equals that of format 1_0 monitored in common search space in the same serving cell.

Figure 21:
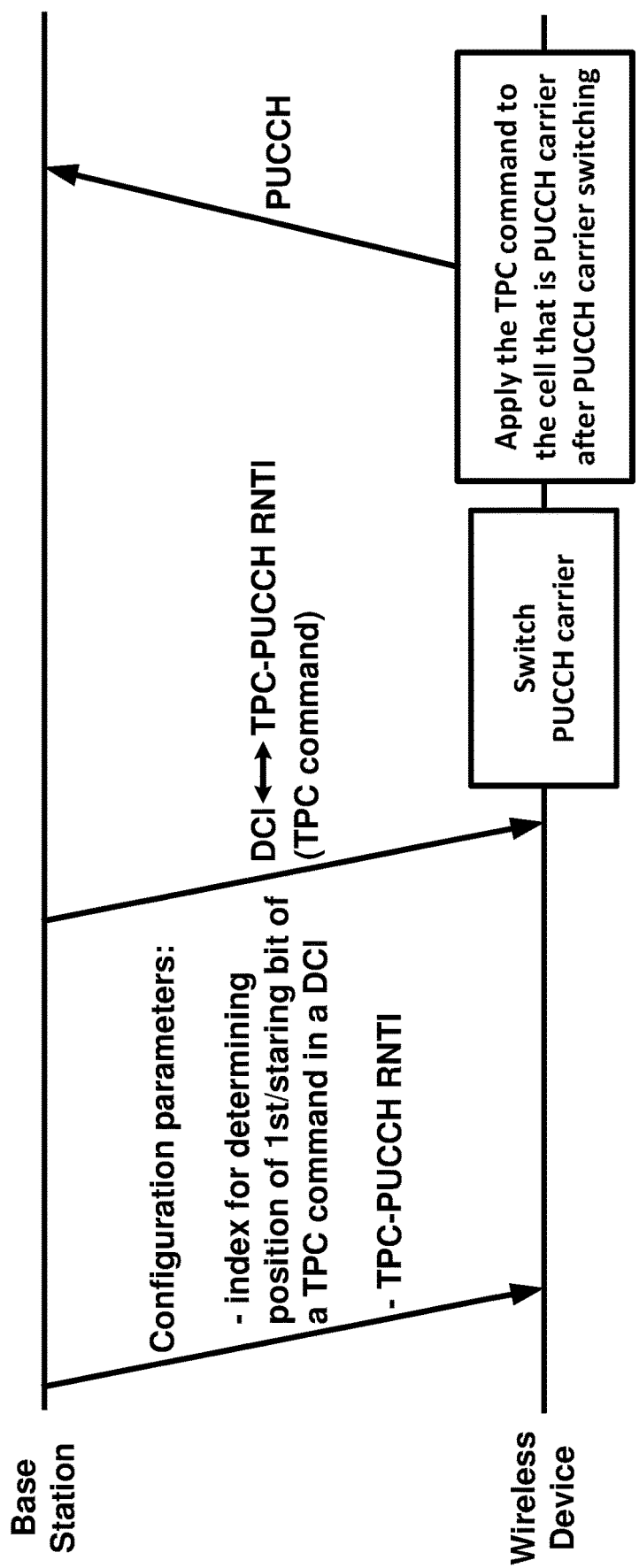
FIG. 21 shows an example process in accordance with several of various embodiments of the present disclosure.
Figure 22:
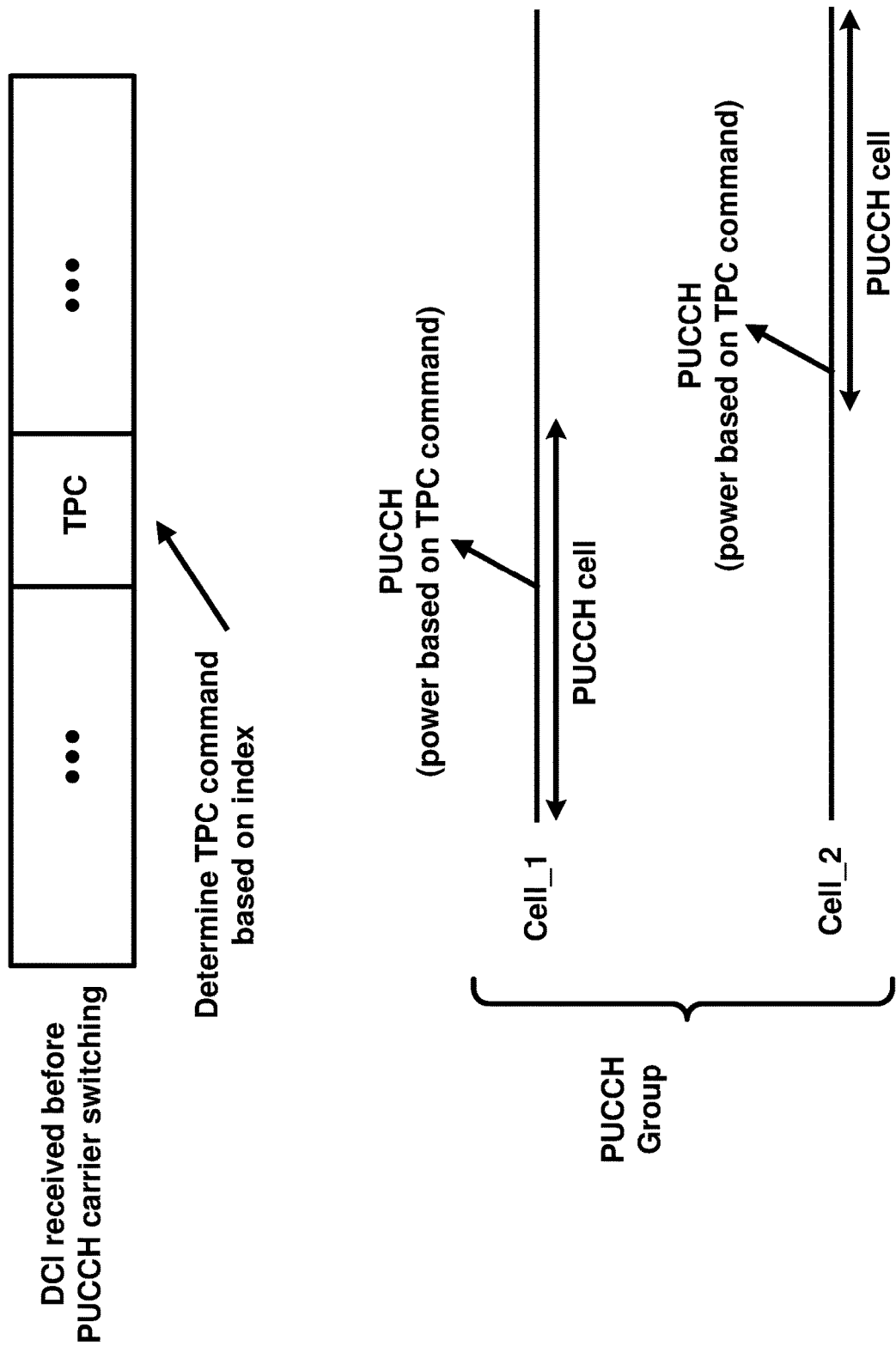
FIG. 22 shows an example process in accordance with several of various embodiments of the present disclosure.
Figure 23:
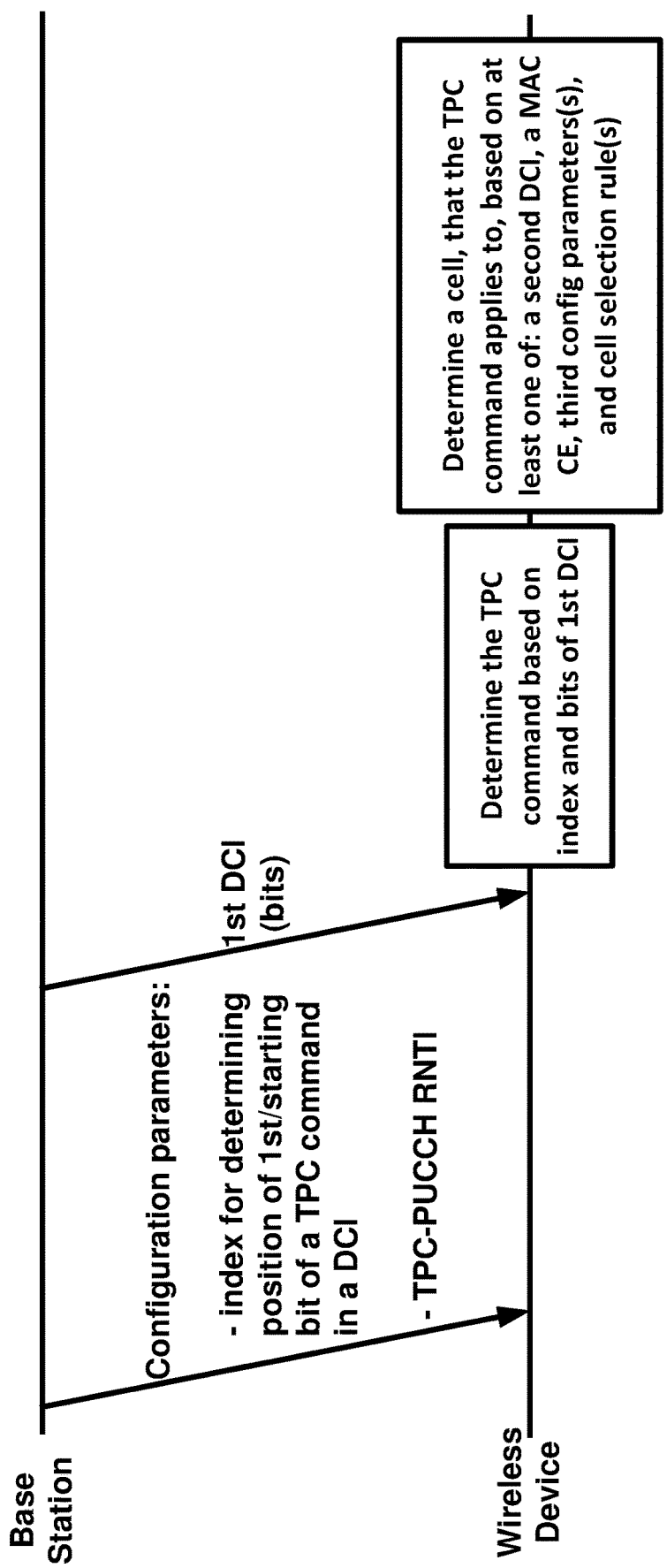
FIG. 23 shows an example process in accordance with several of various embodiments of the present disclosure.

In example embodiments as shown in FIG. 21, FIG. 22 and FIG. 23, a wireless device may receive one or more messages (e.g., one or more RRC messages) comprising configuration parameters. The configuration parameters may comprise a first configuration parameter, indicating an index (e.g., TPC PUCCH index) for determining the first/starting bit of a TPC command in a DCI comprising TPC commands (e.g., DCI format 2_2), and a second configuration parameter indicating a TPC-PUCCH RNTI. The wireless device may receive a DCI (e.g., DCI format 2_2) associated with TPC-PUCCH RNTI (e.g., with CRC scrambled by TPC-PUCCH RNTI) comprising TPC commands. The DCI may comprise a plurality of bits. The wireless device may determine a TPC command based on the plurality of bits of the DCI and the index. In an example embodiment, the TPC command may be applicable to a cell of a PUCCH group that is the PUCCH carrier used for PUCCH transmission (e.g., HARQ feedback transmission, for example associated with a downlink TB or a semi-persistent scheduling (SPS) release DCI). In an example embodiment, the TPC PUCCH index, indicated by the first configuration parameter, may be specific to a PUCCH group. In an example, the TPC PUCCH index (and the TPC command determined based on the TPC PUCCH index) may apply to the cell that is PUCCH carrier in the cell group at the time that PUCCH is transmitted. For example, a PUCCH cell/carrier of the PUCCH group may change/switch from a first cell of the PUCCH group to a second cell of the PUCCH group. The PUCCH cell/carrier may switch from the first cell to the second cell after receiving the DCI comprising the TPC commands. For example, as shown in FIG. 22, the wireless device may use the TPC command to determine the PUCCH power level of a PUCCH transmitted before PUCCH carrier switching and may use the TPC command to determine the PUCCH power level of a PUCCH transmitted after PUCCH carrier switching. The wireless device may switch a PUCCH carrier, from a first cell/carrier of the PUCCH group to a second cell/carrier of the PUCCH group, after receiving the DCI. The switching the PUCCH carrier may be based on one or more processes described above (e.g., based on an indication in a DCI and/or one or more rules to determine a PUCCH cell/carrier in a PUCCH group and/or a PUCCH cell/carrier timing pattern for determining a PUCCH carrier/cell in the PUCCH group). For example, the wireless device may determine a timing of a HARQ feedback associated with a downlink TB. The wireless device may receive the downlink TB in a cell of a PUCCH group. The wireless device may determine to switch a PUCCH carrier/cell from a first cell/carrier of the PUCCH group (e.g., PCell/PSCell of a primary PUCCH group) to a second cell/carrier in the PUCCH group (e.g., a SCell in the primary PUCCH group) for transmission of PUCCH carrying the HARQ feedback. The wireless device may use the TPC command to determine the power level of PUCCH in the second cell/carrier. In an example embodiment as shown in FIG. 23, the wireless device may determine a cell in the PUCCH group, that the TPC command applies to (to determine the PUCCH power), based on at least one of: a second DCI, a MAC CE, one or more third configuration parameters and/or one or more cell selection/determination rules for determining a PUCCH cell/carrier. The at least one of: the second DCI, the MAC CE, the one or more third configuration parameters and/or the one or more cell selection/determination rules may be used to determine the PUCCH cell/carrier used for transmission of PUCCH.

Figure 24:
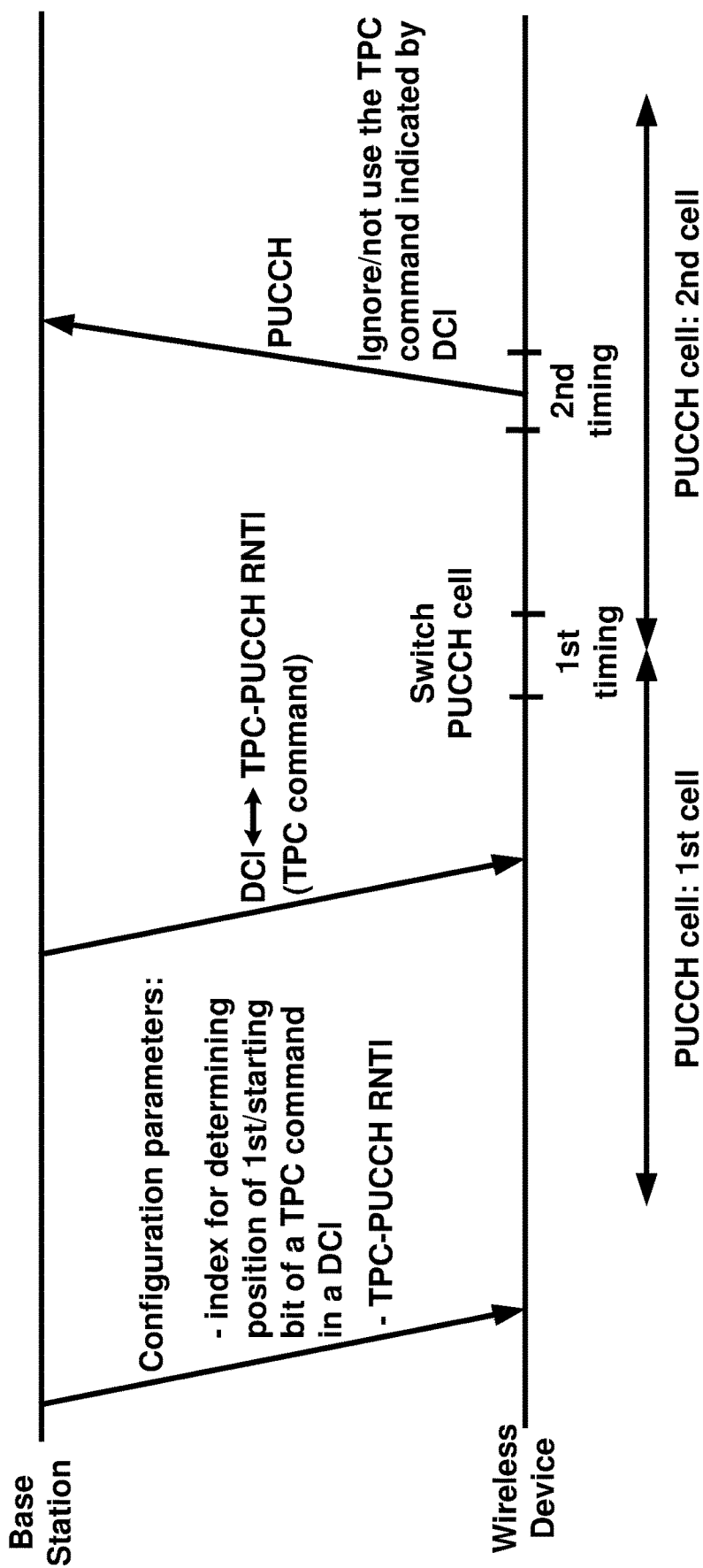
FIG. 24 shows an example process in accordance with several of various embodiments of the present disclosure.
Figure 25:
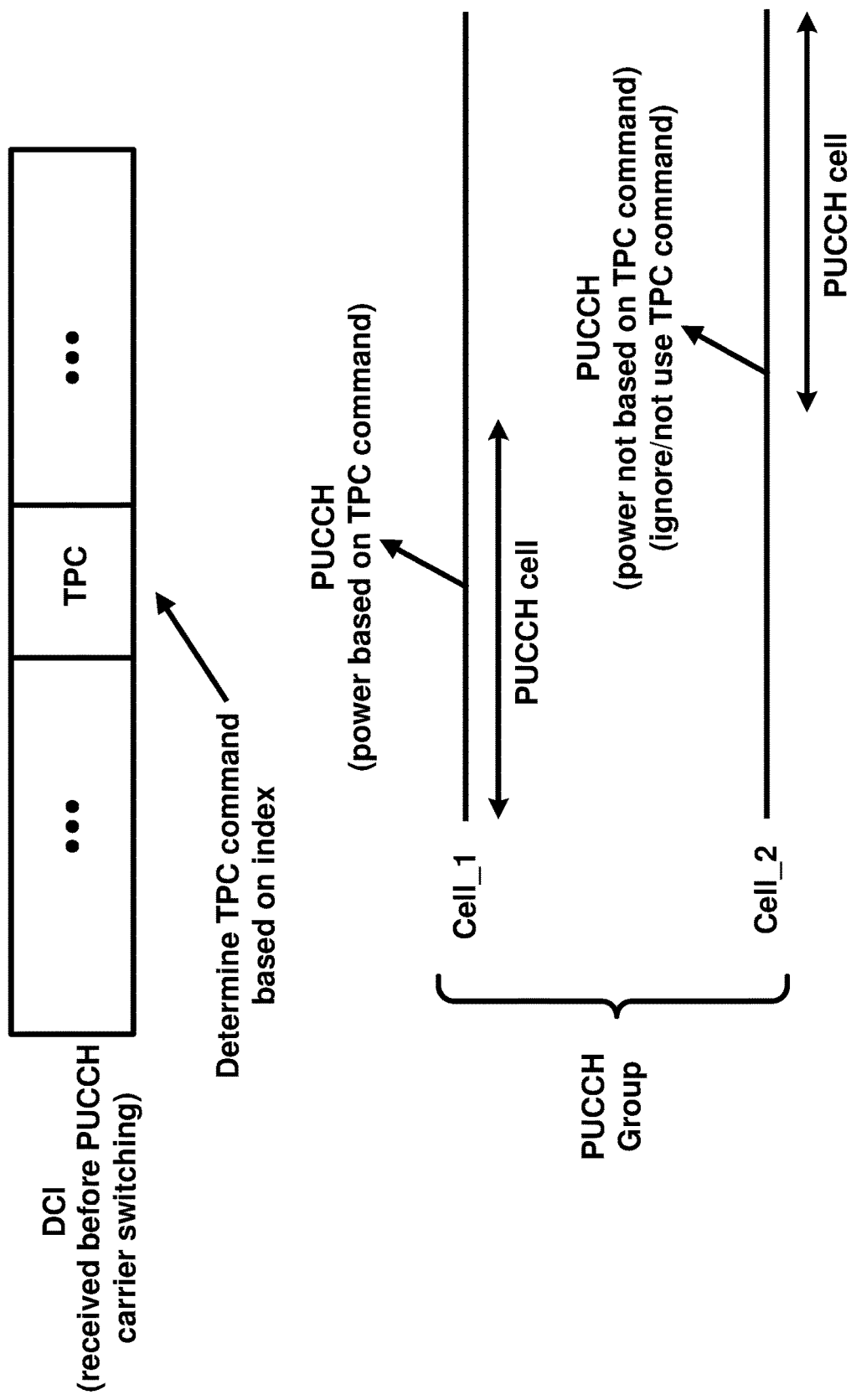
FIG. 25 shows an example process in accordance with several of various embodiments of the present disclosure.

In an example embodiment as shown in FIG. 24 and FIG. 25, a wireless device may receive one or more messages (e.g., one or more RRC messages) comprising configuration parameters. The configuration parameters may comprise a first configuration parameter, indicating an index (e.g., TPC PUCCH index) for determining the first/starting bit of a TPC command in a DCI comprising TPC commands (e.g., DCI format 2_2), and a second configuration parameter indicating a TPC-PUCCH RNTI. The wireless device may receive a DCI (e.g., DCI format 2_2) associated with TPC-PUCCH RNTI (e.g., with CRC scrambled by TPC-PUCCH RNTI) comprising TPC commands. The DCI may comprise a plurality of bits. The wireless device may determine a TPC command based on the plurality of bits and the index. In an example embodiment, the TPC command may be applicable to a cell of a PUCCH group that is the PUCCH cell/carrier at the time the DCI, comprising the TPC commands, is received. The PUCCH cell/carrier may be used for HARQ feedback transmission, for example HARQ feedback associated with a downlink TB or in response to a semi-persistent scheduling (SPS) release DCI. In an example, the TPC PUCCH index (and the TPC command determined based on the TPC PUCCH index) may apply to the cell that is PUCCH carrier in the cell group at the time that the DCI is received. For example, as shown in FIG. 24, a timing of the PUCCH carrier switching may be a first timing. The wireless device may receive the DCI comprising the TPC commands before the first timing. The first timing of the PUCCH carrier switching may be before a second timing of PUCCH transmission. The wireless device may ignore (e.g., may not use) the TPC command for determining the power level of PUCCH (e.g., PUCCH carrying HARQ feedback) based on the timing (e.g., the second timing) of the PUCCH being after the timing of (e.g., the first timing) PUCCH carrier switching. For example, as shown in FIG. 25, the wireless device may receive the DCI indicating the TPC commands before a PUCCH carrier switching and may use the TPC command to determine the PUCCH power level of a PUCCH transmitted before PUCCH carrier switching and may ignore (e.g., may not use) the TPC command to determine the PUCCH power level of a PUCCH transmitted after PUCCH carrier switching. The wireless device may switch, at the first timing, a PUCCH carrier from a first cell/carrier of the PUCCH group to a second cell/carrier of the PUCCH group, after receiving the DCI. The switching the PUCCH carrier may be based on one or more processes described above (e.g., based on an indication in a DCI and/or one or more rules to determine a PUCCH cell/carrier in a PUCCH group and/or a PUCCH cell timing pattern for determining a PUCCH cell/carrier in the PUCCH group). For example, the wireless device may determine a timing of a HARQ feedback associated with a downlink TB or may determine a timing of a HARQ feedback in response to a SPS release DCI. For example, the wireless device may receive the downlink TB in a cell of a PUCCH group. The wireless device may determine to switch a PUCCH carrier/cell from a first cell/carrier of the PUCCH group (e.g., PCell/PSCell of a primary PUCCH group) to a second cell/carrier in the PUCCH group (e.g., a SCell in the primary PUCCH group) for transmission of PUCCH carrying the HARQ feedback (e.g., HARQ feedback associated with the downlink TB). The wireless device may ignore the TPC command for determining the power level of PUCCH in the second cell/carrier. In an example, the wireless device may use a default/pre-configured and/or configurable TPC value and/or a default/pre-configured and/or configurable power control parameter for determination of the power level of PUCCH in the second cell/carrier. In an example, a command (e.g., a DCI (e.g., the DCI scheduling PDSCH/downlink TB or a different DCI such as a group common DCI) or a MAC CE) indicating PUCCH carrier/cell switching, from a first carrier/cell to a second carrier/cell, may comprise one or more fields with one or more values indicating one or more parameters for determining power level of the PUCCH transmitted via the second carrier/cell after the PUCCH carrier/cell switching.

Figure 26:
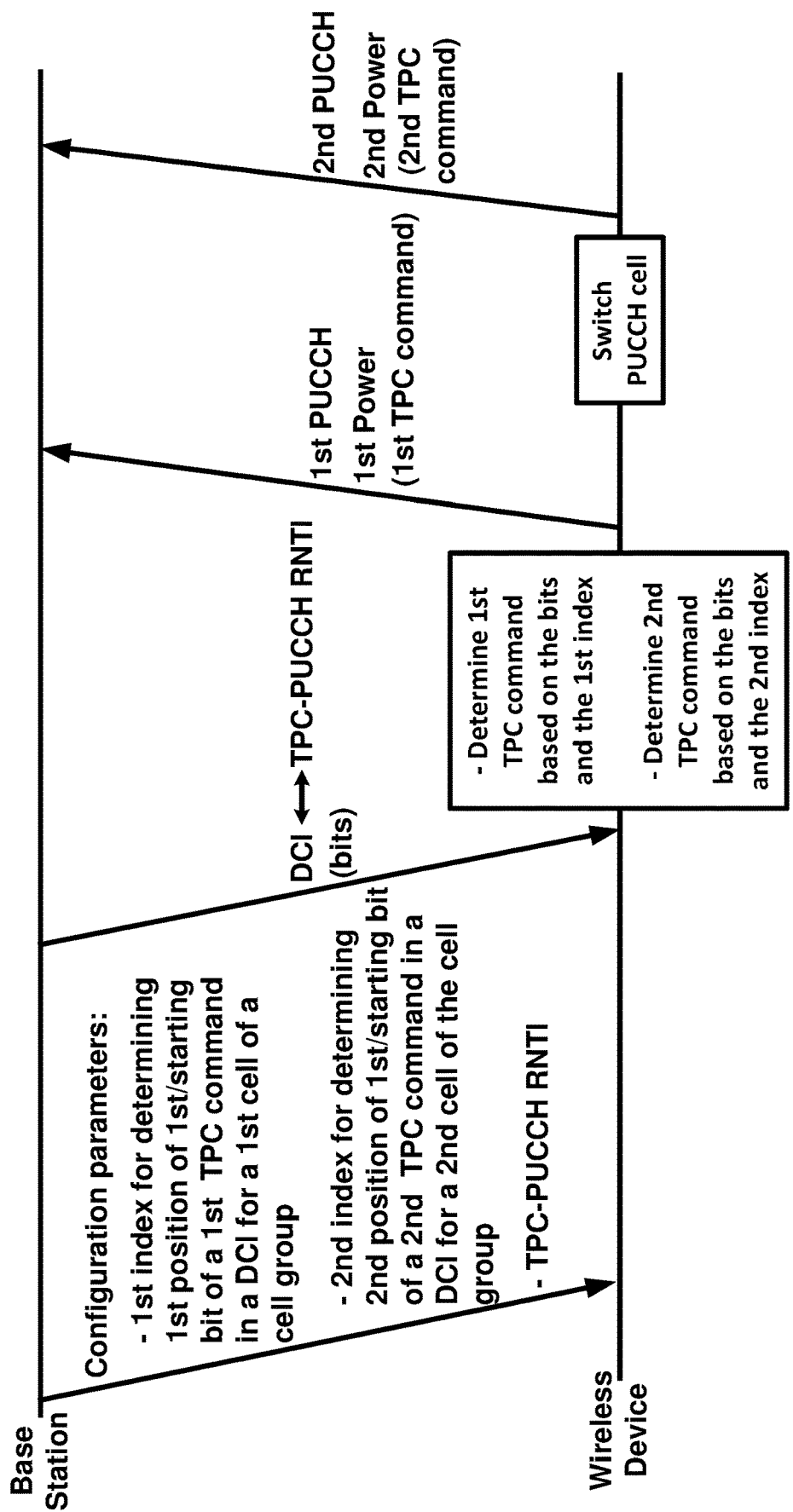
FIG. 26 shows an example process in accordance with several of various embodiments of the present disclosure.
Figure 27:
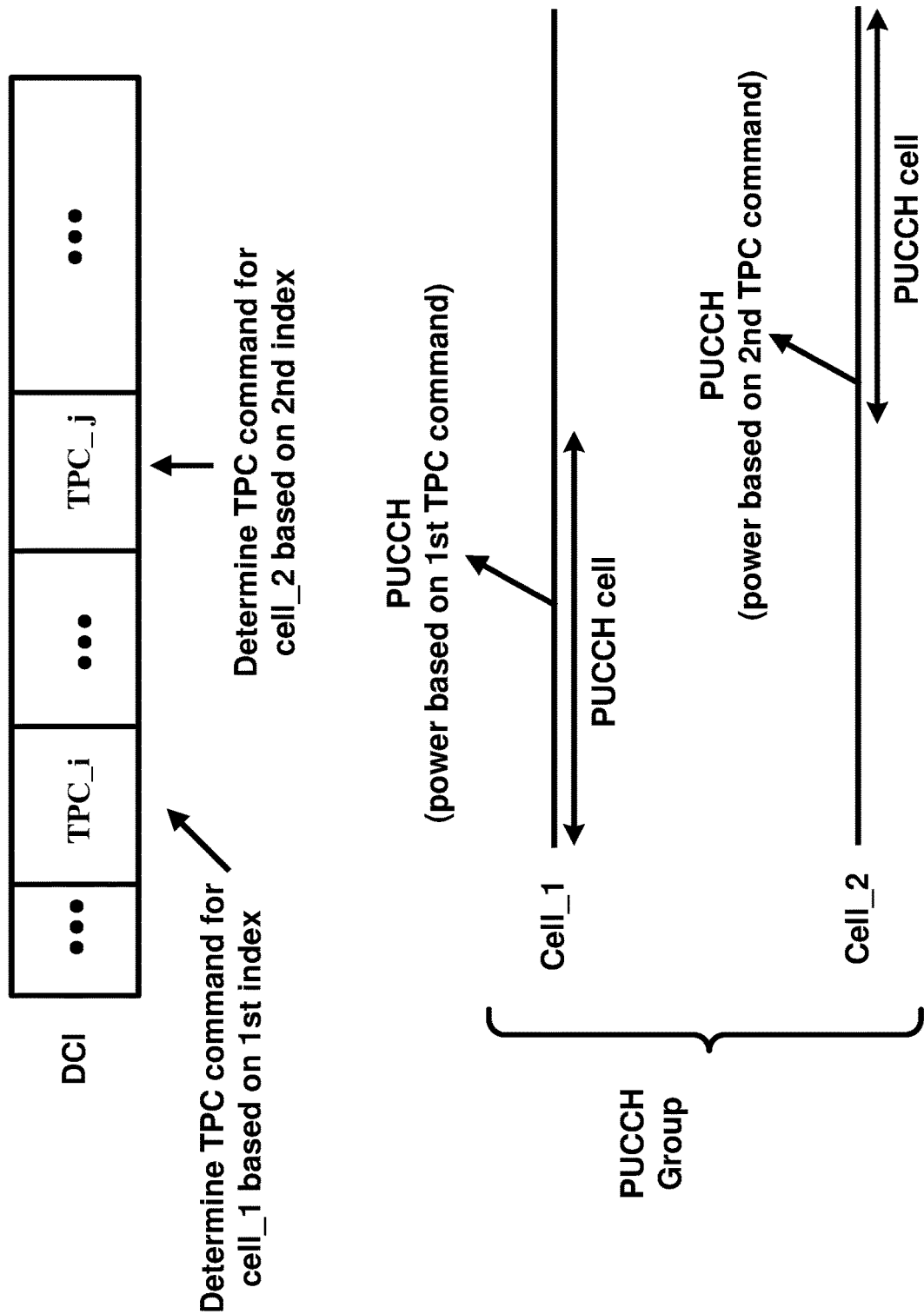
FIG. 27 shows an example process in accordance with several of various embodiments of the present disclosure.

In an example embodiment as shown in FIG. 26 and FIG. 27, a wireless device may receive one or more messages (e.g., one or more RRC messages) comprising configuration parameters. The configuration parameters may comprise a first configuration parameter, indicating a first index (e.g., a first TPC PUCCH index) for determining the first/starting bit of a first TPC command in a DCI comprising TPC commands (e.g., DCI format 2_2) and a second configuration parameter, indicating a second index (e.g., a second TPC PUCCH index) for determining the first/starting bit of a second TPC command in a DCI comprising TPC commands. The first TPC command may be applicable to a first cell in a cell group (e.g., PUCCH group) comprising a plurality of cells. The second TPC command may be applicable to a second cell in the cell group (e.g., the PUCCH group). The first cell and the second cell may be in the first plurality of cells, of the plurality of cells of the PUCCH group, that may be configured for PUCCH transmission. The configuration parameters may further comprise a third configuration parameter indicating a TPC-PUCCH RNTI. The wireless device may receive a DCI (e.g., DCI format 2_2) associated with TPC-PUCCH RNTI (e.g., with CRC scrambled by TPC-PUCCH RNTI) comprising TPC commands. The DCI may comprise a plurality of bits. The wireless device may determine a first TPC command based on the plurality of bits and the first index. The wireless device may determine a second TPC command based on the plurality of bits and the second index. For example, as shown in FIG. 27, the DCI may comprise a plurality of blocks/TPC commands and the wireless device may determine a first TPC command (TPC_i) and the second TPC command (TPC_j) and may use the first TPC command for determining power level of PUCCH transmitted while the first cell is the PUCCH cell and may use the second TPC command for determining power level of PUCCH transmitted while the second cell is the PUCCH cell. The wireless device may transmit a physical uplink control channel, via the first cell of the PUCCH group, with a first power level determined based on the first TPC command. The wireless device may switch a PUCCH cell/carrier from the first cell of the cell group to the second cell of the cell group. The switching the PUCCH cell/carrier from the first cell to the second cell may be based on one or more processes described above (e.g., based on an indication in a DCI and/or one or more rules to determine a PUCCH cell/carrier in a PUCCH group and/or a PUCCH cell timing pattern for determining a PUCCH cell/carrier in a PUCCH group).

Figure 28:
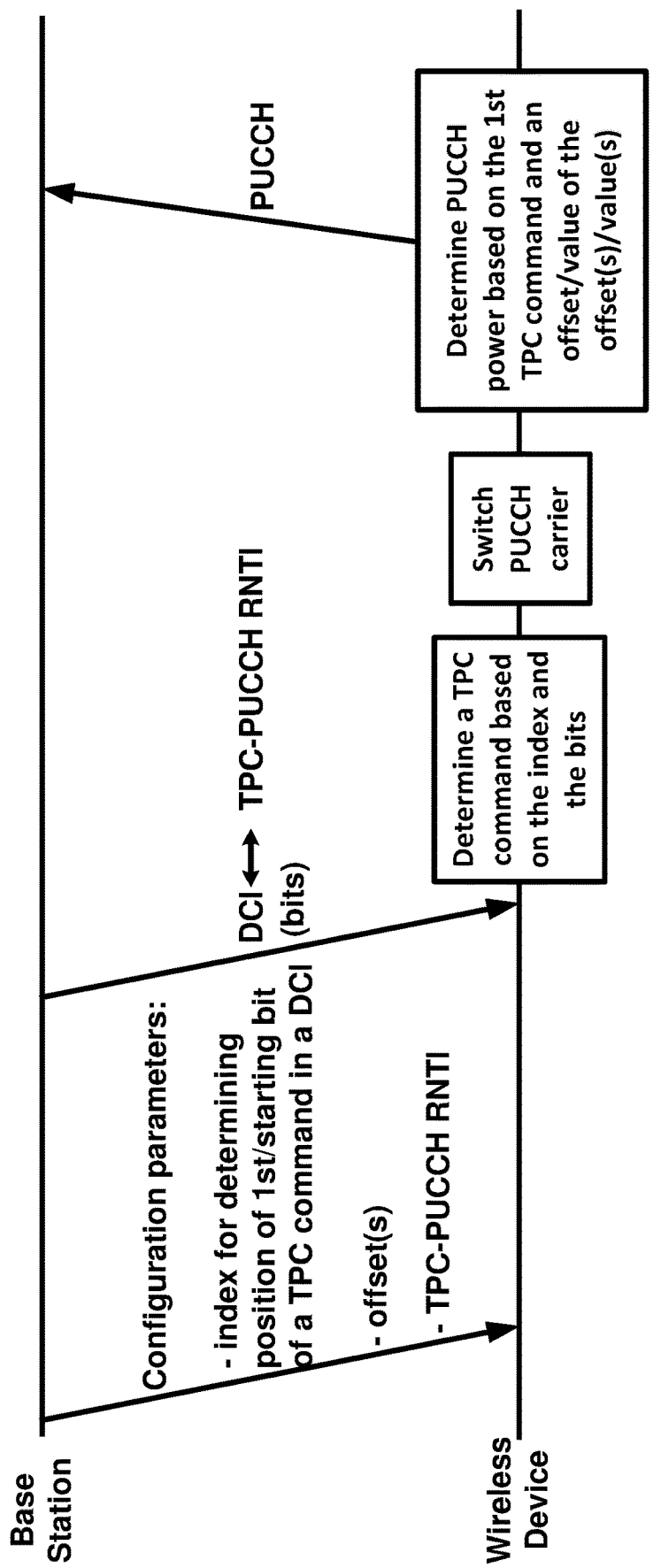
FIG. 28 shows an example process in accordance with several of various embodiments of the present disclosure.
Figure 29:
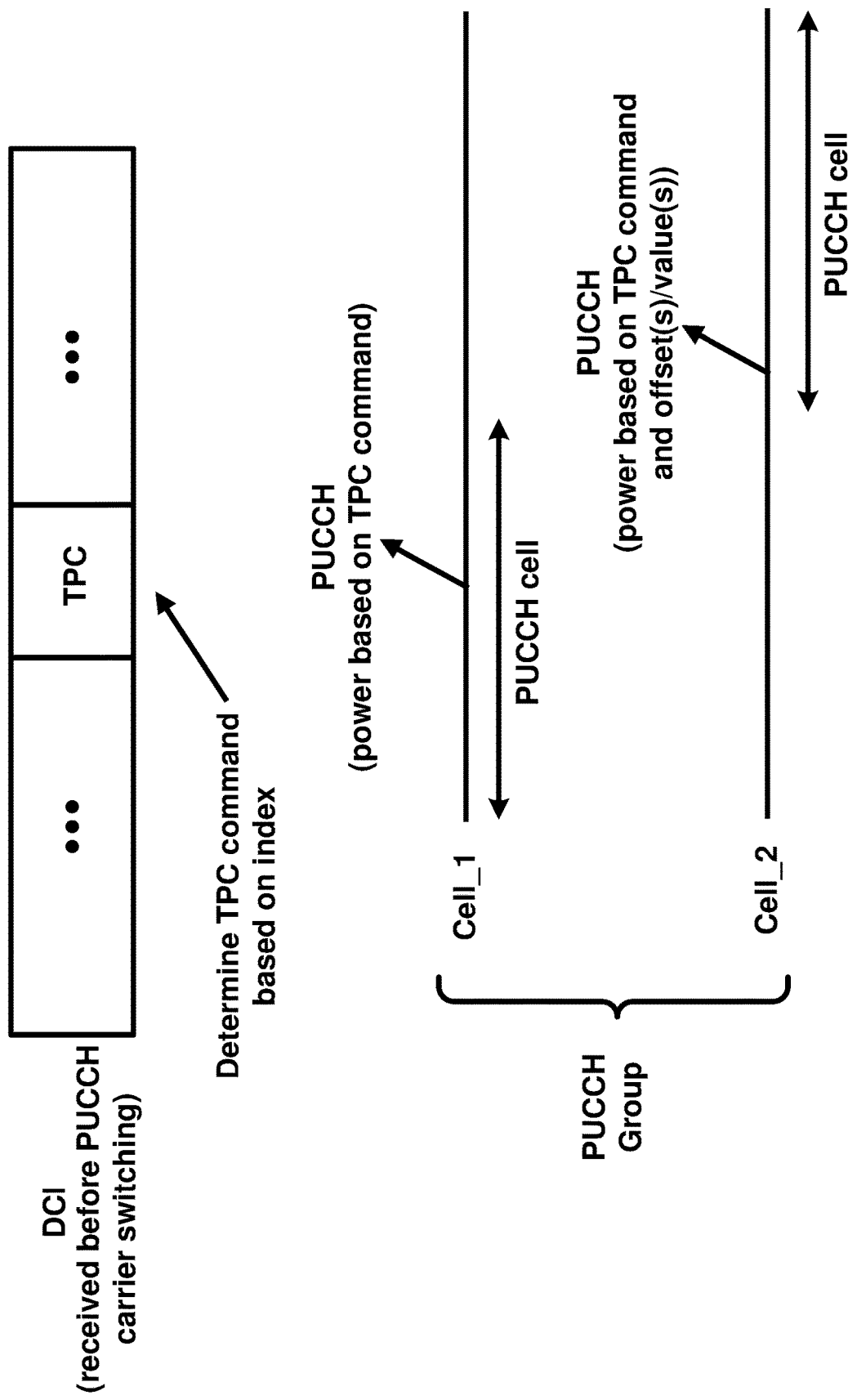
FIG. 29 shows an example process in accordance with several of various embodiments of the present disclosure.

In an example embodiment as shown in FIG. 28 and FIG. 29, a wireless device may receive one or more messages (e.g., one or more RRC messages) comprising configuration parameters. The configuration parameters may comprise a first configuration parameter, indicating an index (e.g., TPC PUCCH index) for determining the first/starting bit of a TPC command in a DCI comprising TPC commands (e.g., DCI format 2_2). The TPC command may be applicable to a first cell of a PUCCH group comprising a plurality of cells. For example, the first cell may be a PCell/PSCell in a primary PUCCH group or the first cell may be a PUCCH secondary cell (e.g., secondary cell configured with PUCCH configuration parameters) in a secondary PUCCH group. The wireless device may use one or more offset parameters and/or power control parameters/values, associated with one or more second cells of the PUCCH group, for determining PUCCH power levels of PUCCHs transmitted on the one or more second cells of the PUCCH group. For example, the one or more second cells may comprise a secondary cell in a primary PUCCH group (e.g., the PUCCH group comprising the primary cell). For example, the one or more second cells may comprise a secondary cell (e.g., a secondary cell other than the PUCCH SCell) in a secondary PUCCH group (e.g., the PUCCH group comprising the PUCCH SCell). In an example as shown in FIG. 28, the configuration parameters may further comprise one or more parameters (e.g., one or more offset parameters) indicating the one or more offsets and/or power control parameters/values associated with the one or more second cells of the PUCCH group. In an example, the wireless device may receive one or more DCIs (e.g., one or more DCIs scheduling one or more downlink TBs for which HARQ feedbacks are transmitted via the one or more second cells, or one or more common DCIs) indicating the one or more offset parameters and/or power control parameters/values. In an example, the wireless device may receive one or more MAC CEs indicating the one or more offset parameters and/or power control parameters/values. In an example, the one or more offsets may comprise one or more offsets to absolute power levels determined for the one or more PUCCHs of the one or more second cells or may be one or more offsets to a TPC command (e.g., the TPC command for the first cell of the PUCCH group and determined based on the index) based on which the power levels of the one or more PUCCHs of the one or more second cells may be determined. The wireless device may receive a third configuration parameter indicating a TPC PUCCH RNTI. The wireless device may receive a DCI (e.g., DCI format 2_2) associated with the TPC PUCCH RNTI (e.g., with a CRC field of the DCI scrambled by the TPC PUCCH RNTI). The DCI may comprise a plurality of bits. The wireless device may determine a TPC command for the first cell of the PUCCH group based on the plurality of bits of the DCI and based on the index (e.g., TPC PUCCH index). The wireless may switch an uplink carrier/cell from the first cell of the PUCCH group to a second cell of the PUCCH group based on a PUCCH cell/carrier switching process described above (e.g., based on an indication in a DCI and/or one or more rules to determine a PUCCH cell/carrier in a PUCCH group and/or a PUCCH cell timing pattern for determining a PUCCH cell/carrier in a PUCCH group). An example is shown in FIG. 29. The wireless device may receive the DCI comprising the TPC commands (e.g., the DCI format 2_2) before the PUCCH carrier/cell switching. The wireless device may transmit a PUCCH (e.g., PUCCH carrying HARQ feedback associated with a DL TB or a SPS release DCI) on the first cell (e.g., Cell_1 in FIG. 29) before the PUCCH carrier/cell switching. The wireless device may determine a power level of the PUCCH on the first cell based the TPC command indicated by the DCI (e.g., the DCI comprising the TPC commands). The wireless device may transmit a PUCCH (e.g., PUCCH carrying HARQ feedback associated with a DL TB or a SPS release DCI) on the second cell (e.g., Cell_2 in FIG. 29) after the PUCCH carrier/cell switching. The wireless device may determine a power level of the PUCCH on the second cell based on the TPC command indicated by the DCI and based on one or more offsets and/or power control parameters associated with the second cell.

Figure 30:
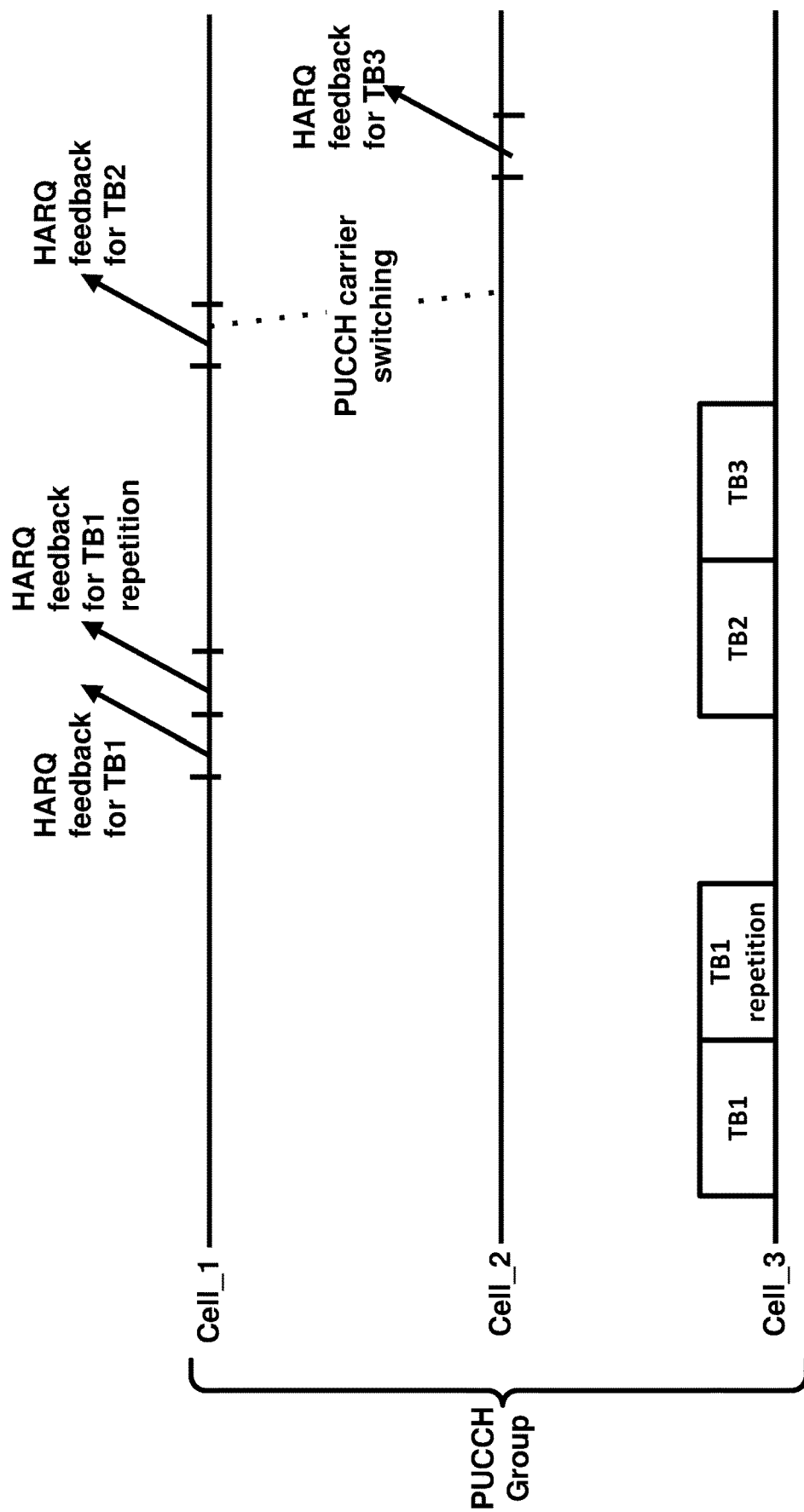
FIG. 30 shows an example process in accordance with several of various embodiments of the present disclosure.

In an example embodiment as shown in FIG. 30, a wireless device may receive a downlink TB and a repetition of the downlink TB. In an example, the downlink TB and the repetition of the downlink TB may be received in two slots among a plurality of adjacent slots that repetitions of the downlink TB are received. In an example, the downlink TB and the repetition of the downlink TB may be received by the wireless device in adjacent slots. In an example, the downlink TB and the repetition of the downlink TB may be associated with a downlink semi-persistent scheduling (SPS) configuration. For example, the wireless device may receive one or more messages comprising configuration parameters of the downlink SPS configuration and the wireless device may receive the downlink TB and the repetition of the downlink TB based on the configuration parameters. For example, the configuration parameters of the downlink SPS configuration may comprise a repetition factor and the wireless device may receive the downlink TB and the repetition of the downlink TB based on the repetition factor. For example, the wireless device may determine the radio resources of the downlink TB and the repetition of the downlink TB based on the configuration parameters of the downlink SPS configuration (e.g., periodicity, repetition factor, etc.) and based on an activation DCI indicating activation of the downlink SPS configuration. The wireless device may transmit a first HARQ feedback associated with the downlink TB and a second HARQ feedback associated with the repetition of the downlink TB. The first HARQ feedback and the second HARQ feedback may be transmitted via a first PUCCH and a second PUCCH of the same cell, e.g., without PUCCH carrier switching between a timing of the first PUCCH and a timing of the second PUCCH. In an example, the wireless device may transmit the first HARQ feedback and the second HARQ feedback via the first PUCCH and the second PUCCH of the same cell (e.g., without PUCCH carrier switching between a timing of the first PUCCH and a timing of the second PUCCH) based on and/or in response to the first HARQ feedback and the second HARQ feedback being associated with the repetitions of the same downlink TB. A PUCCH carrier/cell may not be switched/changed between HARQ feedbacks transmissions associated with repetitions of the same downlink TB.

In an example, the wireless device may receive a second downlink TB and a third downlink TB. The second and third downlink TB s may be different TB s and may not be repetitions of the same downlink TB. The second downlink TB and the third downlink TB may be or may not be received in adjacent slots. The wireless device may transmit the HARQ feedbacks associated with the second downlink TB and the third downlink TB. The wireless device may switch/change the PUCCH carrier/cell in a PUCCH group associated with the cell that the second downlink TB and the third downlink TB are received. For example, as shown in FIG. 30, the wireless device may switch the PUCCH carrier from cell_1 to cell_2 in between transmissions of HARQ feedbacks for the second downlink TB and the third downlink TB.

In an example embodiment, the wireless device may transmit to a base station a capability message comprising one or more information elements indicating whether the wireless device is capable of PUCCH carrier/cell switching between PUCCH transmissions carrying HARQ feedbacks associated with repetitions of the same downlink TB. For example, one or more first values of the one or more information elements may indicate that the wireless device is capable of PUCCH carrier/cell switching between PUCCH transmissions carrying HARQ feedbacks associated with repetitions of the same downlink TB and one or more second values of the one or more information elements may indicate that the wireless device is not capable of PUCCH carrier/cell switching between PUCCH transmissions carrying HARQ feedbacks associated with repetitions of the same downlink TB. In an example, in response to the wireless device being capable of switching PUCCH carrier/cell between PUCCH transmissions carrying HARQ feedbacks associated with repetitions of the same downlink TB, the wireless device may switch the PUCCH carrier/cell between PUCCH transmissions carrying HARQ feedbacks associated with repetitions of the same downlink TB based on a PUCCH carrier/cell switching process described above (e.g., based on an indication in a DCI and/or one or more rules to determine a PUCCH cell/carrier in a PUCCH group and/or a PUCCH cell timing pattern for determining a PUCCH cell/carrier in a PUCCH group).

Figure 31:
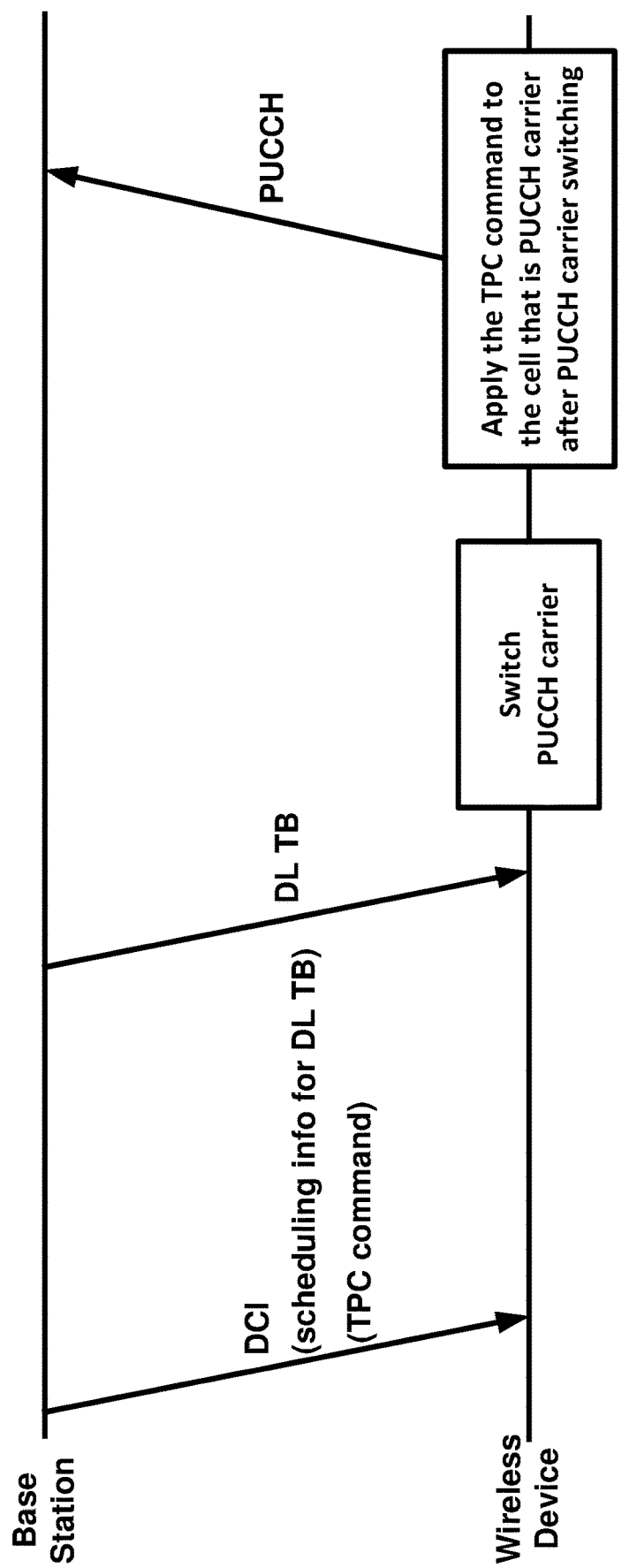
FIG. 31 shows an example process in accordance with several of various embodiments of the present disclosure.
Figure 32:
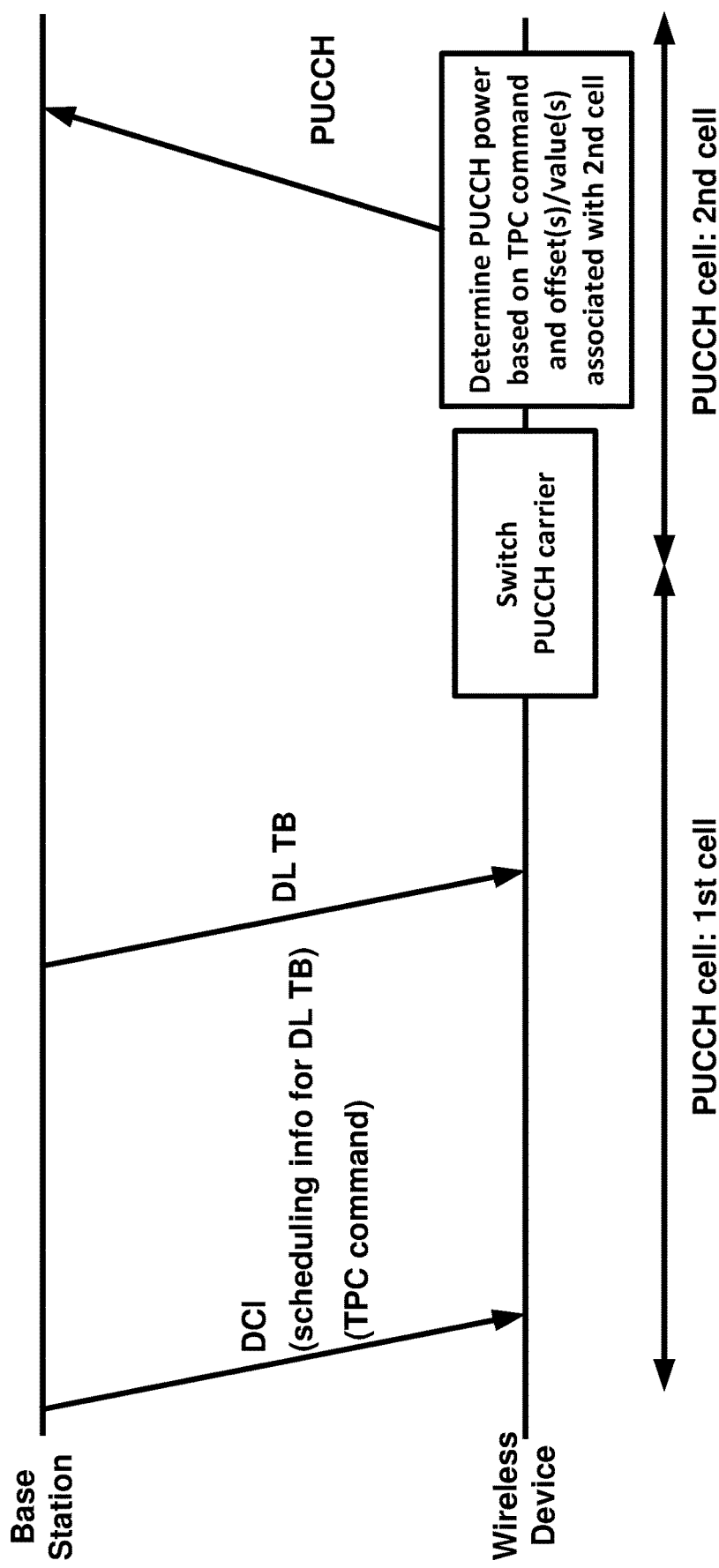
FIG. 32 shows an example process in accordance with several of various embodiments of the present disclosure.
Figure 33:
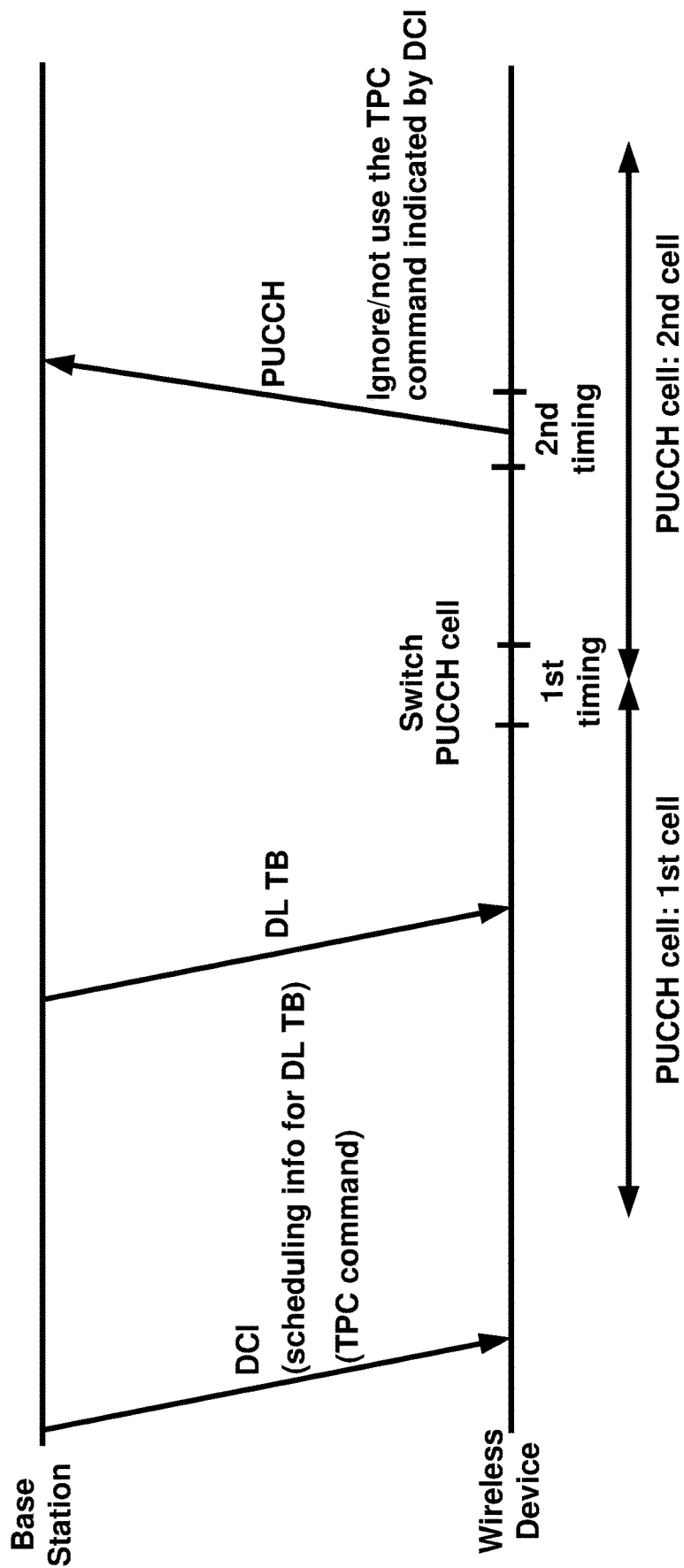
FIG. 33 shows an example process in accordance with several of various embodiments of the present disclosure.

In embodiments as shown in FIG. 31, FIG. 32 and FIG. 33, a wireless device may receive a downlink scheduling DCI (e.g., DCI format 1_0, 1_1 or 1_2) comprising scheduling information for reception of a downlink TB. The DCI may comprise a field (e.g., a TPC command for scheduled PUCCH field) indicating a TPC command. The TPC command may be for determining power level for a PUCCH carrying the HARQ feedback associated with the downlink TB scheduled by the DCI. The wireless device may receive the downlink TB based on the scheduling information in the DCI. The wireless device may switch/change a PUCCH carrier/cell of a PUCCH group (e.g., a primary PUCCH group comprising a primary cell or a secondary PUCCH group comprising a PUCCH secondary cell). For example, the wireless device may switch the PUCCH carrier/cell from a first cell of the PUCCH group to a second cell of the PUCCH group. The switching of the PUCCH carrier/cell from the first cell to the second cell may be based on a PUCCH carrier/cell switching process described above (e.g., based on an indication in a DCI and/or one or more rules to determine a PUCCH cell/carrier in a PUCCH group and/or a PUCCH cell timing pattern for determining a PUCCH cell/carrier in a PUCCH group). The first cell and the second cell may be configured for PUCCH transmission in the PUUCH group. The PUCCH group may comprise the cell via which the wireless device receives the downlink TB. The wireless device may switch the PUCCH carrier/cell in response to and/or after receiving the DCI. In an example, the wireless device may switch/change the PUCCH carrier/call after receiving the downlink TB scheduled by the downlink TB.

In an example embodiment as shown in FIG. 31, the wireless device may use the TPC command, indicated by the DCI that scheduled the downlink TB and is received before the PUCCH carrier switching, to determine the power level of the PUCCH transmitted via the second cell after the PUCCH carrier/cell switching. The TPC command indicated by the DCI may be applicable to a cell of the PUCCH group that is PUCCH cell or is used for PUCCH transmission at the timing of the HARQ feedback transmission.

In an example embodiment as shown in FIG. 32, the wireless device may use the TPC command, indicated by the DCI that scheduled the downlink TB and is received before the PUCCH carrier/cell switching, and one or more parameters (e.g., one or more offset parameters and/or one or more power control parameters/values) associated with the second cell (e.g., associated with the PUCCH carrier/cell after the PUCCH carrier/cell switching) to determine the power level of the PUCCH transmitted via the second cell after the PUCCH carrier/cell switching. For example, the one or more offset parameters and/or power control parameters/values may be configurable parameters (e.g., indicated by one or more RRC parameters) or may have a pre-configured/pre-determined value. In an example, the wireless device may receive one or more DCIs (e.g., one or more DCIs scheduling one or more downlink TB s for which HARQ feedbacks are transmitted via the one or more second cells, or one or more common DCIs) indicating the one or more offset parameters and/or one or more power control parameters/values. In an example, the wireless device may receive one or more MAC CEs indicating the one or more offset parameters and/or the one or more power control parameters/values. In an example, the one or more offsets may comprise one or more offsets to absolute power levels determined for the PUCCH of the second cell or may be one or more offsets to a TPC command (e.g., the TPC command for the first cell of the PUCCH group and determined based on the index) based on which the power levels of the PUCCH of the second cell may be determined.

In an example embodiment as shown in FIG. 33, in response to switching the PUCCH carrier/cell after and/or in response to receiving the downlink scheduling DCI, the wireless device may ignore the TPC command indicated by the downlink scheduling DCI. The wireless device may transmit the PUCCH via the second cell after the PUCCH carrier/cell switching. The wireless device may determine the power level of the PUCCH for transmission via the second cell. The wireless device may determine the power level of the PUCCH for transmission via the second cell without using the TPC command indicated by the downlink scheduling DCI in response to switching the PUCCH carrier/cell after and/or in response to receiving the downlink scheduling DCI.

In an example embodiment, a wireless device may transmit to a base station, one or more capability messages comprising one or more capability information elements indicating at least one of: the wireless device is capable of supporting physical uplink control channel (PUCCH) carrier switching; and a processing time/time window associated with the PUCCH carrier switching that the wireless device supports. The wireless device may receive configuration parameters associated with one or more PUCCH carriers in a PUCCH group and/or PUCCH carrier switching.

In an example, the processing time/time window associated with the PUCCH carrier switching may indicate a minimum processing time between a command and/or control information (e.g., received in a DCI) indicating PUCCH carrier switching and a timing of the PUCCH carrier switching. In an example, the processing time/time window associated with the PUCCH carrier switching may indicate a minimum processing time between a command and/or control information (e.g., received in a DCI) indicating PUCCH carrier switching and a timing of PUCCH transmission on a cell after PUCCH carrier switching.

In an example, the processing time/time window associated with the PUCCH carrier switching may indicate a minimum time between a first PUCCH carrier switching and a second PUCCH carrier switching. In an example, the processing time/time window associated with the PUCCH carrier switching may indicate a minimum time between two consecutive PUCCH carrier switching. In an example, the processing time/time window associated with the PUCCH carrier switching may indicate a minimum time that a cell may be a PUCCH carrier before PUCCH carrier switching.

In an example, the processing time/time window may be in a first number of symbols/slots.

In an example, one or more first values of the one or more information elements indicate that the wireless device is capable of supporting PUCCH carrier switching. One or more second values of the one or more information elements indicate that the wireless device is not capable of supporting PUCCH carrier switching.

In an example embodiment, a wireless device may receive one or more messages comprising: a first configuration parameter indicating an index for determining a position of a first bit (e.g., starting bit) of a transmit power control (TPC) command in a downlink control information (DCI), wherein the TPC command is applicable to one of a first plurality of cells in a cell group comprising a plurality of cells; and a second configuration parameter indicating a TPC-physical uplink control channel (PUCCH) radio network temporary identifier (RNTI). The wireless device may receive a first DCI, associated with the TPC-PUCCH RNTI, comprising a plurality of bits. The wireless device may determine the TPC command based on the index and based on the plurality of bits. The wireless device may determine the one of the first plurality of cells, to which the TPC command applies, based on at least one of: a second DCI; a medium access control (MAC) control element (CE); one or more third configuration parameters; and one or more cell selection/determination rules. The wireless device may transmit uplink control information via a PUCCH of the one of the first plurality of cells and using a power level determined based on the TPC command.

In an example, the at least one of: the second DCI; the medium access control (MAC) control element (CE); the one or more third configuration parameters; and one or more cell selection/determination rules indicates PUCCH carrier switching from a first cell/carrier to a second cell/carrier. The one of the first plurality of cells, to which the TPC command applies, may be the second cell.

In an example, the wireless device may receive the second DCI. The second DCI may comprise a field with a value indicating switching from a first cell/carrier, in the first plurality of cells/carriers, to a second cell/carrier in the first plurality of cells as a PUCCH cell. The one of the first plurality of cells, to which the TPC command applies, may be the second cell.

In an example, the second DCI may be for scheduling a downlink TB via a PDSCH. The uplink control information may comprise HARQ feedback associated with the PDSCH/downlink TB.

In an example, the wireless device may receive the MAC CE. The MAC CE may indicate switching from a first cell, in the first plurality of cells, to a second cell in the first plurality of cells as a PUCCH cell. The one of the first plurality of cells, to which the TPC command applies, is the second cell.

In an example, the one or more messages further comprise the one or more third configuration parameters. The one or more third configuration parameters may indicate a timing pattern. The determining the one of the first plurality of cells, to which the TPC command applies, may be based on the timing pattern. In an example, the timing pattern may indicate time durations that a cell in the first plurality of cells is a PUCCH cell and/or is used for transmission of PUCCH. In an example, the one or more third configuration parameters may indicate a slot format indicating downlink, uplink and flexible symbols. The timing pattern may be based on the slot format. In an example, the slot format may be for a primary cell (e.g., PCell/PSCell).

In an example, the one or more messages further comprise the one or more third configuration parameters. The one or more third configuration parameters indicate a slot format. The determining the one of the first plurality of cells, to which the TPC command applies, may be based on the slot format. In an example, the slot format may indicate uplink, downlink and flexible symbols. In an example, the cell group may be a primary cell group and the slot format may be associated with the primary cell.

In an example, the uplink control information may comprise hybrid automatic repeat request (HARQ) feedback (e.g., HARQ feedback associated with DL TB received via a PDSCH or in response to a SPS release DCI).

In an example, the wireless device may receive configuration parameters of the plurality of cells, wherein the configuration parameters may indicate that the first plurality of cells are configured for PUCCH transmission.

In an example, the cell group may be a PUCCH group. In an example, the PUCCH group may be a primary PUCH group comprising a primary cell. In an example, the PUCCH group may be a secondary PUCCH group comprising a PUCCH SCell.

In an example embodiment, a wireless device may receive one or more messages comprising: a first configuration parameter indicating an index for determining a position of a first bit (e.g., starting bit) of a transmit power control (TPC) command in a downlink control information (DCI); and a second configuration parameter indicating a TPC-physical uplink control channel (PUCCH) radio network temporary identifier (RNTI). The wireless device may receive a DCI, associated with the TPC-PUCCH RNTI, comprising a plurality of bits. The wireless device may determine a TPC command based on the index and the plurality of bits. The wireless device may switch a PUCCH carrier/cell, in a first timing after receiving the DCI, from a first cell in a plurality of cells of a cell group to a second cell in the plurality of cells of the cell group, wherein the determining may be based on at least one of: a second DCI; a medium access control (MAC) control element (CE); one or more third configuration parameters; and one or more cell selection/determination rules. The wireless device may ignore (e.g., may not use) the TPC command in response to a second timing of a PUCCH transmission being after the first timing of the PUCCH carrier/cell switching.

In an example, the cell group may be a PUCCH group. In an example, the PUCCH group may be a primary PUCCH group comprising a primary cell. In an example, the cell group may be a secondary PUCCH group comprising a PUCCH SCell.

In an example, the wireless device may receive a second DCI, wherein the second DCI may comprise a field with a value indicating switching from a first cell/carrier, in a first plurality of cells/carriers of the cell group, to a second cell/carrier in the first plurality of cells of the cell group, as a PUCCH cell.

In an example, the second DCI may be for scheduling a downlink TB via a PDSCH.

In an example, the wireless device may receive the MAC CE wherein the MAC CE may indicate switching from a first cell/carrier, in a first plurality of cells of the cell group, to a second cell in the first plurality of cells of the cell group, as a PUCCH cell.

In an example, the one or more messages further comprise the one or more third configuration parameters. The one or more third configuration parameters indicate a timing pattern. The switching the PUCCH cell from the first cell to the second cell may be based on timing pattern. In an example, the timing pattern may indicate time durations that a cell is a PUCCH cell (e.g., is used for transmission of PUCCH). In an example, the one or more third configuration parameters may indicate a slot format indicating downlink, uplink and flexible symbols. The timing pattern may be based on the slot format. In an example, the cell group may comprise a primary cell (e.g., may be a primary PUCCH group). The slot format may be associated with the primary cell.

In an example, the wireless device may receive configuration parameters of the plurality of cells, of the PUCCH group, wherein the configuration parameters may indicate that a first plurality of cells, of the plurality of cells, are configured for PUCCH transmission.

In an example embodiment, a wireless device may receive one or more messages comprising a first configuration parameter, a second configuration parameter and a third configuration parameter. The first configuration parameter may indicate a first index for determining a first position of a first bit (e.g., a first starting bit) of a first transmit power control (TPC) command in a downlink control information (DCI). The first TPC command may be applicable to a first cell in a cell group comprising a plurality of cells. The first cell may be a physical uplink control channel (PUCCH) cell/carrier of the cell group. The second configuration parameter may indicate a second index for determining a second position of a first bit (e.g., a second starting bit) of a second TPC command in the DCI. The second TPC command may be applicable to a second cell in the first cell group. The second cell may be the PUCCH cell of the cell group in response to a PUCCH cell/carrier switching. The third configuration parameter may indicate a TPC-PUCCH radio network temporary identifier (RNTI). The wireless device may receive a first DCI, associated with the TPC-PUCCH RNTI, comprising a plurality of bits. The wireless device may determine the first TPC command based on the first index and based on the plurality of bits. The wireless device may determine the second TPC command based on the second index and based on the plurality of bits. The wireless device may transmit first uplink control information via a first PUCCH of the first cell and using a first power level determined based on the first TPC command. The wireless device may switch the PUCCH cell/carrier of the cell group from the first cell to the second cell. The wireless device may transmit second uplink control information via a second PUCCH of the second cell and using a second power level determined based on the second TPC command.

In an example, the cell group may be a PUCCH group. In an example, the PUCCH group may be a primary PUCCH group comprising a primary cell. In an example, the cell group may be a secondary PUCCH group comprising a PUCCH SCell.

In an example, the switching the PUCCH cell/carrier may be at least based on one of: a second DCI; a medium access control (MAC) control element (CE); one or more third configuration parameters; and one or more cell selection/determination rules.

In an example, the first uplink control information comprises first HARQ feedback (e.g., associated with a first DL TB or in response to a first SPS release DCI) and the second uplink control information may comprise second HARQ feedback (e.g., associated with a second DL TB or in response to a second SPS release DCI).

In an example, the wireless device may receive the second DCI, wherein the second DCI may comprise a field with a value indicating switching from a first cell/carrier, in a first plurality of cells/carriers of the cell group, to a second cell/carrier in the first plurality of cells of the cell group, as a PUCCH cell.

In an example, the one or more messages may further comprise the one or more third configuration parameters. The one or more third configuration parameters may indicate a timing pattern. The switching the PUCCH cell from the first cell to the second cell may be based on the timing pattern. In an example, the timing pattern may indicate time durations that a cell is a PUCCH cell (e.g., used for transmission of PUCCH). In an example, the one or more third configuration parameters may indicate a slot format indicating downlink, uplink and flexible symbols. The timing pattern may be based on the slot format. In an example, the slot format may be for a primary cell (e.g., PCell/PSCell). In an example, the cell group may comprise a primary cell and the slot format may be associated with the primary cell.

In an example, the wireless device may receive configuration parameters of the plurality of cells, wherein the configuration parameters may indicate that a first plurality of cells are configured for PUCCH transmission.

In an example embodiment, a wireless device may receive one or more messages comprising a first configuration parameter, one or more offset parameters/values and a third configuration parameter. The first configuration parameter may indicate an index for determining a position of a first bit (e.g., a first starting bit) of a transmit power control (TPC) command in a downlink control information (DCI). The TPC command may be applicable to a first cell in a cell group comprising a plurality of cells. The first cell may be a physical uplink control channel (PUCCH) cell of the cell group. The one or more offset parameters/values may indicate one or more offsets/values associated with one or more second cells. The third configuration parameter may indicate a TPC-PUCCH radio network temporary identifier (RNTI). The wireless device may receive a first DCI, associated with the TPC-PUCCH RNTI, comprising a plurality of bits. The wireless device may switch the PUCCH carrier/cell of the cell group from the first cell to a second cell of the one or more second cells. The wireless device may determine the TPC command based on the index and based on the plurality of bits. The wireless device may determine a power level based on the TPC command and one or more offsets/values associated with the second cell. The wireless device may transmit uplink control information via a second PUCCH of the second cell and using the second power level.

In an example, the uplink control information may comprise HARQ feedback.

In an example, the cell group may be a PUCCH group. In an example, the PUCCH group may be a primary PUCCH group comprising a primary cell. In an example, the cell group may be a secondary PUCCH group comprising a PUCCH SCell.

In an example, the wireless device may determine a second TPC command based on the TPC command and the one or more offsets/values, wherein the determining the power level may be based on the second TPC command.

In an example, the wireless device may determine a first power level based on the TPC command, wherein the power level may be based on the first power level and the one or more offsets/values.

In an example, the switching the PUCCH carrier/cell may be based on at least one of: a second DCI; a medium access control (MAC) control element (CE); one or more third configuration parameters; and one or more cell selection/determination rules. In an example, the wireless device may receive the second DCI, wherein the second DCI may comprise a field with a value indicating switching from a first cell/carrier, in a first plurality of cells/carriers of the cell group, to a second cell/carrier in the first plurality of cells of the cell group, as a PUCCH cell. In an example, the second DCI may be for scheduling a downlink TB via a PDSCH. In an example, the wireless device may receive the MAC CE wherein the MAC CE may indicate switching from a first cell/carrier, in a first plurality of cells of the cell group, to a second cell in the first plurality of cells of the cell group, as a PUCCH cell.

In an example, the one or more messages may further comprise the one or more third configuration parameters. The one or more third configuration parameters may indicate a timing pattern. The switching the PUCCH cell from the first cell to the second cell may be based on timing pattern. In an example, the timing pattern may indicate time durations that a cell is a PUCCH cell (e.g., used for transmission of PUCCH). In an example, the one or more third configuration parameters indicate a slot format indicating downlink, uplink and flexible symbols. The timing pattern may be based on the slot format. In an example, the slot format may be for a primary cell (e.g., PCell/PSCell). In an example, the cell group may comprise a primary cell and the slot format may be associated with the primary cell.

In an example, the wireless device may receive configuration parameters of the plurality of cells, wherein the configuration parameters may indicate that a first plurality of cells are configured for PUCCH transmission.

In an example embodiment, a wireless device may receive a downlink TB in a first slot and repetition of the downlink TB in a second slot. The wireless device may transmit a first HARQ feedback, associated with the downlink TB, via a first PUCCH. The wireless device may transmit a second HARQ feedback, associated with the repetition of the downlink TB, via a second PUCCH. The first PUCCH and the second PUCCH may be of the same cell in response to the first PUCCH and the second PUCCH carrying HARQ feedbacks associated with the downlink TB and the repetition of the downlink TB.

In an example, the first slot may be adjacent to the second slot.

In an example, a PUCCH carrier/cell may not be switched/changed between transmission of the first PUCCH and transmission of the second PUCCH based on the first HARQ feedback being associated with the downlink TB and the second HARQ feedback being associated with the repetition of the downlink TB.

In an example, the wireless device may receive configuration parameters of a downlink semi-persistent scheduling (SPS) configuration, wherein the receiving the downlink TB and the repetition of the downlink TB may be based on the downlink SPS configuration parameters. In an example, the downlink SPS configuration parameters may comprise a parameter indicating a repetition factor. The receiving the downlink TB and the repetition of the downlink TB may be based on the repetition factor. In an example, the downlink SPS configuration parameters may comprise a parameter indicating a periodicity. The receiving the downlink TB and the repetition of the downlink TB may be based on the periodicity. In an example, the wireless device may receive an activation DCI indicating activation of the downlink SPS configuration.

In an example, the wireless device may receive a second downlink TB in a third slot and a third downlink TB in a fourth slot, wherein the third downlink TB is not a repetition of the second downlink TB. The wireless device may transmit a third HARQ feedback associated with the second downlink TB in a third slot via a third PUCCH of a first cell. The wireless device may transmit a fourth HARQ feedback associated with the third downlink TB in a fourth slot via a fourth PUCCH of a second cell and after a PUCCH carrier switching.

In an example embodiment, a wireless device may receive a downlink scheduling DCI indicating scheduling information for reception of a downlink TB; and a TPC command for a PUCCH carrying a HARQ feedback for the downlink TB. The wireless device may switch a PUCCH cell, from a first cell/carrier in a cell group to a second cell/carrier in the cell group, after or in response to receiving the downlink scheduling DCI. The wireless device may determine a power level for PUCCH transmission based on the TPC command. The wireless device may transmit uplink control information comprising HARQ feedback for the downlink TB using the determined power level and via a PUCCH on the second cell/carrier.

In an example, the determining the power level for PUCCH transmission is further based on one or more offsets/values associated with the second cell. In an example, the wireless device may receive one or more messages comprising one or more configuration parameters indicating the one or more offsets/values associated with the second cell.

In an example, the cell group may be a PUCCH group. In an example, the PUCCH group may be a primary PUCH group comprising a primary cell. In an example, the PUCCH group may be a secondary PUCCH group comprising a PUCCH SCell.

In an example, the switching may be at least based on one of: a second DCI; a medium access control (MAC) control element (CE); one or more third configuration parameters; and one or more cell selection/determination rules. In an example, the wireless device may receive the second DCI, wherein the second DCI may comprise a field with a value indicating switching from a first cell/carrier, in a first plurality of cells/carriers of the cell group, to a second cell/carrier in the first plurality of cells of the cell group, as a PUCCH cell.

In an example, the wireless device may receive a MAC CE, wherein the MAC CE may indicate switching from a first cell/carrier, in a first plurality of cells of the cell group, to a second cell in the first plurality of cells of the cell group, as a PUCCH cell.

In an example, the one or more messages may further comprise the one or more third configuration parameters. The one or more third configuration parameters may indicate a timing pattern. The switching the PUCCH cell from the first cell to the second cell may be based on the timing pattern. In an example, the timing pattern may indicate time durations that a cell is a PUCCH cell (e.g., used for transmission of PUCCH). In an example, the one or more third configuration parameters may indicate a slot format indicating downlink, uplink and flexible symbols. The timing pattern may be based on the slot format. In an example, the slot format may be for a primary cell (e.g., PCell/PSCell). In an example, the cell group may comprise a primary cell and the slot format may be for the primary cell.

In an example, the wireless device may receive configuration parameters of the plurality of cells, wherein the configuration parameters indicate that a first plurality of cells are configured for PUCCH transmission.

In an example embodiment, a wireless device may receive a downlink scheduling DCI indicating scheduling information for reception of a downlink TB; and a TPC command for a PUCCH carrying a HARQ feedback for the downlink TB. The wireless device may switch a PUCCH cell, from a first cell/carrier in a cell group to a second cell/carrier in the cell group, after or in response to receiving the downlink scheduling DCI. The wireless device may ignore (e.g., may not use) the TPC command.

In an example, the wireless device may transmit the HARQ feedback via a PUCCH of the second cell/carrier.

In an example, the wireless device may determine a transmit power level of the PUCCH, wherein the determining is not based on the TPC command.

In an example, the cell group may be a PUCCH group. In an example, the PUCCH group may be a primary PUCH group comprising a primary cell. In an example, the PUCCH group may be a secondary PUCCH group comprising a PUCCH SCell.

In an example, the switching may be at least based on one of: a second DCI; a medium access control (MAC) control element (CE); one or more third configuration parameters; and one or more cell selection/determination rules. In an example, the wireless device may receive the second DCI, wherein the second DCI may comprise a field with a value indicating switching from a first cell/carrier, in a first plurality of cells/carriers of the cell group, to a second cell/carrier in the first plurality of cells of the cell group, as a PUCCH cell.

In an example, the wireless device may receive a MAC CE, wherein the MAC CE may indicate switching from a first cell/carrier, in a first plurality of cells of the cell group, to a second cell in the first plurality of cells of the cell group, as a PUCCH cell.

In an example, the one or more messages may further comprise the one or more third configuration parameters. The one or more third configuration parameters may indicate a timing pattern. The switching the PUCCH cell from the first cell to the second cell may be based on the timing pattern. In an example, the timing pattern may indicate time durations that a cell is a PUCCH cell (e.g., used for transmission of PUCCH). In an example, the one or more third configuration parameters may indicate a slot format indicating downlink, uplink and flexible symbols. The timing pattern may be based on the slot format. In an example, the slot format may be for a primary cell (e.g., PCell/PSCell). In an example, the cell group may comprise a primary cell and the slot format may be for the primary cell.

In an example, the wireless device may receive configuration parameters of the plurality of cells, wherein the configuration parameters indicate that a first plurality of cells are configured for PUCCH transmission.

In an example embodiment, a wireless device may receive a DCI indicating a TPC command for a PUCCH carrying HARQ feedback. The wireless device may switch a PUCCH cell, from a first cell/carrier in a cell group to a second cell/carrier in the cell group, after or in response to receiving the DCI. The wireless device may determine a power level for PUCCH transmission based on the TPC command. The wireless device may transmit uplink control information, comprising the HARQ feedback, using the determined power level and via a PUCCH on the second cell/carrier.

In an example, the determining the power level may be based on a power control parameter/value (e.g., an offset parameter/value) associated with the second cell. In an example, the wireless device may receive one or more configuration parameters indicating the power control parameter/value (e.g., the offset parameter/value) associated with the second cell. In an example, the DCI may comprise a field with a value indicating the power control parameter/value (e.g., the offset parameter/value). In an example, the wireless device may receive a second DCI comprising a value indicating the power control parameter/value (e.g., the offset parameter/value). In an example, the second DCI may be a common DCI. In an example, the wireless device may receive a MAC CE comprising a field with a value indicating the power control parameter/value (e.g., the offset parameter/value).

In an example embodiment, a wireless device may receive a DCI indicating a TPC command for a PUCCH carrying HARQ feedback. The wireless device may switch a PUCCH cell, from a first cell/carrier in a cell group to a second cell/carrier in the cell group, after or in response to receiving the downlink scheduling DCI. The wireless device may ignore (e.g., may not use) the TPC command. In an example, the ignoring (e.g., not using) the TPC command may be based on switching the PUCCH cell after receiving the DCI.

In example embodiments, an uplink control channel group (e.g., a PUCCH group) may comprise a plurality of cells. The uplink control information associated with the cells of the uplink control channel group (e.g., HARQ feedback (e.g., HARQ feedback associated with one or more DL TBs received via a cell of the cells in the uplink control channel group), scheduling request (SR), CSI report, etc.) may be transmitted via a cell (e.g., a PUCCH cell configured with PUCCH resources) in the uplink control channel group. In example embodiments, the uplink control channel group may comprise a plurality of uplink control channel cells. An uplink control channel cell switching may be configured for the uplink control channel group and one of a plurality of uplink control channel cells may be the uplink control channel cell in a given timing (e.g., based on a PUCCH cell switching pattern indicating a time pattern or dynamically in response to a DCI).

Figure 34:
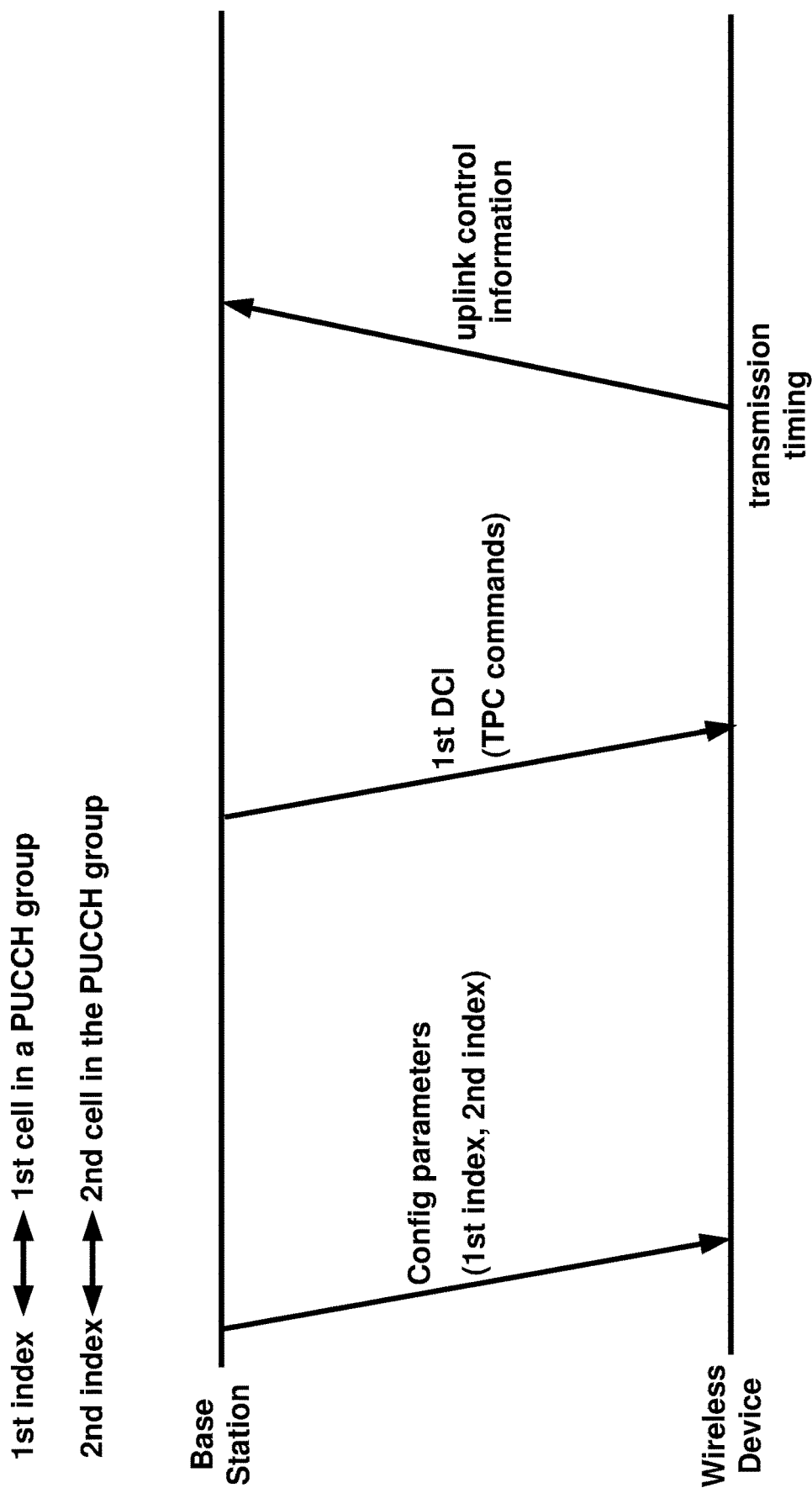
FIG. 34 shows an example process in accordance with several of various embodiments of the present disclosure.

In an example embodiment as shown in FIG. 34, a wireless device may receive one or more messages (e.g., one or more RRC messages) comprising configuration parameters (e.g., RRC configuration parameters). The configuration parameters may comprise a first parameter indicating a first index and a second parameter indicating a second index. The first index may be for determining a first position of a first bit (e.g., the leftmost bits of one or more first bits) of a first TPC command in a first DCI. The second index may be for determining a second position of a first bit (e.g., the leftmost bits of one or more second bits) of a second TPC command in the first DCI. The first DCI may have a first format for group power control. The first DCI may comprise a plurality of bits associated with a plurality of TPC commands comprising the first TPC command and the second TPC command. The wireless device may determine the one or more first bits of the first TPC command based on the first position of the first bit (e.g., the leftmost bit) of the one or more first bits in the first DCI and the number of bits in the one or more first bits of the first TPC command (e.g., 2 bits). The wireless device may determine the first TPC command based on the one or more first bits of the first TPC command (e.g., by mapping the one or more first bits of the first TPC command to a first value of the first TPC command). The wireless device may determine the one or more second bits of the second TPC command based on the second position of the first bit (e.g., the leftmost bit) of the one or more second bits in the first DCI and the number of bits in the one or more second bits of the second TPC command (e.g., 2 bits). The wireless device may determine the second TPC command based on the one or more second bits of the second TPC command (e.g., by mapping the one or more second bits of the second TPC command to a second value of the second TPC command).

Figure 35:
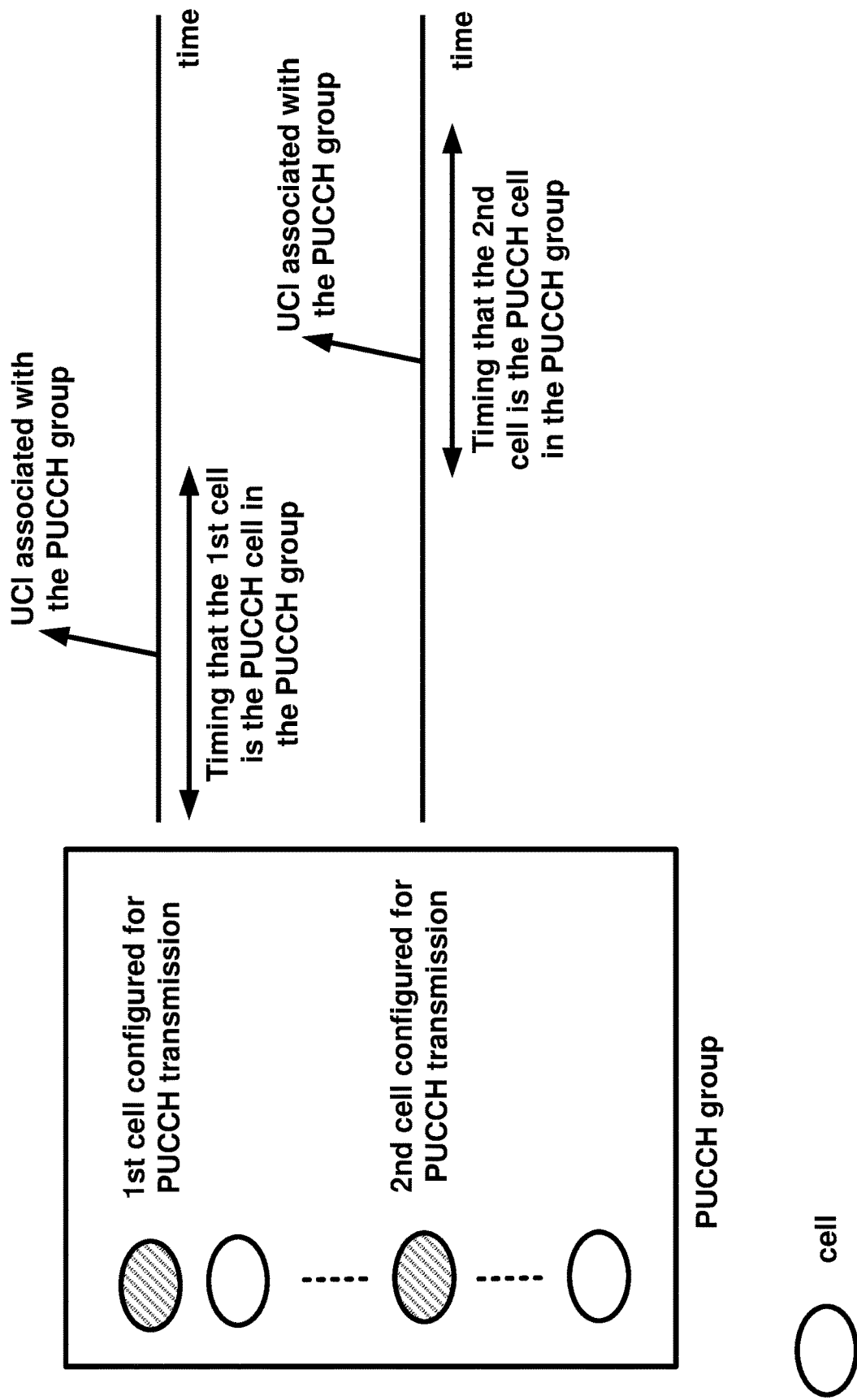
FIG. 35 shows an example process in accordance with several of various embodiments of the present disclosure.

The first TPC command may be applicable to a first cell in a PUCCH group, and the second TPC command may be applicable to a second cell in the PUCCH group (the same PUCCH group that includes the first cell). In an example, the PUCCH group may be a primary PUCCH group and the first cell may be a primary cell. In an example, the PUCCH group may be a secondary PUCCH group and the first cell may be a secondary PUCCH cell. The second TPC command may be applicable to a second cell in the same PUCCH group (e.g., the same PUCCH group that includes the first cell, e.g., the PUCCH group may include both of the first cell and the second cell). As shown in FIG. 35, the first cell and the second cell may be configured for uplink control channel (e.g., PUCCH) transmission and may be in the same uplink control channel group (e.g., the same PUCCH group, e.g., primary PUCCH group or secondary PUCCH group). In a given timing, one of the first cell and the second cell may be used for UCI transmission (e.g., HARQ feedback, SR, CSI report, etc.) associated with the cells of the uplink control channel group (PUCCH group). The second cell may be configured for PUCCH cell switching in the PUCCH group. The second cell may be a PUCCH switching secondary cell (PUCCH sSCell). The wireless device may receive uplink control channel (e.g., PUCCH) configuration parameters of the uplink control channel (e.g., PUCCH) of the first cell and the second cell (e.g., BWPs of the first cell and the second cell).

In an example, the wireless device may transmit one or more capability messages comprising one or more capability information elements (IEs) associated with uplink control channel (e.g., PUCCH) cell switching. For example, the one or more capability IEs may indicate whether the wireless device is capable of (e.g., supports) uplink control channel (e.g., PUCCH) cell switching (e.g., PUCCH cell switching based on an RRC configurable PUCCH cell switching pattern and/or PUCCH cell switching dynamically and in response to receiving a DCI indicating a PUCCH cell for HARQ feedback transmission). In an example, receiving configuration parameters for PUCCH cell switching (e.g., configuration parameters of the second cell (PUCCH switching secondary cell) and/or the second index for determining a second TPC command associated with the second cell) may be in response to transmitting the one or more capability messages and the one or more capability IEs indicating that the wireless device is capable of (e.g., supports) the uplink control channel (e.g., PUCCH) cell switching.

The wireless device may receive the first DCI. The wireless device may receive the first DCI via/based on monitoring a common search space. The first DCI may be a group common DCI and may be for group transmit power control (TPC). The first DCI may be associated with a TPC RNTI (e.g., a TPC PUCCH RNTI). For example, the configuration parameters may comprise an RNTI parameter indicating the TPC RNTI (e.g., the TPC PUCCH RNTI). The cyclic redundancy check (CRC) bits associated the first DCI may be scrambled with the TPC RNTI (e.g., the TPC PUCCH RNTI).

The wireless device may transmit uplink control information (UCI) (e.g., HARQ feedback, CSI report, SR, etc.) via an uplink control channel (e.g., via radio resources of the uplink control channel) in a transmission timing. The UCI may be associated with one or more cells of the uplink control channel group. In a given timing, one of the first cell and the second cell of the uplink control channel group (e.g., the PUCCH group) may be the cell for uplink control channel transmission. The wireless device may transmit the UCI based on the first TPC command (e.g., with a power level determined based on the first TPC command) in response to the first cell being a cell for uplink control channel transmission in the transmission timing of the UCI. The wireless device may transmit the UCI based on the second TPC command (e.g., with a power level determined based on the second TPC command) in response to the second cell being the cell for uplink control channel transmission in the transmission timing of the UCI.

In an example, the wireless device may receive a configuration parameter (e.g., a pucch-sSCellPattern parameter) of a switching pattern indicating first timings that the first cell of the uplink control channel group (e.g., PUCCH group) is the cell for uplink control channel transmission (e.g., for transmission of UCI associated with the cells of the uplink control channel group) and second timings that the second cell of the uplink control channel group (e.g., the PUCCH group) is the cell for uplink control channel transmission (e.g., for transmission of UCI associated with the cells of the uplink control channel group). For example, the configuration parameter may provide/indicate a periodic cell switching pattern for PUCCH transmissions. The switching pattern may be based on a numerology (e.g., subcarrier spacing (SCS), slot duration) of the primary cell. For example, a bit of the pattern may correspond to a slot for a reference SCS configuration (e.g., provided by a configuration parameter, e.g., by tdd-UL-DL-ConfigurationCommon) for the PCell with a value of '0' or a value of '1' indicating, respectively, the first cell or the second cell (e.g., PUCCH-sSCell) as the cell for PUCCH transmissions during the slot of the reference SCS configuration. The wireless device may determine, based on the switching pattern indicated by the first configuration parameter, whether the first cell or the second cell is the cell for uplink control channel transmission in/during the transmission timing of the uplink control information. For example, if the transmission timing of the uplink control information is within the first timings, indicated by the switching pattern, the wireless device may determine the first cell as the cell for uplink control channel transmission in/during the transmission timing. For example, if the transmission timing of the uplink control information is within the second timings, indicated by the switching pattern, the wireless device may determine the second cell as the cell for uplink control channel transmission in/during the transmission timing.

In an example, the wireless device may receive a second DCI, e.g., a DCI scheduling a downlink TB or a DCI resulting in a HARQ feedback and/or other UCI (e.g., CSI report). The wireless device may determine, based on the second DCI, the cell for uplink control channel transmission in the transmission timing of the UCI. The wireless device may determine, based on the second DCI, whether the cell for uplink control channel transmission in the transmission timing of the UCI is the first cell or the second cell. For example, the second DCI may comprise a field with a value indicating the cell (e.g., the first cell or the second cell) for uplink control channel transmission of the UCI (e.g., the HARQ feedback, e.g., the HARQ feedback associated with the downlink transport block scheduled by the second DCI, CSI report, etc.).

Figure 36:
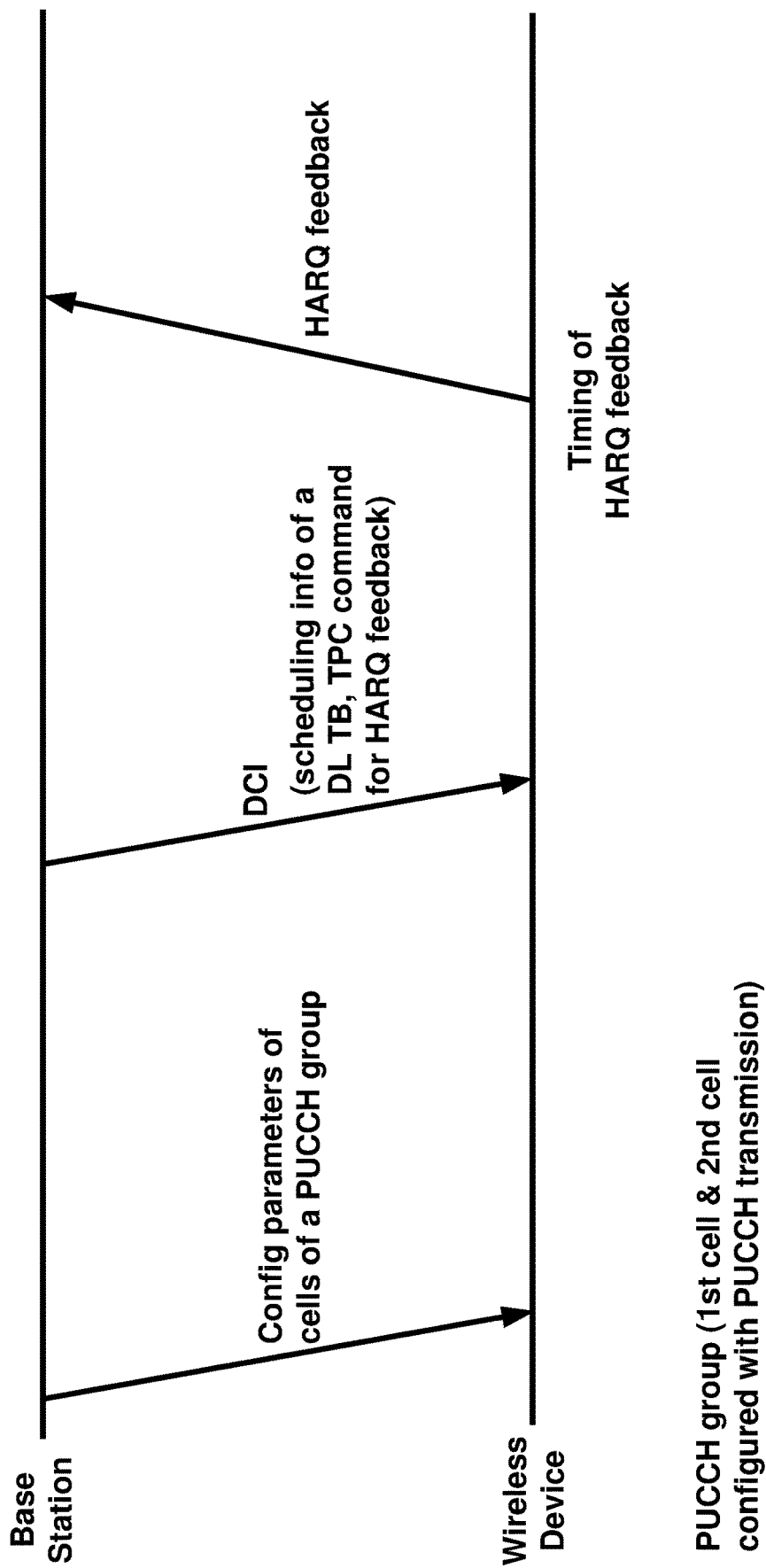
FIG. 36 shows an example process in accordance with several of various embodiments of the present disclosure.

In an example embodiment as shown in FIG. 36, a wireless device may receive one or more messages (e.g., one or more RRC messages) comprising configuration parameters of a plurality of cells. The plurality of cells may be grouped as an uplink control channel group (e.g., a PUCCH group, e.g., a primary PUCCH group or a secondary PUCCH group) and may comprise a first cell and a second cell. The first cell and the second cell, in the uplink control channel group, may be configured with uplink control channel transmission. For example, the first cell may be a primary cell if the PUCCH group is a primary PUCCH group. For example, the first cell may a PUCCH secondary cell if the PUCCH group is a secondary PUCCH group. The second cell may be a PUCCH switching secondary cell and may be configured for PUCCH cell switching. The first cell and the second cell may be configured with uplink control channel transmission and the configuration parameters of the first cell and the second cell may comprise uplink control channel configuration parameters indicating uplink control channel radio resources for the first cell and the second cell.

In an example, the wireless device may transmit one or more capability messages comprising one or more capability information elements (IEs) associated with uplink control channel (e.g., PUCCH) cell switching. For example, the one or more capability IEs may indicate whether the wireless device is capable of (e.g., supports) uplink control channel (e.g., PUCCH) cell switching (e.g., PUCCH cell switching based on an RRC configurable PUCCH cell switching pattern and/or PUCCH cell switching dynamically and in response to receiving a DCI indicating a PUCCH cell for HARQ feedback transmission). In an example, receiving configuration parameters for PUCCH cell switching (e.g., configuration parameters of the second cell (PUCCH switching secondary cell)) may be in response to transmitting the one or more capability messages and the one or more capability IEs indicating that the wireless device is capable of (e.g., supports) the uplink control channel (e.g., PUCCH) cell switching.

The wireless device may receive a DCI. The DCI may be a downlink scheduling DCI or may be a DCI that results in transmission of HARQ feedback (e.g., ACK/NACK) or other UCI (e.g., CSI report in case a CSI request field of the DCI indicates request for a CSI report). For example, in case the DCI is a downlink scheduling DCI, the DCI may comprise scheduling information (e.g., indicating PDSCH radio resources, HARQ ID, NDI, RV, etc.) for receiving one or more downlink TBs. The DCI may further comprise a TPC command (e.g., may comprise a field with a value indicating the TPC command). The TPC command may be for (e.g., may be applicable to) an uplink control channel that carries the HARQ feedback associated with the one or more downlink TBs scheduled by the DCI. The DCI may further comprise a PDSCH-to-HARQ feedback timing field, wherein a timing of the HARQ feedback, associated with the downlink TB, may be based on the value of the PDSCH-to-HARQ feedback timing field.

One of the first cell and the second cell may be the cell for uplink control channel transmission in/during the timing of the HARQ feedback. The wireless device may determine the cell for uplink control channel transmission in/during the timing of the HARQ feedback based on one or more configuration parameters indicating a semi-static pattern of the cell, in the uplink control channel group, for uplink control channel transmission and/or based on a dynamic signaling (e.g., DCI, e.g., the DCI scheduling the one or more downlink TBs) indicating the cell for uplink control channel transmission.

In an example, the wireless device may receive a configuration parameter (e.g., a pucch-sSCellPattern parameter) of a switching pattern indicating first timings that the first cell of the uplink control channel group (e.g., PUCCH group) is the cell for uplink control channel transmission (e.g., for transmission of UCI associated with the cells of the uplink control channel group) and second timings that the second cell of the uplink control channel group (e.g., the PUCCH group) is the cell for uplink control channel transmission (e.g., for transmission of UCI associated with the cells of the uplink control channel group). For example, the configuration parameter may provide/indicate a periodic cell switching pattern for PUCCH transmissions. The switching pattern may be based on a numerology (e.g., subcarrier spacing (SCS)) of the primary cell. For example, a bit of the pattern may correspond to a slot for a reference SCS configuration (e.g., provided by a configuration parameter, e.g., by tdd-UL-DL-ConfigurationCommon) for the PCell with a value of '0' or a value of '1' indicating, respectively, the first cell or the second cell (e.g., PUCCH-sSCell) as the cell for PUCCH transmissions during the slot of the reference SCS configuration. The wireless device may determine, based on the switching pattern indicated by the first configuration parameter, whether the first cell or the second cell is the cell for uplink control channel transmission in/during the timing of the HARQ feedback. For example, if the timing of the HARQ feedback is within the first timings, indicated by the switching pattern, the wireless device may determine the first cell as the cell for uplink control channel transmission in/during the timing of HARQ feedback. For example, if the timing of the HARQ feedback is within the second timings, indicated by the switching pattern, the wireless device may determine the second cell as the cell for uplink control channel transmission in/during the timing of the HARQ feedback.

In an example, the DCI, that schedules the one or more downlink TBs, may indicate the cell of the uplink control channel group (e.g., PUCCH group) for transmission of the HARQ feedback associated with the one or more downlink TBs. For example, the DCI may comprise a field with a value indicating one of the first cell and the second cell as the cell that is for (e.g., applicable to) transmission of the HARQ feedback.

The TPC command, included in the DCI, may be applicable to the cell, of the uplink control channel group, that is for (e.g., applicable to) uplink control channel transmission in/during the timing of the HARQ feedback. The wireless device may transmit the HARQ feedback via the first cell and based on the TPC command in response to the cell that is for (e.g., applicable to) transmission of the HARQ feedback in/during the timing of the HARQ feedback being the first cell. The wireless device may transmit the HARQ feedback via the second cell and based on the TPC command in response to the cell that is for (e.g., applicable to) transmission of the HARQ feedback in/during the timing of the HARQ feedback being the second cell. The wireless device may determine a power level of the uplink control channel based on the TPC command. In an example, at the timing of receiving of the DCI, the cell of the uplink control channel group, that is for (e.g., applicable to) uplink control channel transmission, may be the same or different from the cell of the uplink control channel group, that is for (e.g., applicable to) uplink control channel transmission in/during the timing of the HARQ feedback. In an example, irrespective of the cell of the uplink control channel group, that is for (e.g., applicable to) uplink control channel transmission at the timing of receiving of the DCI, being the same or different from the cell of the uplink control channel group, that is for (e.g., applicable to) uplink control channel transmission in/during the timing of the HARQ feedback, the TPC command may be for (e.g., applicable to) the cell of the uplink control channel group that is the cell for uplink control channel transmission in/during the timing of the HARQ feedback.

Figure 37:
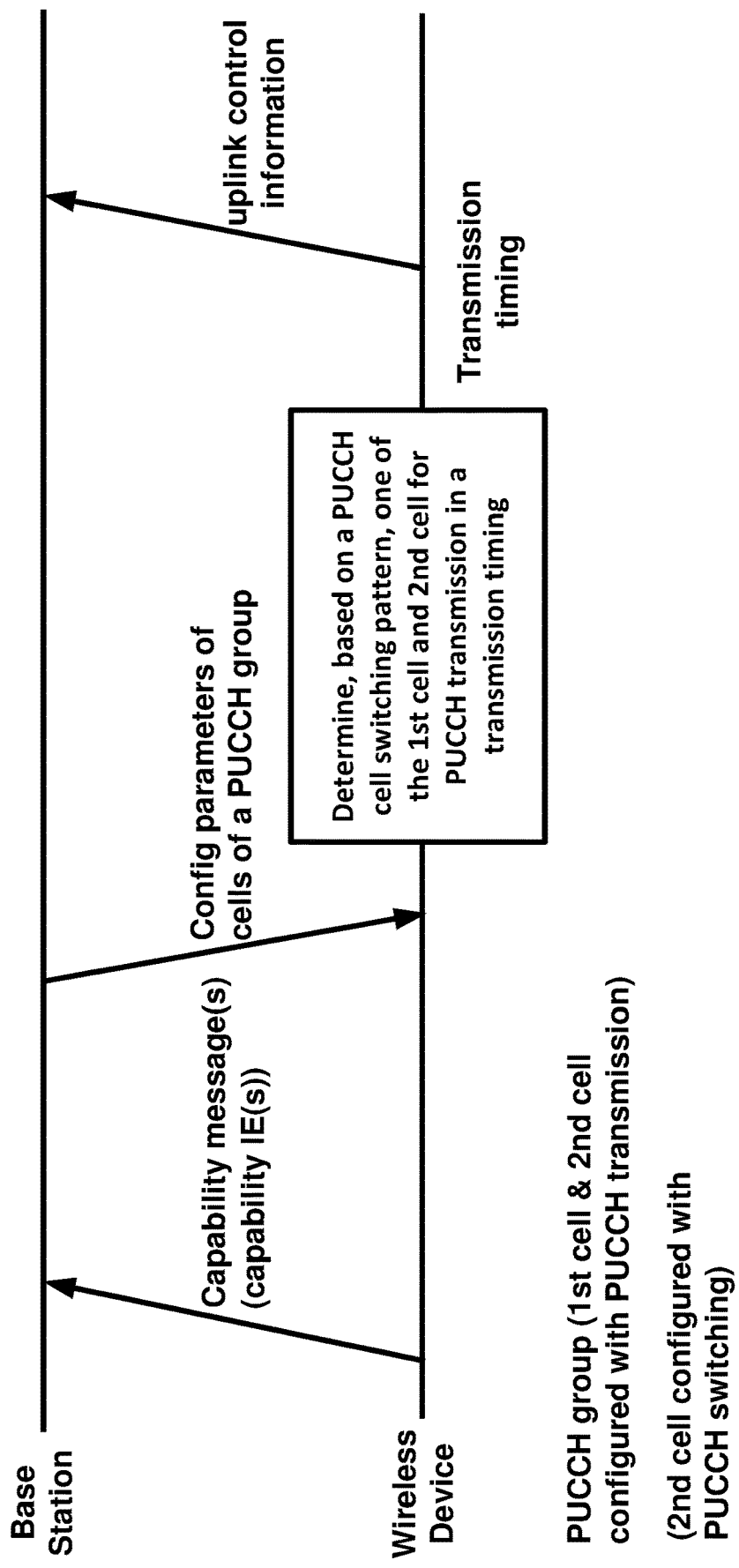
FIG. 37 shows an example process in accordance with several of various embodiments of the present disclosure.
Figure 38:
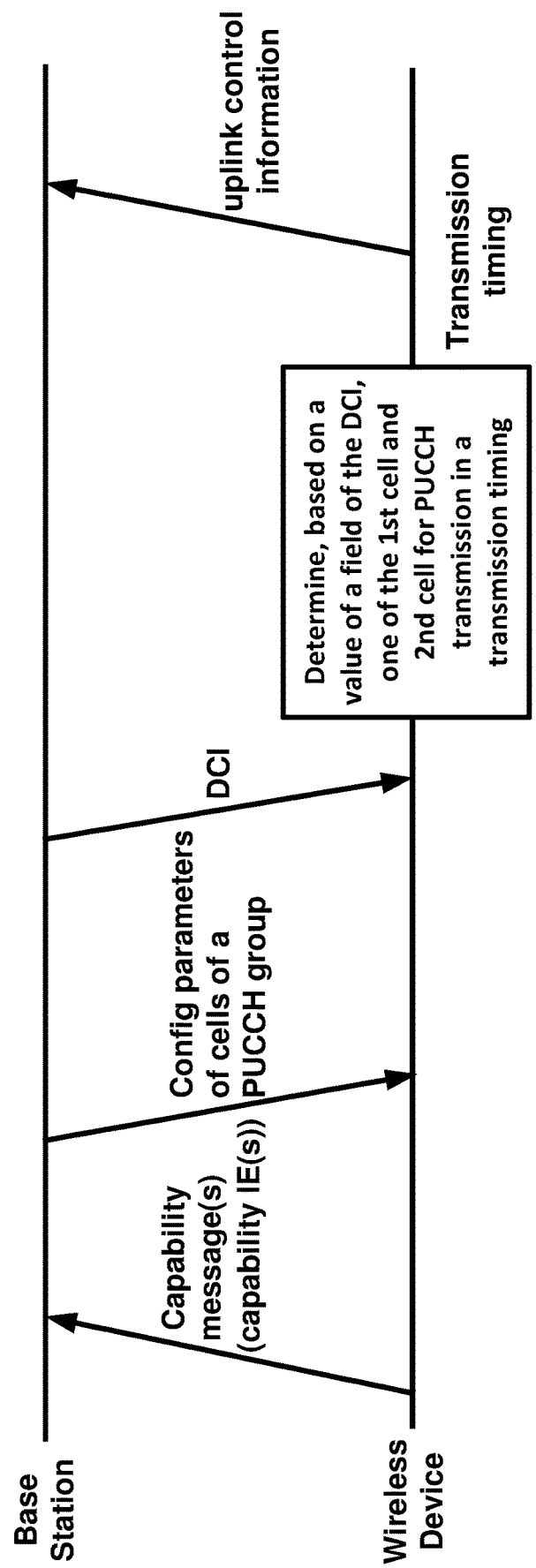
FIG. 38 shows an example process in accordance with several of various embodiments of the present disclosure.

In example embodiments as shown in FIG. 37 and FIG. 38, a wireless device may transmit one or more capability messages comprising one or more capability information elements (IEs). In an example, the wireless device may transmit the one or more capability messages in response to receiving a UE Capability Enquiry message, from the network/base station, used to request UE radio access capabilities. In an example, the wireless device may transmit the one or more capability messages in response to transitioning from an RRC idle/inactive state to an RRC connected state. The one or more capability IEs, included in the one or more capability messages, may indicate whether the wireless device is capable of (e.g., supports) uplink control channel cell switching in an uplink control channel group. For example, one or more first values (e.g., a 'Supported' value) of the one or more capability IEs may indicate that the wireless device is capable of (e.g., supports) uplink control channel cell switching in an uplink control channel group. For example, one or more second values of (e.g., an 'Unsupported' value) the one or more capability IEs may indicate that the wireless device is not capable of (e.g., does not support) uplink control channel cell switching in an uplink control channel group.

The wireless device may receive one or more messages (e.g., one or more RRC messages) comprising configuration parameters of a plurality of cells. The plurality of cells may be grouped as an uplink control channel group (e.g., a PUCCH group, e.g., a primary PUCCH group or a secondary PUCCH group). In response to the one or more capability IEs indicating that the wireless device is capable of (e.g., supports) uplink control channel cell switching (e.g., the one or more capability IEs having the one or more first values indicating that the wireless device is capable of (e.g., supports) uplink control channel switching) in an uplink control channel group, the plurality of cells may comprise a first cell and a second cell configured with uplink control channel transmission, e.g., the configuration parameters of the plurality of cells may comprise uplink control channel configuration parameters for uplink control channel resources of the first cell and the second cell. In response to the one or more capability IEs indicating that the wireless device is capable of (e.g., supports) uplink control channel cell switching in the uplink control channel group, the second cell may be configured with uplink control channel cell switching.

In an example embodiment as shown in FIG. 37, the wireless device may determine whether the first cell or the second cell is a cell for uplink control channel transmission in the uplink control channel group in/during a transmission timing of uplink control information. The wireless may make the determination based on a switching pattern (e.g., based on a configuration parameter indicating the switching pattern). The wireless device may receive a configuration parameter (e.g., a pucch-sSCellPattern parameter) of a switching pattern indicating first timings that the first cell of the uplink control channel group (e.g., PUCCH group) is the cell for uplink control channel transmission (e.g., for transmission of UCI associated with the cells of the uplink control channel group) and second timings that the second cell of the uplink control channel group (e.g., the PUCCH group) is the cell for uplink control channel transmission (e.g., for transmission of UCI associated with the cells of the uplink control channel group). For example, the configuration parameter may provide/indicate a periodic cell switching pattern for PUCCH transmissions. The switching pattern may be based on a numerology (e.g., subcarrier spacing (SCS)) of the primary cell. For example, a bit of the pattern may correspond to a slot for a reference SCS configuration (e.g., provided by a configuration parameter, e.g., by tdd-UL-DL-ConfigurationCommon) for the PCell with a value of '0' or a value of '1' indicating, respectively, the first cell or the second cell (e.g., PUCCH-sSCell) as the cell for PUCCH transmissions during the slot of the reference SCS configuration. The wireless device may determine, based on the switching pattern indicated by the first configuration parameter, whether the first cell or the second cell is the cell for uplink control channel transmission in/during the transmission timing of the uplink control information. For example, if the transmission timing is within the first timings, indicated by the switching pattern, the wireless device may determine the first cell as the cell for uplink control channel transmission in/during the transmission timing of the uplink control information. For example, if the transmission timing is within the second timings, indicated by the switching pattern, the wireless device may determine the second cell as the cell for uplink control channel transmission in/during the transmission timing of the uplink control information.

In an example as shown in FIG. 38, the wireless device may determine whether the first cell or the second cell is a cell for uplink control channel transmission in the uplink control channel group in/during a transmission timing of uplink control information. The wireless device may receive a DCI that is associated with (e.g., results in) generating uplink control information (UCI e.g., HARQ feedback, CSI report, etc.). In an example, the DCI may be a downlink scheduling DCI indicating radio resources for reception of one or more downlink TBs. The DCI may indicate (e.g., may comprise a field with a value indicating) a cell (e.g., one of the first cell and the second cell) of the uplink control channel group for transmission of uplink control information (e.g., for transmission of HARQ feedback associated with one or more downlink TBs scheduled by the DCI). The wireless may make the determination based on the value of a field of the DCI.

The wireless device may transmit the uplink control information in/during a transmission timing of the uplink control information and based on the cell determined to be for uplink control channel transmission in/during the timing of the uplink control information.

In accordance with various exemplary embodiments in the present disclosure, a device (e.g., a wireless device, a base station and/or alike) may include one or more processors and may include memory that may store instructions. The instructions, when executed by the one or more processors, cause the device to perform actions as illustrated in the accompanying drawings and described in the specification. The order of events or actions, as shown in a flow chart of this disclosure, may occur and/or may be performed in any logically coherent order. In some examples, at least two of the events or actions shown may occur or may be performed at least in part simultaneously and/or in parallel. In some examples, one or more additional events or actions may occur or may be performed prior to, after, or in between the events or actions shown in the flow charts of the present disclosure.

Figure 39:
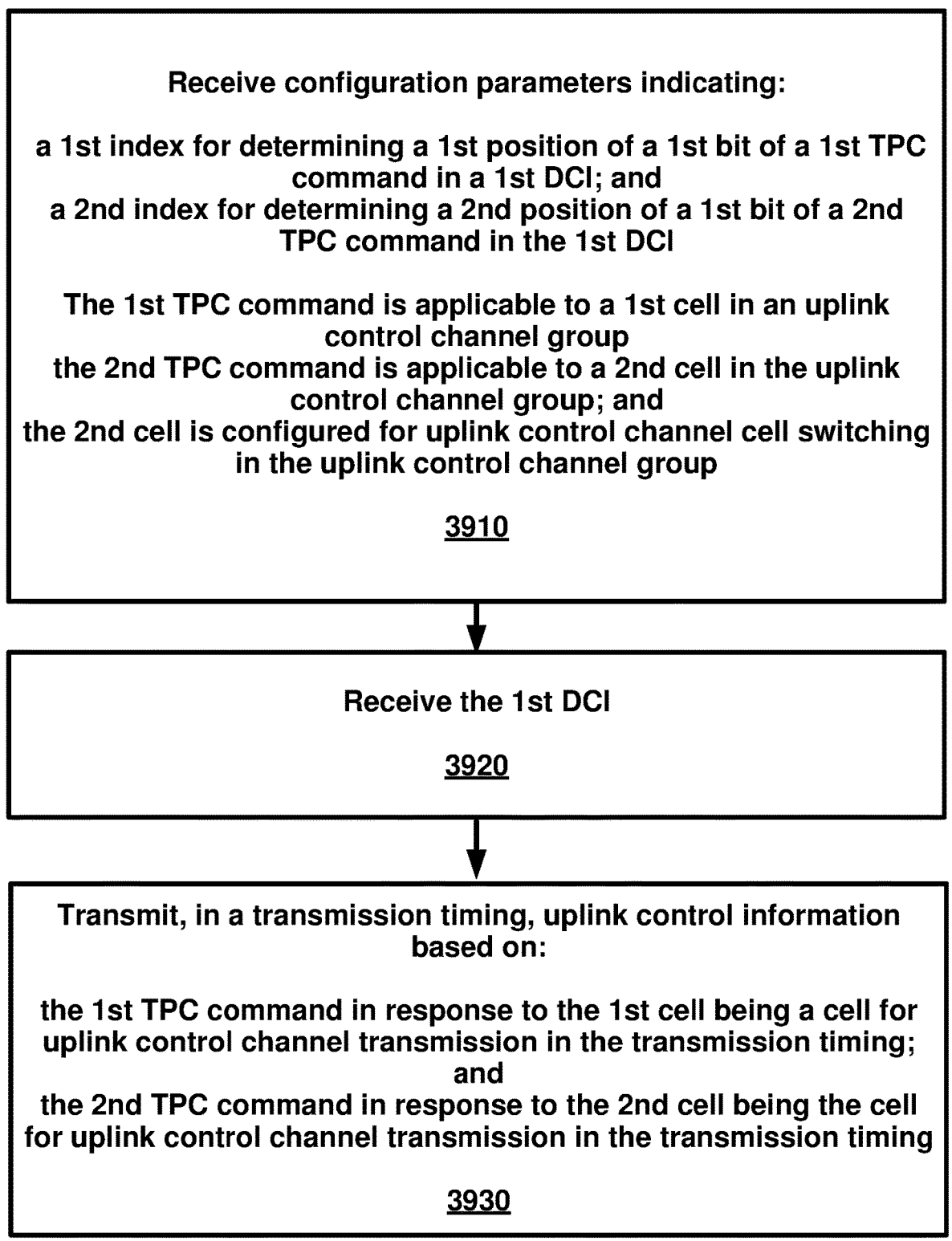
FIG. 39 shows an example flow diagram in accordance with several of various embodiments of the present disclosure.

FIG. 39 shows an example flow diagram in accordance with several of various embodiments of the present disclosure. At 3910, a wireless device may receive configuration parameters indicating a first index and a second index. The first index may be for determining a first position of a first bit of a first transmit power control (TPC) command in a first downlink control information (DCI). The first TPC command may be applicable to a first cell in an uplink control channel group. The second index may be for determining a second position of a first bit of a second TPC command in the first DCI. The second TPC command may be applicable to a second cell in the uplink control channel group. The second cell may be configured for uplink control channel cell switching in the uplink control channel group. At 3920, the wireless device may receive the first DCI. At 3930, the wireless device may transmit, in a transmission timing, uplink control information based on: the first TPC command in response to the first cell being a cell for uplink control channel transmission in the transmission timing; and the second TPC command in response to the second cell being the cell for uplink control channel transmission in the transmission timing.

In an example embodiment, the configuration parameters, received at 3910, may comprise a first configuration parameter of a switching pattern indicating first timings that the first cell is the cell for uplink control channel transmission and second timings that the second cell is the cell for uplink control channel transmission. In an example embodiment, the switching pattern may indicate first timings that the first cell is the cell, in the uplink control channel group, for uplink control channel transmission and second timings that the second cell, in the uplink control channel group, is the cell for uplink control channel transmission. In an example embodiment, the wireless device may determine, based on the switching pattern, whether the first cell or the second cell is the cell for uplink control channel transmission in the transmission timing. The transmitting, at 3930, may be based on the determining. In an example embodiment, the determining may indicate that: the first cell is the cell for uplink control channel transmission in the transmission timing in response to the transmission timing being within the first timings; and the second cell is the cell for uplink control channel transmission in the transmission timing in response to the transmission timing being within the second timings. In an example embodiment, the switching pattern may be based on a numerology of a primary cell.

In an example embodiment, the first DCI, received at 3920, may comprise a plurality of bits associated with a plurality of TPC commands comprising the first TPC command and the second TPC command.

In an example embodiment, the configuration parameters, received at 3910, may comprise a second configuration parameter indicating a TPC radio network temporary identifier (RNTI), wherein the first DCI may be associated with the TPC RNTI.

In an example embodiment, the uplink control information, transmitted at 3930, may comprise hybrid automatic repeat request (HARQ) feedback.

In an example embodiment, the wireless device may receive a second DCI. The wireless device may determine, based on a second DCI, whether the first cell or the second cell is the cell for uplink control channel transmission in the transmission timing. In an example embodiment, the second DCI may comprise a field with a value indicating one of the first cell and the second cell for transmitting a hybrid automatic repeat request (HARQ) feedback in the transmission timing. The transmitting, at 3930, may be based on the determining.

In an example embodiment, the wireless device may determine at least one of: the first TPC command based on the first DCI and the first position; and the second TPC command based on the first DCI and the second position.

In an example embodiment, a power level of an uplink control channel may be: based on the first TPC command in response to the first cell being the cell for uplink control channel transmission in the transmission timing; and based on the second TPC command in response to the second cell being the cell for uplink control channel transmission in the transmission timing. In an example embodiment, a power level of an uplink control channel may be: based on the first TPC command in response to the first cell being the cell, of the uplink control channel group, for uplink control channel transmission in the transmission timing; and based on the second TPC command in response to the second cell, of the uplink control channel group, being the cell for uplink control channel transmission in the transmission timing. The transmitting, at 3930, may be based on the power level.

In an example embodiment, the wireless device may receive uplink control channel configuration parameters of the first cell and the second cell. The configuration parameters, received at 3910, may comprise the uplink control channel configuration parameters.

In an example embodiment, the first cell and the second cell may be in the same uplink control channel group (e.g., in a primary PUCCH group or in a secondary PUCCH group).

In an example embodiment, the first cell may be one of a primary cell or an uplink control channel secondary cell (e.g., PUCCH SCell).

In an example embodiment, the uplink control channel group may be a primary uplink control channel group. In an example embodiment, the first cell may be a primary cell.

In an example embodiment, the uplink control channel group may be a secondary uplink control channel group. In an example embodiment, the first cell may be an uplink control channel secondary cell (e.g., PUCCH SCell).

In an example embodiment, the uplink control channel group may comprise a plurality of cells comprising the first cell and the second cell. The first cell and the second cell may be configured for transmission of uplink control information associated with the plurality of cells. In an example embodiment, one of the first cell and the second cell may be used for transmission of uplink control information in a timing (e.g., a given timing).

In an example embodiment, transmitting, in the transmission timing, the uplink control information may be based on: the first TPC command in response to the first cell being a cell, of the uplink control channel group, for uplink control channel transmission in the transmission timing; and the second TPC command in response to the second cell being the cell, of the uplink control channel group, for uplink control channel transmission in the transmission timing.

In an example embodiment, the wireless device may transmit a capability message comprising one or more capability information elements (IEs) indicating that the wireless device is capable of (e.g., supports) the uplink control channel cell switching (e.g., uplink control channel cell switching in an uplink control channel group). In an example embodiment, the configuration parameters, received at 3910, may indicate the second index in response to the one or more capability IEs indicating that the wireless device is capable of (e.g., supports) the uplink control channel cell switching.

Figure 40:
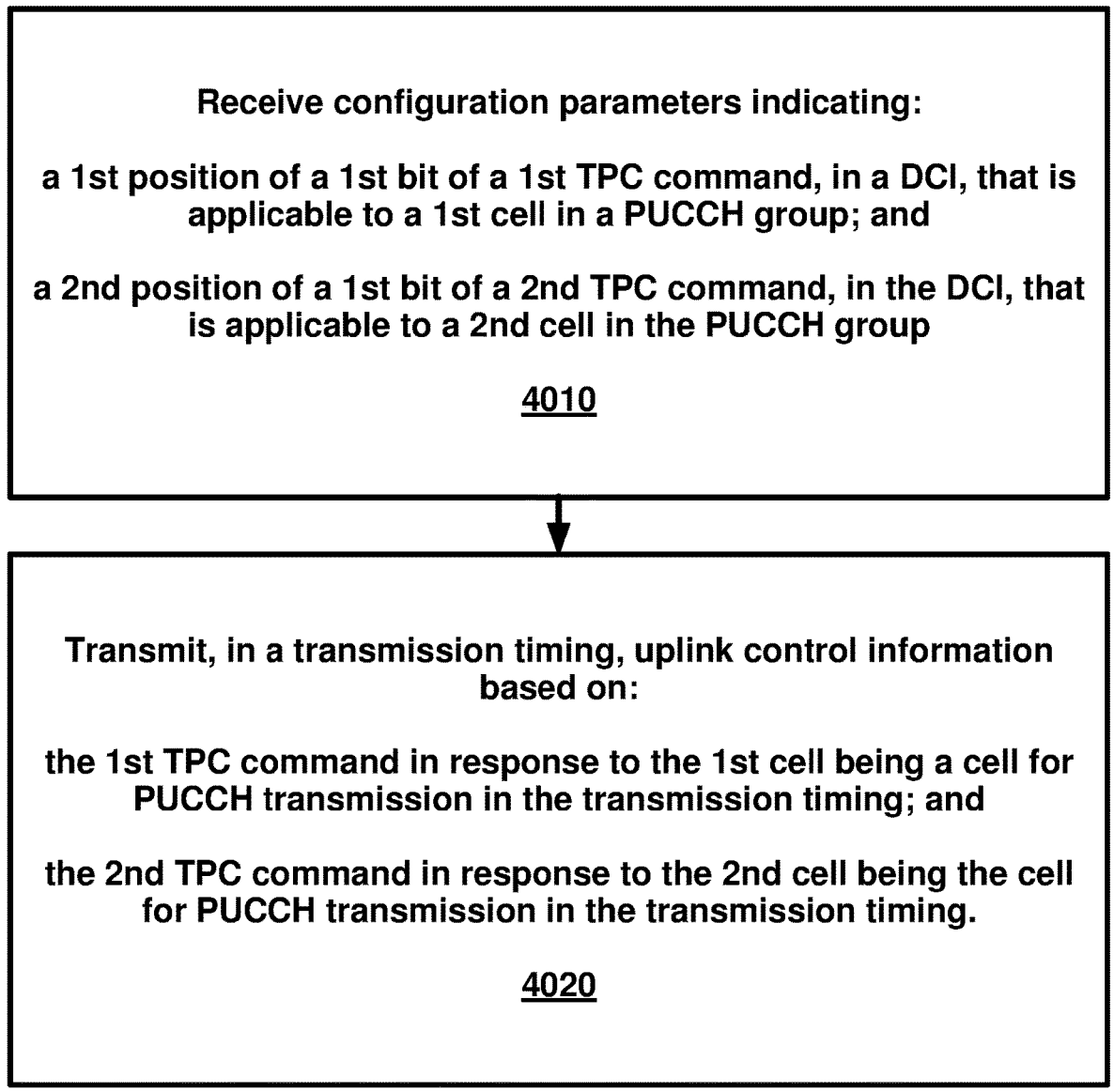
FIG. 40 shows an example flow diagram in accordance with several of various embodiments of the present disclosure.

FIG. 40 shows an example flow diagram in accordance with several of various embodiments of the present disclosure. At 4010, a wireless device may receive configuration parameters indicating: a first position of a first bit of a first transmit power control (TPC) command, in a downlink control information (DCI), that is applicable to a first cell in a physical uplink control channel (PUCCH) group; and a second position of a first bit of a second TPC command, in the DCI, that is applicable to a second cell in the PUCCH group. At 4020, the wireless device may transmit, in a transmission timing, uplink control information based on: the first TPC command in response to the first cell being a cell for PUCCH transmission in the transmission timing; and the second TPC command in response to the second cell being the cell for PUCCH transmission in the transmission timing.

FIG. 41 shows an example flow diagram in accordance with several of various embodiments of the present disclosure. At 4110, a wireless device may receive configuration parameters indicating positions, in a downlink control information (DCI), of a first bit of a first transmit power control (TPC) command and a first bit of a second TPC command that are applicable, respectively, to a first cell and a second cell of a physical uplink control channel (PUCCH) group. At 4120, the wireless device may transmit, in a transmission timing, uplink control information based on: the first TPC command if the first cell is a cell for PUCCH transmission in the transmission timing; and the second TPC command if the second cell is the cell for PUCCH transmission in the transmission timing.

FIG. 42 shows an example flow diagram in accordance with several of various embodiments of the present disclosure. At 4210, a wireless device may receive configuration parameters of a plurality of cells of an uplink control channel group comprising a first cell and a second cell. The first cell and the second cell may be configured for uplink control channel transmission. At 4220, the wireless device may receive a downlink control information (DCI) comprising: scheduling information for receiving a transport block; and a transmit power control (TPC) command for an uplink control channel carrying a hybrid automatic repeat request (HARQ) feedback associated with the transport block. A cell of the uplink control channel group for uplink control channel transmission in a timing of the HARQ feedback may be one of the first cell and the second cell. The TPC command may apply to the cell. At 4230, the wireless device may transmit the HARQ feedback: via the first cell and based on the TPC command, in response to the cell being the first cell; and via the second cell and based on the TPC command, in response to the cell being the second cell.

In an example embodiment, the wireless device may receive a first configuration parameter of a switching pattern indicating first timings that the first cell is the cell for uplink control channel transmission and second timings that the second cell is the cell for uplink control channel transmission. In an example embodiment, the switching pattern may indicate first timings that the first cell is the cell, in the uplink control channel group, for uplink control channel transmission and second timings that the second cell, in the uplink control channel group, is the cell for uplink control channel transmission. In an example embodiment, the wireless device may determine, based on the switching pattern, the cell of the uplink control channel group for uplink control channel transmission in the timing of the HARQ feedback. The transmitting the HARQ feedback, at 4230, may be based on the determining. In an example embodiment, the cell of the uplink control channel group for uplink control channel transmission in the timing of the HARQ feedback may be: the first cell in response to the timing of the HARQ feedback being within the first timings; and the second cell in response to the timing of the HARQ feedback being within the second timings. In an example embodiment, the switching pattern may be based on a numerology of a primary cell.

In an example embodiment, the DCI, received at 4220, may comprise a field with a value indicating one of the first cell and the second cell. The cell of the uplink control channel group for uplink control channel transmission in the timing of the HARQ feedback, at 4230, may be based on the DCI.

In an example embodiment, the uplink control channel group, at 4210, may be one of a primary uplink control channel group and a secondary uplink control channel group.

In an example embodiment, the DCI, at 4220, may comprise a physical downlink shared channel (PDSCH) to HARQ feedback timing field. The timing of the HARQ feedback may be based on the value of the PDSCH to HARQ feedback timing field.

In an example embodiment, the transmitting the HARQ feedback, at 4230, may be with a power level determined based on the TPC command.

In an example embodiment, the configuration parameters, received at 4210, may comprise uplink control channel configuration parameters of the first cell and the second cell.

In an example embodiment, the first cell and the second cell, at 4210, may be in the same uplink control channel group (e.g., in a primary PUCCH group or in a secondary PUCCH group).

In an example embodiment, the first cell may be one of a primary cell and an uplink control channel secondary cell (e.g., PUCCH SCell).

In an example embodiment, the uplink control channel group, at 4210, may be a primary uplink control channel group. The first cell may be a primary cell.

In an example embodiment, the uplink control channel group, at 4210, may be a secondary uplink control channel group. The first cell may be an uplink control channel secondary cell (e.g., PUCCH SCell).

In an example embodiment, the first cell and the second cell may be configured for transmission of uplink control information associated with the plurality of cells of the uplink control channel group. In an example embodiment, one of the first cell and the second cell may be used for transmission of uplink control information in a timing (e.g., a given timing).

In an example embodiment, the wireless device may transmit a capability message comprising one or more capability information elements (IEs) indicating that the wireless device is capable of (supports) the uplink control channel cell switching (e.g., uplink control channel cell switching in an uplink control channel group). In an example embodiment, the configuration parameters, received at 4210, may indicate the second index in response to the one or more capability IEs indicating that the wireless device is capable of the uplink control channel cell switching.

Figure 43:
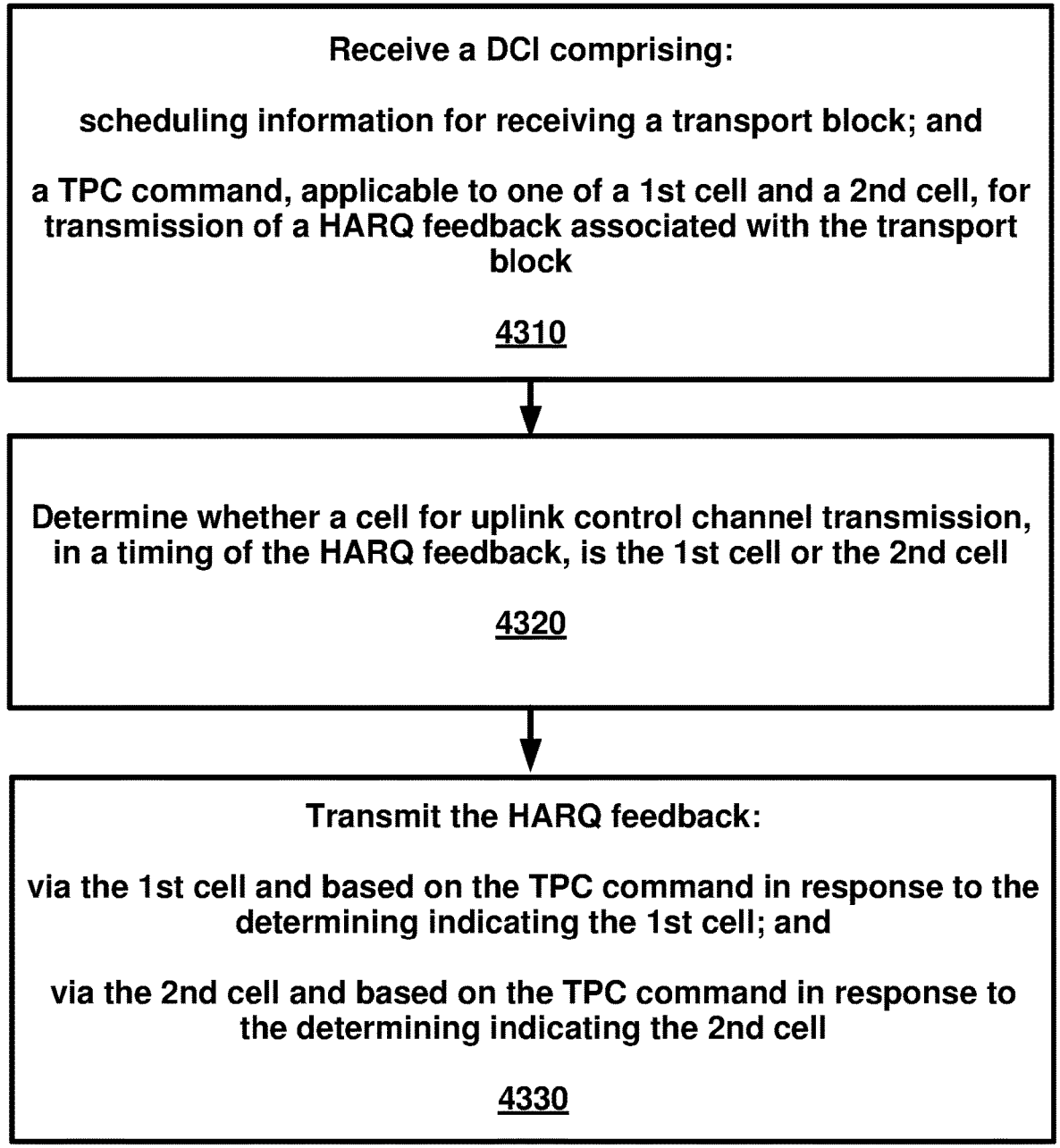
FIG. 43 shows an example flow diagram in accordance with several of various embodiments of the present disclosure.

FIG. 43 shows an example flow diagram in accordance with several of various embodiments of the present disclosure. At 4310, a wireless device may receive a downlink control information (DCI) comprising: scheduling information for receiving a transport block; and a transmit power control (TPC) command, applicable to one of a first cell and a second cell, for transmission of a hybrid automatic repeat request (HARQ) feedback associated with the transport block. At 4320, the wireless device may determine whether a cell for uplink control channel transmission, in a timing of the HARQ feedback, is the first cell or the second cell. At 4330, the wireless device may transmit the HARQ feedback: via the first cell and based on the TPC command in response to the determining indicating the first cell; and via the second cell and based on the TPC command in response to the determining indicating the second cell.

FIG. 44 shows an example flow diagram in accordance with several of various embodiments of the present disclosure. At 4410, a wireless device may transmit one or more capability messages comprising one or more capability information elements (IEs) indicating whether the wireless device is capable of (e.g., supports) uplink control channel switching in an uplink control channel group. At 4420, the wireless device may receive configuration parameters of a plurality of cells of an uplink control channel group. In response to the wireless device being capable of (e.g., supporting) uplink control channel cell switching: the plurality of cells may comprise a first cell and a second cell configured with uplink control channel transmission; and the second cell may be configured for uplink control channel cell switching. At 4430, the wireless device may determine, based on an uplink control channel cell switching pattern, one of the first cell and the second cell as a cell for uplink control channel transmission in a transmission timing. At 4440, the wireless device may transmit, in the transmission timing, uplink control information based on the determined cell for uplink control channel transmission.

In an example embodiment, the wireless device may receive a first configuration parameter indicating the uplink control channel cell switching pattern. In an example embodiment, the uplink control channel cell switching pattern may indicate first timings that the first cell is the cell for uplink control channel transmission and second timings that the second cell is the cell for uplink control channel transmission. In an example embodiment, the determining, at 4430, the wireless device may indicate the first cell as the cell for uplink control channel transmission based on the transmission timing being within the first timings. In an example embodiment, the determining, at 4430, may indicate the second cell as the cell for uplink control channel transmission based on the transmission timing being within the second timings.

In an example embodiment, the uplink control channel switching pattern, at 4430, may be based on a numerology of a primary cell.

In an example embodiment, the one or more capability IEs, transmitted at 4410, may have one or more first values. The one or more first values may indicate that the wireless device supports (e.g., is capable of) uplink control channel cell switching.

In an example embodiment, one or more second values of the one or more capability IEs, transmitted at 4410, may indicate that the wireless device is not capable of (e.g., does not support) uplink control channel cell switching.

In an example embodiment, the wireless device may receive uplink control channel configuration parameters of the first cell and the second cell. In an example, the configuration parameters, received at 4420, may comprise the uplink control channel configuration parameters.

In an example embodiment, the first cell may be a primary cell. The uplink control channel group may be a primary uplink control channel group.

In an example embodiment, the first cell may be an uplink control channel secondary cell.

The uplink control channel group may be a secondary uplink control channel group.

FIG. 45 shows an example flow diagram in accordance with several of various embodiments of the present disclosure. At 4510, a wireless device may transmit one or more capability messages comprising one or more capability information elements (IEs) indicating whether the wireless device is capable of (e.g., supports) uplink control channel switching in an uplink control channel group. At 4520, the wireless device may receive configuration parameters of a plurality of cells of an uplink control channel group. In response to the wireless device being capable of (e.g., supporting) uplink control channel cell switching: the plurality of cells may comprise a first cell and a second cell configured with uplink control channel transmission; and the second cell may be configured for uplink control channel cell switching. At 4530, the wireless device may determine, based on a value of a field of a downlink control information (DCI), one of the first cell and the second cell as a cell for uplink control channel transmission in a transmission timing. At 4540, the wireless may transmit, in the transmission timing, uplink control information based on the determined cell for uplink control channel transmission.

In an example embodiment, the one or more capability IEs, transmitted at 4510, may have one or more first values. The one or more first values may indicate that the wireless device is capable of (e.g., supports) uplink control channel cell switching.

In an example embodiment, one or more second values of the one or more capability IEs may indicate that the wireless device is not capable of (e.g., does not support) uplink control channel cell switching.

In an example embodiment, the wireless device may receive uplink control channel configuration parameters of the first cell and the second cell. In an example, the configuration parameters, received at 4520, may comprise the uplink control channel configuration parameters.

In an example embodiment, the first cell may be a primary cell. The uplink control channel group may be a primary uplink control channel group.

In an example embodiment, the first cell may be an uplink control channel secondary cell.

The uplink control channel group may be a secondary uplink control channel group.

In an example embodiment, the wireless device may receive the DCI (based on which the determination is made at 4530).

In an example, the DCI (based on which the determination is made at 4530) may comprise scheduling information for receiving a transport block. In an example, the value of the field of the DCI may indicate one of the first cell and the second cell for transmission of a hybrid automatic repeat request (HARD) feedback associated with the transport block.

Figure 46:
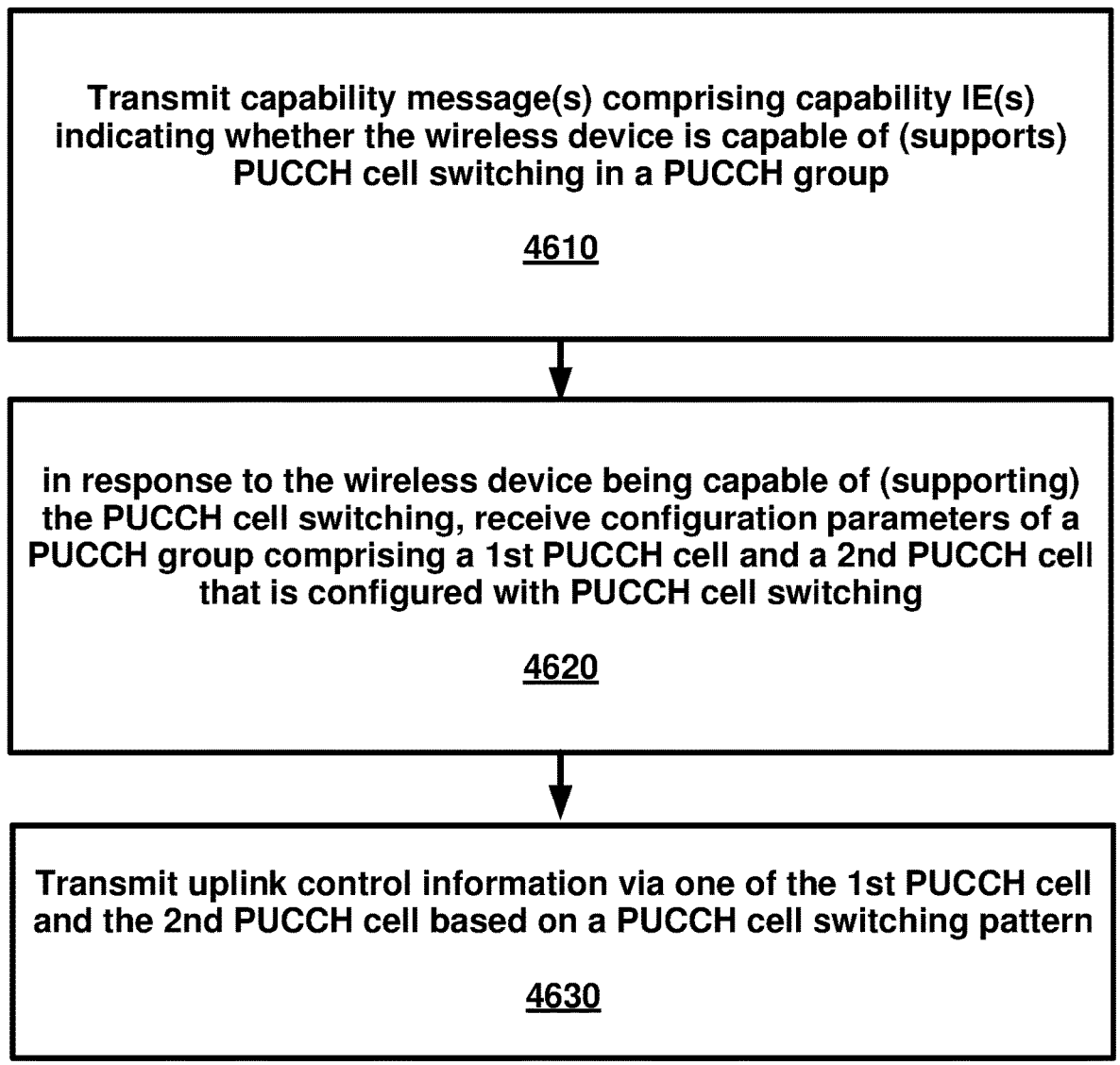
FIG. 46 shows an example flow diagram in accordance with several of various embodiments of the present disclosure.

FIG. 46 shows an example flow diagram in accordance with several of various embodiments of the present disclosure. At 4610, a wireless device may transmit one or more capability messages comprising one or more capability information elements (IEs) indicating whether the wireless device is capable of (e.g., supports) physical uplink control channel (PUCCH) cell switching in a PUCCH group. At 4620, in response to the wireless device being capable of (e.g., supporting) the PUCCH cell switching, the wireless device may receive configuration parameters of a PUCCH group comprising a first PUCCH cell and a second PUCCH cell that is configured with PUCCH cell switching. At 4630, the wireless device may transmit uplink control information via one of the first PUCCH cell and the second PUCCH cell based on a PUCCH cell switching pattern.

Figure 47:
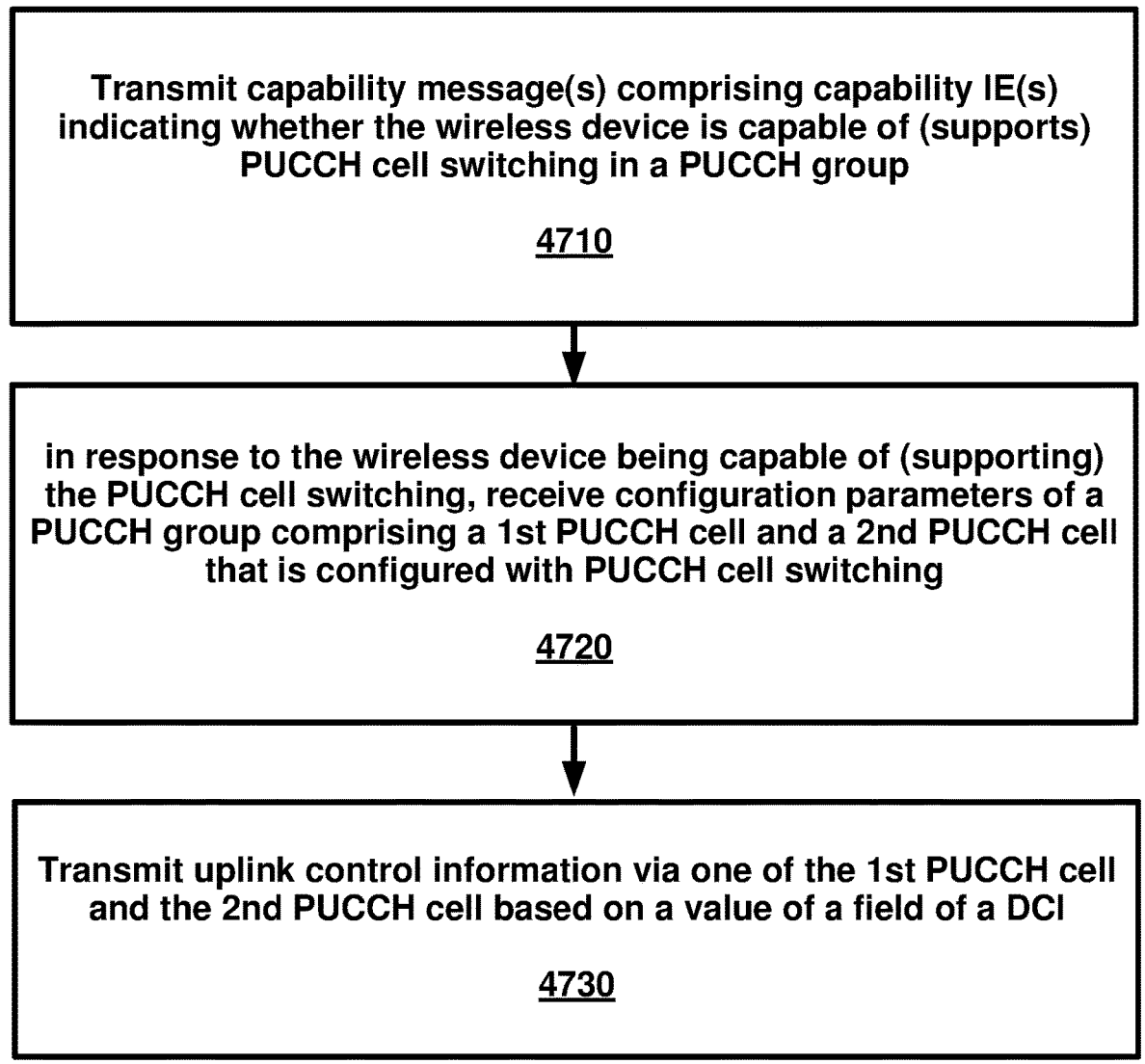
FIG. 47 shows an example flow diagram in accordance with several of various embodiments of the present disclosure.

FIG. 47 shows an example flow diagram in accordance with several of various embodiments of the present disclosure. At 4710, a wireless device may transmit one or more capability messages comprising one or more capability information elements (IEs) indicating whether the wireless device is capable of (e.g., supports) physical uplink control channel (PUCCH) cell switching in a PUCCH group. At 4720, in response to the wireless device being capable of (e.g., supporting) the PUCCH cell switching, the wireless device may receive configuration parameters of a PUCCH group comprising a first PUCCH cell and a second PUCCH cell that is configured with PUCCH cell switching. At 4730, the wireless device may transmit uplink control information via one of the first PUCCH cell and the second PUCCH cell based on a value of a field of a downlink control information (DCI).

Figure 48:
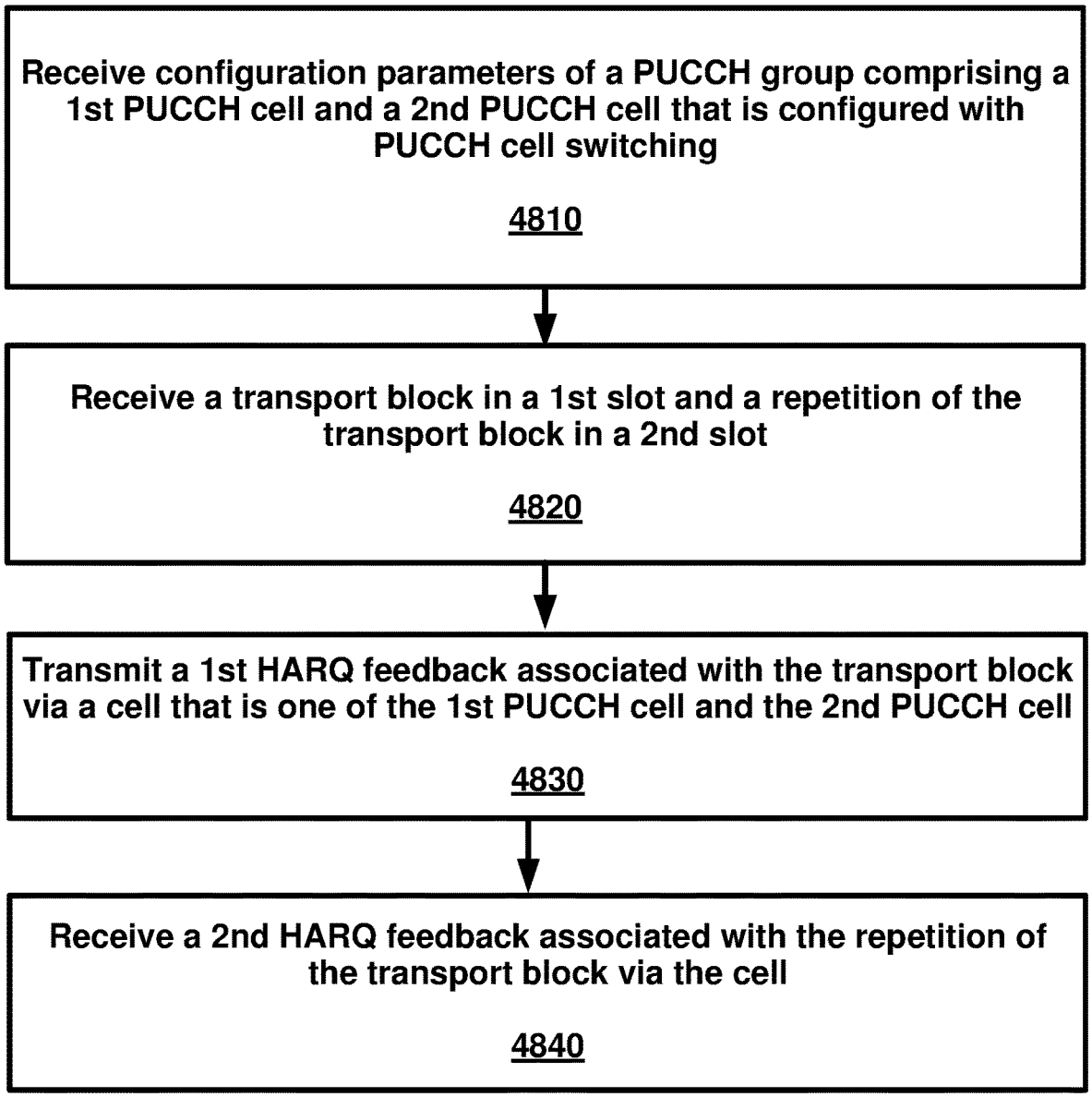
FIG. 48 shows an example flow diagram in accordance with several of various embodiments of the present disclosure.

FIG. 48 shows an example flow diagram in accordance with several of various embodiments of the present disclosure. At 4810, a wireless device may receive configuration parameters of a physical uplink control channel (PUCCH) group comprising a first PUCCH cell and a second PUCCH cell that is configured with PUCCH cell switching. At 4820, the wireless device may receive a transport block in a first slot and a repetition of the transport block in a second slot. The 4830, the wireless device may transmit a first hybrid automatic repeat request (HARQ) feedback associated with the transport block via a cell that is one of the first PUCCH cell and the second PUCCH cell. At 4840, the wireless device may transmit a second HARQ feedback associated with the repetition of the transport block via the cell (e.g., the same cell used for transmission of the first HARQ feedback).

In an example embodiment, the transmitting the second HARQ feedback, at 4840, may be via the cell (e.g., the same cell used for transmission of the first HARQ feedback) based on the second HARQ feedback being associated with the repetition of the transport block. The wireless device may expect that transmitting the second HARQ feedback, at 4840, to be via the cell (e.g., the same cell used for transmission of the first HARQ feedback) based on the second HARQ feedback being associated with the repetition of the transport block.

Various exemplary embodiments of the disclosed technology are presented as example implementations and/or practices of the disclosed technology. The exemplary embodiments disclosed herein are not intended to limit the scope. Persons of ordinary skill in the art will appreciate that various changes can be made to the disclosed embodiments without departure from the scope. After studying the exemplary embodiments of the disclosed technology, alternative aspects, features and/or embodiments will become apparent to one of ordinary skill in the art. Without departing from the scope, various elements or features from the exemplary embodiments may be combined to create additional embodiments. The exemplary embodiments are described with reference to the drawings. The figures and the flowcharts that demonstrate the benefits and/or functions of various aspects of the disclosed technology are presented for illustration purposes only. The disclosed technology can be flexibly configured and/or reconfigured such that one or more elements of the disclosed embodiments may be employed in alternative ways. For example, an element may be optionally used in some embodiments or the order of actions listed in a flowchart may be changed without departure from the scope.

An example embodiment of the disclosed technology may be configured to be performed when deemed necessary, for example, based on one or more conditions in a wireless device, a base station, a radio and/or core network configuration, a combination thereof and/or alike. For example, an example embodiment may be performed when the one or more conditions are met. Example one or more conditions may be one or more configurations of the wireless device and/or base station, traffic load and/or type, service type, battery power, a combination of thereof and/or alike. In some scenarios and based on the one or more conditions, one or more features of an example embodiment may be implemented selectively.

In this disclosure, the articles "a" and "an" used before a group of one or more words are to be understood as "at least one" or "one or more" of what the group of the one or more words indicate. The use of the term "may" before a phrase is to be understood as indicating that the phrase is an example of one of a plurality of useful alternatives that may be employed in an embodiment in this disclosure.

In this disclosure, an element may be described using the terms "comprises", "includes" or "consists of" in combination with a list of one or more components. Using the terms "comprises" or "includes" indicates that the one or more components are not an exhaustive list for the description of the element and do not exclude components other than the one or more components. Using the term "consists of" indicates that the one or more components is a complete list for description of the element. In this disclosure, the term "based on" is intended to mean "based at least in part on". The term "based on" is not intended to mean "based only on". In this disclosure, the term "and/or" used in a list of elements indicates any possible combination of the listed elements. For example, "X, Y, and/or Z" indicates X; Y; Z; X and Y; X and Z; Y and Z; or X, Y, and Z.

Some elements in this disclosure may be described by using the term "may" in combination with a plurality of features. For brevity and ease of description, this disclosure may not include all possible permutations of the plurality of features. By using the term "may" in combination with the plurality of features, it is to be understood that all permutations of the plurality of features are being disclosed. For example, by using the term "may" for description of an element with four possible features, the element is being described for all fifteen permutations of the four possible features. The fifteen permutations include one permutation with all four possible features, four permutations with any three features of the four possible features, six permutations with any two features of the four possible features and four permutations with any one feature of the four possible features.

Although mathematically a set may be an empty set, the term set used in this disclosure is a nonempty set. Set B is a subset of set A if every element of set B is in set A. Although mathematically a set has an empty subset, a subset of a set is to be interpreted as a non-empty subset in this disclosure. For example, for set A={subcarrier1, subcarrier2}, the subsets are {subcarrier1}, {subcarrier2} and {subcarrier1, subcarrier2}.

In this disclosure, the phrase "based on" may be used equally with "based at least on" and what follows "based on" or "based at least on" indicates an example of one of plurality of useful alternatives that may be used in an embodiment in this disclosure. The phrase "in response to" may be used equally with "in response at least to" and what follows "in response to" or "in response at least to" indicates an example of one of plurality of useful alternatives that may be used in an embodiment in this disclosure. The phrase "depending on" may be used equally with "depending at least on" and what follows "depending on" or "depending at least on" indicates an example of one of plurality of useful alternatives that may be used in an embodiment in this disclosure. The phrases "employing" and "using" and "employing at least" and "using at least" may be used equally in this in this disclosure and what follows "employing" or "using" or "employing at least" or "using at least" indicates an example of one of plurality of useful alternatives that may be used in an embodiment in this disclosure.

The example embodiments disclosed in this disclosure may be implemented using a modular architecture comprising a plurality of modules. A module may be defined in terms of one or more functions and may be connected to one or more other elements and/or modules. A module may be implemented in hardware, software, firmware, one or more biological elements (e.g., an organic computing device and/or a neurocomputer) and/or a combination thereof and/or alike. Example implementations of a module may be as software code configured to be executed by hardware and/or a modeling and simulation program that may be coupled with hardware. In an example, a module may be implemented using general-purpose or special-purpose processors, digital signal processors (DSPs), microprocessors, microcontrollers, application-specific integrated circuits (ASICs), programmable logic devices (PLDs) and/or alike. The hardware may be programmed using machine language, assembly language, high-level language (e.g., Python, FOR- TRAN, C, C++ or the like) and/or alike. In an example, the function of a module may be achieved by using a combination of the mentioned implementation methods.

What is claimed is:

1. A method comprising:
   receiving, by a wireless device, configuration parameters indicating:
      a first index for determining a first position of a first bit of a first transmit power control (TPC) command, in a first downlink control information (DCI), that is applicable to a first cell; and
      a second index for determining a second position of a first bit of a second TPC command, in the first DCI, that is applicable to a second cell;
   wherein:
      the first cell and the second cell are in the same physical uplink control channel PUCCH) group;
      the PUCCH group comprises a plurality of cells that are provided by a base station;
      the second cell is configured on top of the first cell for PUCCH cell switching in the PUCCH group; and
      based on the PUCCH cell switching and in a transmission timing, one of the first cell and the second cell is the cell for PUCCH transmission in the PUCCH group;
   receiving the first DCI; and
   transmitting, in the transmission timing, uplink control information based on:
      the first TPC command in response to the first cell being the cell for uplink control channel transmission in the transmission timing; and
      the second TPC command in response to the second cell being the cell for uplink control channel transmission in the transmission timing.

2. The method of claim 1, wherein the configuration parameters comprise a first configuration parameter of a switching pattern indicating first timings that the first cell is the cell for uplink control channel transmission and second timings that the second cell is the cell for uplink control channel transmission.

3. The method of claim 2, further comprising determining, based on the switching pattern, whether the first cell or the second cell is the cell for uplink control channel transmission in the transmission timing.

4. The method of claim 3, wherein the determining indicates that:
   the first cell is the cell for uplink control channel transmission in the transmission timing in response to the transmission timing being within the first timings; and
   the second cell is the cell for uplink control channel transmission in the transmission timing in response to the transmission timing being within the second timings.

5. The method of claim 2, wherein the switching pattern is based on a numerology of a primary cell.

6. The method of claim 1, further comprising:
   receiving a second DCI; and
   determining, based on a second DCI, whether the first cell or the second cell is the cell for uplink control channel transmission in the transmission timing.

7. The method of claim 6, wherein the second DCI comprises a field with a value indicating one of the first cell and the second cell for transmitting a hybrid automatic repeat request (HARQ) feedback in the transmission timing.

8. The method of claim 1, further comprising determining at least one of:
   the first TPC command based on the first DCI and the first position; and
   the second TPC command based on the first DCI and the second position.

9. The method of claim 1, wherein a power level of an uplink control channel is:
   based on the first TPC command in response to the first cell being the cell for uplink control channel transmission in the transmission timing; and
   based on the second TPC command in response to the second cell being the cell for uplink control channel transmission in the transmission timing.

10. The method of claim 1, further comprising receiving uplink control channel configuration parameters of the first cell and the second cell.

11. A wireless device comprising:
    one or more processors; and
    memory storing instructions that, when executed by the one or more processors, cause the wireless device to:
       receive configuration parameters indicating:
          a first index for determining a first position of a first bit of a first transmit power control (TPC) command, in a first downlink control information (DCI), that is applicable to a first cell; and
          a second index for determining a second position of a first bit of a second TPC command, in the first DCI, that is applicable to a second cell;
       wherein:
          the first cell and the second cell are in the same physical uplink control channel (PUCCH) group;
          the PUCCH group comprises a plurality of cells that are provided by a base station;
          the second cell is configured on top of the first cell for PUCCH cell switching in the PUCCH group; and
          based on the PUCCH cell switching and in a transmission timing, one of the first cell and the second cell is the cell for PUCCH transmission in the PUCCH group;
       receive the first DCI; and
       transmit, in the transmission timing, uplink control information based on:
          the first TPC command in response to the first cell being the cell for uplink control channel transmission in the transmission timing; and
          the second TPC command in response to the second cell being the cell for uplink control channel transmission in the transmission timing.

12. The wireless device of claim 11, wherein the configuration parameters comprise a first configuration parameter of a switching pattern indicating first timings that the first cell is the cell for uplink control channel transmission and second timings that the second cell is the cell for uplink control channel transmission.

13. The wireless device of claim 12, wherein the instructions, when executed by the one or more processors, further cause the wireless device to determine, based on the switching pattern, whether the first cell or the second cell is the cell for transmission in the transmission timing.

14. The wireless device of claim 13, wherein the determining indicates that:
    the first cell is the cell for uplink control channel transmission in the transmission timing in response to the transmission timing being within the first timings; and the second cell is the cell for uplink control channel transmission in the transmission timing in response to the transmission timing being within the second timings.

15. The wireless device of claim 12, wherein the switching pattern is based on a numerology of a primary cell.

16. The wireless device of claim 11, wherein the instructions, when executed by the one or more processors, further cause the wireless device to:
receive a second DCI; and
determine, based on a second DCI, whether the first cell or the second cell is the cell for uplink control channel transmission in the transmission timing.

17. The wireless device of claim 16, wherein the second DCI comprises a field with a value indicating one of the first cell and the second cell for transmitting a hybrid automatic repeat request (HARQ) feedback in the transmission timing.

18. The wireless device of claim 11, wherein the instructions, when executed by the one or more processors, further cause the wireless device to determine at least one of:
the first TPC command based on the first DCI and the first position; and
the second TPC command based on the first DCI and the second position.

19. The wireless device of claim 11, wherein a power level of an uplink control channel is:
based on the first TPC command in response to the first cell being the cell for uplink control channel transmission in the transmission timing; and
based on the second TPC command in response to the second cell being the cell for uplink control channel transmission in the transmission timing.

20. A system comprising:
a base station; and
a wireless device comprising: one or more processors; and memory storing instructions that, when executed by the one or more processors, cause the wireless device to: receive, from the base station, configuration parameters indicating: a first index for determining a first position of a first bit of a first transmit power control (TPC) command, in a first downlink control information (DCI), that is applicable to a first cell; and a second index for determining a second position of a first bit of a second TPC command, in the first DCI, that is applicable to a second cell; wherein: the first cell and the second cell are in the same physical uplink control channel (PUCCH) group; the PUCCH group comprises a plurality of cells that are provided by a base station; the second cell is configured on top of the first cell for PUCCH cell switching in the PUCCH group; and based on the PUCCH cell switching and in a transmission timing, one of the first cell and the second cell is the cell for PUCCH transmission in the PUCCH group; receive the first DCI; and transmit, in the transmission timing, uplink control information based on: the first TPC command in response to the first cell being the cell for uplink control channel transmission in the transmission timing; and the second TPC command in response to the second cell being the cell for uplink control channel transmission in the transmission timing.

* * * * *